US012677062B2

(12) United States Patent     (10) Patent No.:   US 12,677,062 B2

Wang et al.     (45) Date of Patent:     Jul. 7, 2026

(54) IMAGE OBTAINING METHOD AND ELECTRONIC DEVICE

(71) Applicant: Honor Device Co., Ltd., Shenzhen (CN)

(72) Inventors: Yu Wang, Shenzhen (CN); Congchao Zhu, Shenzhen (CN); Bin Xiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 336 days.

(21) Appl. No.: 18/549,046

(22) PCT Filed: Aug. 29, 2022

(86) PCT No.: PCT/CN2022/115551
§ 371 (c)(1),
(2) Date: Sep. 5, 2023

(87) PCT Pub. No.: WO2023/036007
PCT Pub. Date: Mar. 16, 2023

(65) Prior Publication Data

US 2024/0171701 A1     May 23, 2024

(30) Foreign Application Priority Data

Sep. 7, 2021    (CN) .......................... 202111044551.4
Dec. 29, 2021    (CN) .......................... 202111649415.8

(51) Int. Cl.
*H04N 23/60*     (2023.01)
*H04N 1/21*     (2006.01)
(Continued)

(52) U.S. Cl.
CPC ............. *H04N 23/64* (2023.01); *H04N 1/212* (2013.01); *H04N 23/632* (2023.01);
(Continued)

(58) Field of Classification Search
None
See application file for complete search history.

(56) References Cited

U.S. PATENT DOCUMENTS 10,225,511 B1    3/2019   Lim et al.
10,547,776 B2    1/2020   Brown et al.
(Continued)

FOREIGN PATENT DOCUMENTS

CN     101945212 A    1/2011
CN     102148983 A    8/2011
(Continued)

*Primary Examiner* — Paul M Berardesca
(74) *Attorney, Agent, or Firm* — Slater Matsil, LLP

(57) ABSTRACT

An image obtaining method and an electronic device relate to the field of photographing technologies. An electronic device receives a first operation of a user; displays a first interface in response to a first operation; selects a second image—from a first video stream, where the first video stream is obtained by an ISP by performing, on a plurality of frames of first images, first processing including subsampling; buffers the first images in a first buffer queue; uses m frames of first images corresponding to the second image in the first buffer queue as an input, and runs a preset RAW domain image processing algorithm to obtain a third image; performs, by using an ISP, second processing not including subsampling on the third image, to obtain a fourth image; and after video recording ends, displays a highlight image obtained by encoding the fourth image.

19 Claims, 36 Drawing Sheets

(51) Int. Cl.
    *H04N 23/63*         (2023.01)
    *H04N 23/80*         (2023.01)
    *H04N 101/00*      (2006.01)

(52) U.S. Cl.
    CPC ........... *H04N 23/80* (2023.01); *H04N 1/2141*
    (2013.01); *H04N 2101/00* (2013.01); *H04N*
                            *2201/0084* (2013.01)

(56) References Cited

U.S. PATENT DOCUMENTS

| 10,674,088 | B2 | 6/2020 | Sun et al. | |
| 11,019,252 | B2 | 5/2021 | Petrescu et al. | |
| 11,064,113 | B1 * | 7/2021 | Weber | H04N 23/60 |
| 11,218,649 | B2 | 1/2022 | Song et al. | |
| 11,882,357 | B2 | 1/2024 | Zhou et al. | |
| 2011/0001800 | A1 | 1/2011 | Nagao et al. | |
| 2015/0364158 | A1 * | 12/2015 | Gupte | H04N 5/144 |
| | | | | 386/223 |
| 2017/0127039 | A1 | 5/2017 | Liu et al. | |
| 2020/0186703 | A1 * | 6/2020 | Choi | H04N 5/77 |

| 2021/0227151 | A1 | 7/2021 | Song et al. | |
| 2023/0388657 | A1 * | 11/2023 | Lim | H04N 23/12 |
| 2024/0373119 | A1 * | 11/2024 | Zhu | H04N 23/632 |
| 2026/0006340 | A1 * | 1/2026 | Lim | H04N 23/743 |

FOREIGN PATENT DOCUMENTS

| CN | 105376495 | A | 3/2016 |
| CN | 105827951 | A | 8/2016 |
| CN | 105827971 | A | 8/2016 |
| CN | 107071379 | A | 8/2017 |
| CN | 108234870 | A | 6/2018 |
| CN | 108234873 | A | 6/2018 |
| CN | 108401110 | A | 8/2018 |
| CN | 108427938 | A | 8/2018 |
| CN | 109862433 | A | 6/2019 |
| CN | 110049254 | A | 7/2019 |
| CN | 110180181 | A | 8/2019 |
| CN | 110493507 | A | 11/2019 |
| CN | 110944109 | A | 3/2020 |
| CN | 111741211 | A | 10/2020 |
| EP | 2618557 | A2 | 7/2013 |

* cited by examiner

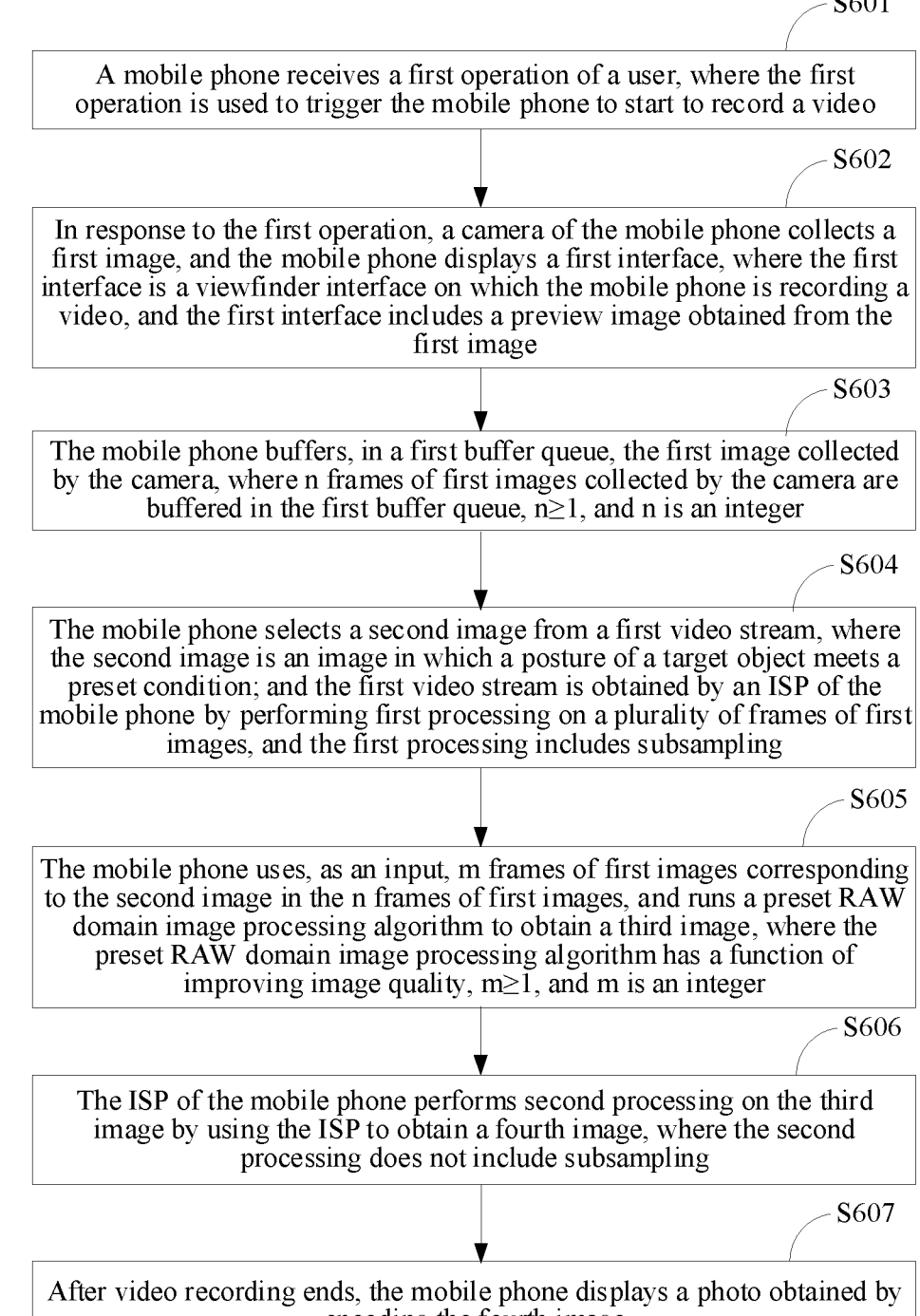

Video recording process

S601

A mobile phone receives a first operation of a user, where the first operation is used to trigger the mobile phone to start to record a video

S602

In response to the first operation, a camera of the mobile phone collects a first image, and the mobile phone displays a first interface, where the first interface is a viewfinder interface on which the mobile phone is recording a video, and the first interface includes a preview image obtained from the first image

S603

The mobile phone buffers, in a first buffer queue, the first image collected by the camera, where n frames of first images collected by the camera are buffered in the first buffer queue, n≥1, and n is an integer

S604

The mobile phone selects a second image from a first video stream, where the second image is an image in which a posture of a target object meets a preset condition; and the first video stream is obtained by an ISP of the mobile phone by performing first processing on a plurality of frames of first images, and the first processing includes subsampling

S605

The mobile phone uses, as an input, m frames of first images corresponding to the second image in the n frames of first images, and runs a preset RAW domain image processing algorithm to obtain a third image, where the preset RAW domain image processing algorithm has a function of improving image quality, m≥1, and m is an integer

S606

The ISP of the mobile phone performs second processing on the third image by using the ISP to obtain a fourth image, where the second processing does not include subsampling

S607

After video recording ends, the mobile phone displays a photo obtained by encoding the fourth image

FIG. 6

First buffer queue (a)                              (b)

1903

CONT.
FROM

TO FIG. 19C

CONT. FROM

1904

Figure 21:
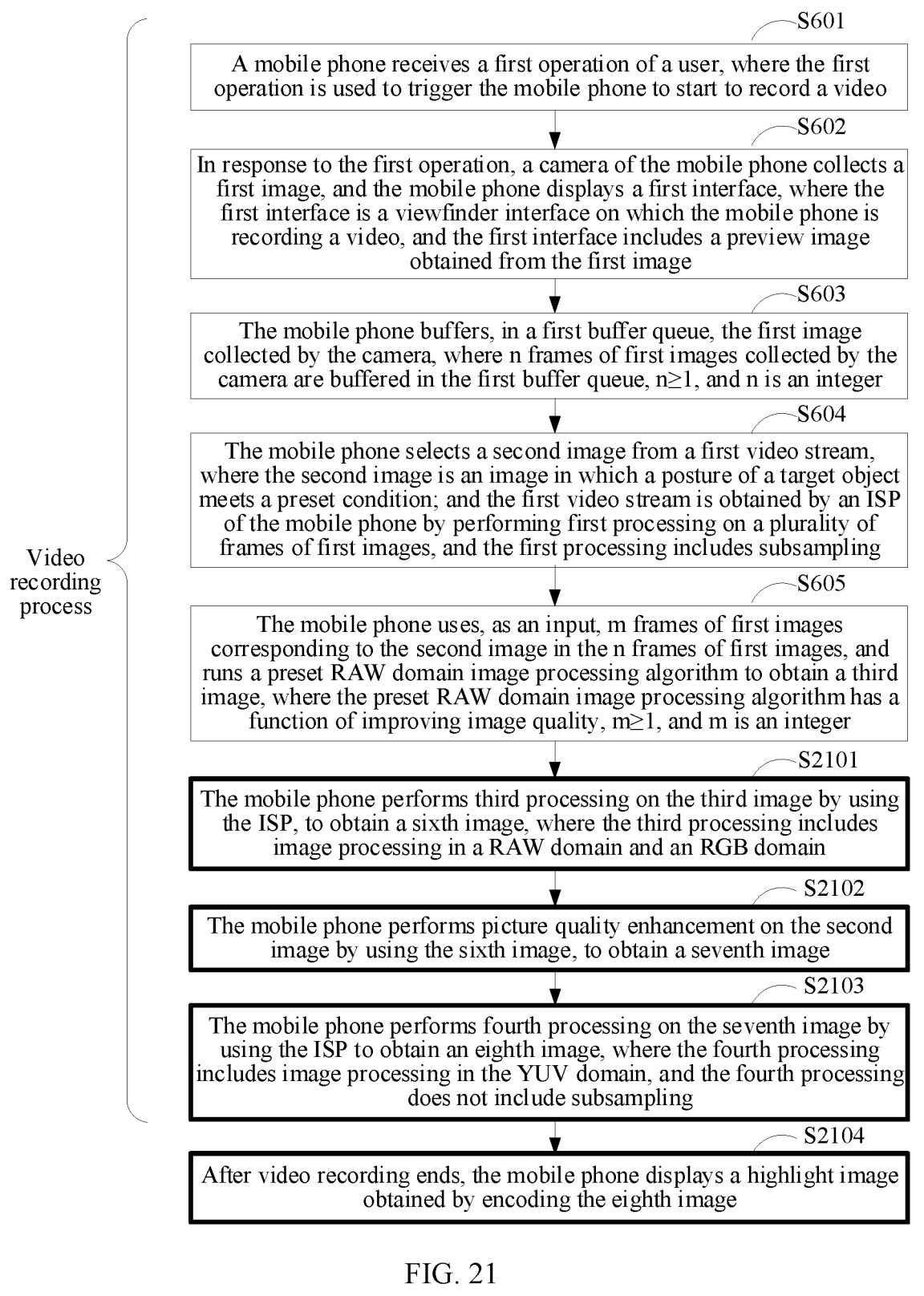

S601

A mobile phone receives a first operation of a user, where the first operation is used to trigger the mobile phone to start to record a video

S602

In response to the first operation, a camera of the mobile phone collects a first image, and the mobile phone displays a first interface, where the first interface is a viewfinder interface on which the mobile phone is recording a video, and the first interface includes a preview image obtained from the first image

S603

The mobile phone buffers, in a first buffer queue, the first image collected by the camera, where n frames of first images collected by the camera are buffered in the first buffer queue, $n \geq 1$, and n is an integer

S604

The mobile phone selects a second image from a first video stream, where the second image is an image in which a posture of a target object meets a preset condition; and the first video stream is obtained by an ISP of the mobile phone by performing first processing on a plurality of frames of first images, and the first processing includes subsampling

S605

The mobile phone uses, as an input, m frames of first images corresponding to the second image in the n frames of first images, and runs a preset RAW domain image processing algorithm to obtain a third image, where the preset RAW domain image processing algorithm has a function of improving image quality, $m \geq 1$, and m is an integer Video recording process

S2101

The mobile phone performs third processing on the third image by using the ISP, to obtain a sixth image, where the third processing includes image processing in a RAW domain and an RGB domain

S2102

The mobile phone performs picture quality enhancement on the second image by using the sixth image, to obtain a seventh image

S2103

The mobile phone performs fourth processing on the seventh image by using the ISP to obtain an eighth image, where the fourth processing includes image processing in the YUV domain, and the fourth processing does not include subsampling

S2104

After video recording ends, the mobile phone displays a highlight image obtained by encoding the eighth image

CONT. FROM
FIG. 25A

S2503

In a process of playing the video recording file, the mobile phone determines a candidate image from the video recording file in response to a selection operation performed by the user on one frame of image in the video recording file

S2504

The mobile phone selects a reference (REF) image corresponding to the candidate image from the second buffer queue, and performs picture quality enhancement on the candidate image by using the REF image to obtain a ninth image After video recording ends

S2505

The mobile phone performs fourth processing on the ninth image by using the ISP to obtain a tenth image, where the fourth processing includes image processing in the YUV domain, and the fourth processing does not include subsampling

S2506

The mobile phone displays a highlight image obtained by encoding the tenth image

FIG. 25B

CONT.
FROM

2704

2801

2801

IMAGE OBTAINING METHOD AND ELECTRONIC DEVICE

CROSS-REFERENCE TO RELATED APPLICATIONS

This application is a national stage of International Application No. PCT/CN2022/115551, filed on Aug. 29, 2022, which claims priority to Chinese Patent Application No. 202111044551.4, filed on Sep. 7, 2021, and Chinese Patent Application No. 202111649415.8, filed on Dec. 29, 2021, all of which is incorporated herein by reference in their entireties.

TECHNICAL FIELD

This application relates to the field of photographing technologies, and in particular, to an image obtaining method and an electronic device.

BACKGROUND

Existing mobile phones generally have photographing and video recording functions, and a growing quantity of people use the mobile phones to take photos and videos to record every bits and pieces of life. In a process of recording a video (namely, a video recording process), the mobile phone may collect some highlight pictures. In the video recording process of the mobile phone, a user may expect the mobile phone to capture the highlight pictures and save the highlight pictures as photos for displaying to the user. Therefore, a solution in which a highlight image in a video record can be selected and presented to a user is urgently needed.

SUMMARY

This application provides an image obtaining method and an electronic device, so as to automatically select and present a highlight image in a video record to a user.

To achieve the foregoing objective, the following technical solutions are used in the embodiments of this application:

According to a first aspect, this application provides an image obtaining method, and the method may be applied to an electronic device. In the method, the electronic device may receive a first operation of a user, where the first operation is used to trigger starting video recording. The electronic device displays a first interface in response to the first operation. The first interface is a viewfinder interface on which the electronic device is recording a video, the first interface includes a preview image, and the preview image is obtained from a first image collected by a camera of the electronic device after the electronic device receives the first operation. The electronic device may select a second image from a first video stream. The second image includes an image of a target object, the first video stream is obtained by performing first processing on a plurality of frames of first images by using an image signal processor (ISP) of the electronic device, and the first processing includes subsampling. The electronic device may buffer, in a first buffer queue, the first image collected by the camera, where n frames of first images collected by the camera may be buffered in the first buffer queue, $n \geq 1$, and n is an integer. Then, the electronic device may use, as an input, m frames of first images corresponding to the second image in the n frames of first images, and run a preset original RAW domain image processing algorithm to obtain a third image. The preset RAW domain image processing algorithm has a function of improving image quality. $m \geq 1$, and m is an integer. Then, the electronic device may perform second processing on the third image by using the ISP to obtain a fourth image, where the second processing does not include subsampling. Finally, the electronic device may display, after video recording ends, a highlight image obtained by encoding the fourth image.

In this application, an image exposed and output by an image sensor (Sensor) of the electronic device (such as the mobile device) may be processed by the ISP to obtain a video stream (that is, the first data stream). The electronic device may select a candidate frame (that is, the second image, that is, a candidate highlight frame) from the video stream processed by the ISP. In addition, the electronic device may buffer the image exposed and output by the Sensor in the first buffer queue (Buffer). The first buffer queue may buffer a plurality of frames of images. In this way, even if there is a delay from "outputting the image corresponding to the candidate frame (that is, the second image) by the Sensor" to "selecting the candidate frame", the image corresponding to the candidate frame may be buffered in the first buffer queue. In this way, the electronic device may obtain the image corresponding to the candidate frame from the first buffer queue.

In addition, the electronic device may further process, by using a preset RAW domain image processing algorithm, the first image corresponding to the second image, which helps improve picture quality of the highlight image. An image LR in the video stream corresponding to the preview image and the video recording file is subsampled. The fourth image obtained after the ISP processes the third image is an image HR that is not subsampled. Therefore, the highlight image obtained by encoding the image HR is a high-resolution image.

In conclusion, by using this solution, the electronic device may automatically select and present the highlight image in the video record to the user, and image quality (such as resolution and picture quality) of the highlight image can be improved.

In a possible design manner of the first aspect, the displaying, by the electronic device after video recording ends, a highlight image obtained by encoding the fourth image includes: displaying, by the electronic device after video recording ends, a detail page of a video recording file in response to an operation of the user, where the detail page of the video recording file includes a first preset control; and displaying, by the electronic device in response to a tap operation performed by the user on the first preset control, the highlight image captured in a process of recording the video recording file by the electronic device. In this design manner, the mobile phone may provide, in a manner of providing an explicit control (that is, the first preset control) on the detail page of the video recording file, an entrance of a highlight image captured in a process of triggering the electronic device to display the video recording file.

In another possible design manner of the first aspect, the displaying, by the electronic device after video recording ends, a highlight image obtained by encoding the fourth image includes: displaying, by the electronic device after video recording ends, a detail page of a video recording file in response to an operation of the user; and displaying, by the electronic device in response to a preset gesture entered by the user on the detail page of the video recording file, the highlight image captured in a process of recording the video recording file by the electronic device. In this design manner, the mobile phone may provide, in a manner of non-explicit control on the detail page of the video recording file, an entrance of a highlight image captured in a process of triggering the electronic device to display the video recording file.

In another possible design manner of the first aspect, n≥2. In other words, a plurality of frames of first images may be buffered in the first buffer queue. In this way, even if there is a delay from "outputting the image corresponding to the candidate frame (that is, the second image) by the Sensor" to "selecting the candidate frame" (for example, 120 ms-160 ms). In the delay duration, the frame output by the Sensor can be buffered in the Buffer. Therefore, when the electronic device selects the candidate frame (that is, the second image), a Bayer image output by the Sensor may also be buffered in the first buffer queue. In addition, image content of the frame output by the Sensor will not change much in a short time. In this way, the electronic device may select, from the Buffer according to time information of images buffered in the Buffer, m frames of first images corresponding to the second image.

In another possible design manner of the first aspect, the using, by the electronic device as an input, k frames of first images corresponding to the second image in the n frames of first images, and running a preset RAW domain image processing algorithm to obtain a third image may include: selecting a fifth image corresponding to the second image from the n frames of first images; and using the m frames of first images in the n frames of first images as an input, and running the preset RAW domain image processing algorithm to obtain the third image; where the m frames of first images include the fifth image; another image other than the fifth image in the m frames of first images is used to perform picture quality enhancement on the fifth image; and in the n frames of first images, a time at which an image sensor of the camera outputs the fifth image is closest to a time at which the image sensor of the camera outputs the second image. In this way, a frame of image closest to the image content of the second image may be selected from the first buffer queue. Alternatively, in the n frames of first images, the fifth image has highest definition. In this way, a frame of image with highest image quality may be selected from the first buffer queue.

In another possible design manner of the first aspect, the target object includes a face, the second image is an image when an expression of the target object meets a preset condition, and that the expression of the target object meets the preset condition includes a face is smiling; In this design manner, the electronic device may capture a highlight image with a face smiling from a video record.

In another possible design manner of the first aspect, the target object includes a human body, and the second image is an image when an action of the target object is a preset action. For example, the preset action may be a human body action that the human body jumps to a highest point, a dance performance, or a highlight action in a sports performance process, or a high-difficulty action in a human body exercise process. That is, the second image may be a frame of image in which the first video stream includes a preset action of the human body. In this example, the electronic device may capture, in a video recording process, a highlight image having a preset action in a motion process of the human body.

In another possible design manner of the first aspect, the target object is preconfigured in the electronic device when the electronic device is delivered from a factory; and/or the target object is set by the user on a settings interface of the electronic device and received the electronic device.

In another possible design manner of the first aspect, the electronic device provides the user with a function of setting the target object on the viewfinder interface on which the electronic device has not started video recording.

Specifically, before the electronic device selects the second image from the first video stream, the electronic device may display a second interface. The second interface is a viewfinder interface on which the electronic device has not started to record a video, and a preview image included in the second interface is obtained from an image collected by the camera of the electronic device before the electronic device receives the first operation; the second interface further includes a start video recording button and a switch of a preset function; and the first operation is a tap operation on the start video recording button; the electronic device displays a settings interface of the target object in response to a second operation performed by the user on the switch of the preset function in the second interface, where the settings interface of the target object includes options of a plurality of to-be-selected photographing objects; and the electronic device determines, in response to a selection operation performed by the user on an option of at least one photographing object in the options of the plurality of to-be-selected photographing object, a photographing object selected by the user as the target object.

In another possible design manner of the first aspect, the electronic device provides the user with a function of setting the target object on the viewfinder interface (such as the first interface) on which the electronic device starts to record a video. The first interface further includes: a switch of a preset function; and before the electronic device selects the second image from the first video stream, the electronic device may display a settings interface of the target object in response to a second operation performed by the user on the switch of the preset function in the first interface, where the settings interface of the target object includes options of a plurality of to-be-selected photographing objects; and the electronic device determines, in response to a selection operation performed by the user on an option of at least one photographing object in the options of the plurality of to-be-selected photographing object, a photographing object selected by the user as the target object.

In another possible design manner of the first aspect, the electronic device may periodically select the second image from the first video stream.

In another possible design manner of the first aspect, m≥2. Specifically, the electronic device may run the preset RAW domain image processing algorithm by using the plurality of frames of first images as an input. It should be understood that images in the m frames of first images other than the fifth image may play a role of picture quality enhancement on the fifth image. This makes it easy to obtain information such as noise and a texture, to further improve picture quality of the fifth image.

In another possible design manner of the first aspect, the first processing includes image processing in an RAW domain and image processing in an RGB domain, and the second processing includes image processing in the RAW domain, image processing in the RGB domain, and image processing in a YUV domain.

In another possible design manner of the first aspect, if the first buffer queue includes a first image whose difference between a time indicated by time information thereof and a time indicated by time information of the second image is within preset duration, the electronic device may perform the second processing on the third image by using the ISP to obtain a fourth image.

A buffer space of the first buffer queue is limited. Therefore, a first image whose time information is the same as that of the second image may not be buffered in the first buffer queue. In other words, the time information of the first image buffered in the first buffer queue may be greatly different from the time information of the second image. In this case, image content of the first image buffered in the first buffer queue may be greatly different from image content of the second image.

If the first buffer queue includes a first image whose difference between the time indicated by time information thereof and the time indicated by the time information of the second image is within the preset duration, it indicates that the first image that is relatively close to the time at which the Sensor outputs the second image can be found from the first buffer queue. In this case, the electronic device performs the second processing on the third image by using the ISP to obtain the fourth image, and can accurately capture a highlight image corresponding to the second image.

In another possible design manner of the first aspect, if the first buffer queue does not include a first image whose difference between the time indicated by time information thereof and the time indicated by the time information of the second image is within the preset duration, the electronic device may perform the method of the second aspect. Detailed description and effect analysis of the method according to the second aspect are not described herein again.

In another possible design manner of the first aspect, the electronic device may not only generate a highlight image online, but also generate a highlight image offline. The third processing may not include subsampling. Specifically, the method in this application may further include: buffering, by the electronic device, the sixth image in a second buffer queue; generating, by the electronic device, a video recording file in response to an operation of ending video recording; where the video recording file includes an image generated from a plurality of frames of first images; in a process of playing the video recording file, determining, by the electronic device, a candidate image from the video recording file in response to a selection operation performed by the user on one frame of image in the video recording file; selecting, by the electronic device, a reference REF image corresponding to the candidate image from a plurality of frames of sixth images buffered in the second buffer queue, and performing picture quality enhancement on the candidate image by using the REF image to obtain a ninth image; performing, by the electronic device, fourth processing on the ninth image by using the ISP to obtain a tenth image, where the fourth processing includes image processing in the YUV domain, and the fourth processing does not include subsampling; and displaying, by the electronic device, a highlight image obtained by encoding the tenth image. For detailed description and effect analysis of the design manner, refer to detailed description and effect analysis of the method in the third aspect in this application. Details are not described herein.

According to a second aspect, this application provides an image obtaining method, and the method may be applied to an electronic device. In the method, the electronic device may receive a first operation of a user, where the first operation is used to trigger starting video recording. The electronic device displays a first interface in response to the first operation. The first interface is a viewfinder interface on which the electronic device is recording a video, the first interface includes a preview image, and the preview image is obtained from a first image collected by a camera of the electronic device after the electronic device receives the first operation. The electronic device may select a second image from a first video stream. The second image includes an image of a target object, the first video stream is obtained by performing first processing on a plurality of frames of first images by using an image signal processor (image signal processor, ISP) of the electronic device, and the first processing includes subsampling. The electronic device may buffer, in a first buffer queue, the first image collected by the camera, where n frames of first images collected by the camera may be buffered in the first buffer queue, n≥1, and n is an integer. Then, the electronic device may use, as an input, m frames of first images corresponding to the second image in the n frames of first images, and run a preset original RAW domain image processing algorithm to obtain a third image. The preset RAW domain image processing algorithm has a function of improving image quality. m≥1, and m is an integer. The electronic device performs third processing on the third image by using the ISP, to obtain a sixth image; where the third processing includes image processing in the RAW domain and image processing in the RGB domain; the electronic device performs picture quality enhancement on the second image by using the sixth image, to obtain a seventh image; the electronic device performs fourth processing on the seventh image by using the ISP to obtain an eighth image, where the fourth processing includes image processing in the YUV domain, and the fourth processing does not include subsampling; and the electronic device displays, after video recording ends, a highlight image obtained by encoding the eighth image.

In a possible design manner of the second aspect, the first processing includes image processing in the RAW domain and image processing in the RGB domain.

In another possible design manner of the second aspect, the performing, by the electronic device, picture quality enhancement on the second image by using the sixth image includes: image fusion and/or image super-resolution; where the image super-resolution includes reference frame-based image super-resolution REF-SR.

According to a third aspect, this application provides an image obtaining method, and the method may be applied to an electronic device. In the method, the electronic device may receive a first operation of a user, where the first operation is used to trigger starting video recording. The electronic device displays a first interface in response to the first operation. The first interface is a viewfinder interface on which the electronic device is recording a video, the first interface includes a preview image, and the preview image is obtained from a first image collected by a camera of the electronic device after the electronic device receives the first operation. The electronic device may select a second image from a first video stream. The second image includes an image of a target object, the first video stream is obtained by performing first processing on a plurality of frames of first images by using an image signal processor (ISP) of the electronic device, and the first processing includes subsampling. The electronic device may buffer, in a first buffer queue, the first image collected by the camera, where n frames of first images collected by the camera may be buffered in the first buffer queue, n≥1, and n is an integer. Then, the electronic device may use, as an input, m frames of first images corresponding to the second image in the n frames of first images, and run a preset original RAW domain image processing algorithm to obtain a third image.

The preset RAW domain image processing algorithm has a function of improving image quality. $m \geq 1$, and m is an integer. The electronic device performs third processing on the third image by using the ISP, to obtain a sixth image, and buffers the sixth image in a second buffer queue, where the third processing includes image processing in an RAW domain and image processing in an RGB domain, and the third processing does not include subsampling; the electronic device generates a video recording file in response to an operation of ending video recording; where the video recording file includes an image generated from a plurality of frames of first images; the electronic device determines a candidate image from the video recording file in response to a selection operation performed by the user on one frame of image in the video recording file; the electronic device selects a reference REF image corresponding to the candidate image from a plurality of frames of sixth images buffered in the second buffer queue, and performs picture quality enhancement on the candidate image by using the REF image to obtain a ninth image; the electronic device performs fourth processing on the ninth image by using the ISP to obtain a tenth image, where the fourth processing includes image processing in the YUV domain, and the fourth processing does not include subsampling; and the electronic device displays a highlight image obtained by encoding the tenth image.

In one aspect, the third processing does not include subsampling. Therefore, the sixth image buffered in the second buffer queue is a high-resolution HR image. In addition, the sixth image is an image that is processed by using the preset RAW domain image processing algorithm and has relatively rich image details and high image quality.

In the other hand, the sixth image is generated based on the second image. The second image is an image that includes the target object and is included in the video recording file. It can be learned that the sixth image also includes the image of the target object. In this way, after video recording of the electronic device ends, it is more likely that the user wants to select, from the video recording file, a frame of image corresponding to the sixth image as a highlight image.

Therefore, in this application, the electronic device may buffer a plurality of frames of sixth images in the second buffer queue, and is configured to: when a user requirement of selecting a frame of image from the video recording file as a highlight image appears, perform picture quality enhancement (including image super-resolution) on the frame of image by using the sixth image in the second buffer queue, so as to obtain a highlight image with relatively high image quality (including relatively high resolution).

In a possible design manner of the third aspect, a detail page of the video recording file includes a second preset control; the selection operation on one frame of image in the video recording file is a tap operation on the second preset control; and the determining, by the electronic device, a candidate image from the video recording file in response to a selection operation performed by the user on one frame of image in the video recording file includes: selecting, by the electronic device from the video recording file in response to a tap operation performed by the user on the second preset control in the detail page of the video recording file, an image corresponding to each frame of the sixth image buffered in the second buffer queue as the candidate image.

In this design manner, the electronic device may provide, in a manner of an explicit control (such as the second preset control) in the detail page of the video recording file, a function of triggering the electronic device to generate and display a highlight image in the video recording file for the user.

In another possible design manner of the third aspect, a playback interface of the video recording file includes a third preset control; the selection operation on one frame of image in the video recording file is a tap operation on the third preset control; and the determining, by the electronic device, a candidate image from the video recording file in response to a selection operation performed by the user on one frame of image in the video recording file includes: in a process of playing the video recording file, using, by the electronic device in response to a tap operation performed by the user on the third preset control in the playback interface of the video recording file, one frame of image played by the electronic device when the user taps the third preset control as the candidate image.

In this design manner, the electronic device may provide, in a manner of an explicit control (such as the second preset control) in the playback interface of the video recording file, a function of triggering the electronic device to generate and display a highlight image in the video recording file for the user.

In another possible design manner of the third aspect, the determining, by the electronic device, a candidate image from the video recording file in response to a selection operation performed by the user on one frame of image in the video recording file includes: in the process of playing the video recording file, using, by the electronic device in response to a pause playback operation and an enlarge image operation, one frame of image corresponding to the enlarge image operation as the candidate image, where the enlarge image operation is used to trigger the electronic device to enlarge one frame of image in the video recording file displayed by the electronic device when the electronic device pauses playing the video recording file.

In this design manner, in the process of playing the video recording file by the electronic device, when the electronic device plays an image of interest to the user, the user may tap a pause button to control the mobile phone to pause playing the video recording file, and then the user may control the electronic device to enlarge the current frame of image. In response to the pause playback operation and the enlarge image operation, the electronic device may use, as a candidate image, one frame of image enlarged by the user to generate a highlight image.

In another possible design manner of the third aspect, the determining, by the electronic device, a candidate image from the video recording file in response to a selection operation performed by the user on one frame of image in the video recording file includes: in the process of playing the video recording file, receiving, by the electronic device, an adjustment operation performed by the user on a progress bar in the playback interface of the video recording file, and displaying an image in the video recording file according to a change of the progress bar; and after detecting that a finger of the user leaves the progress bar, using, by the electronic device as the candidate image, one frame of image in the video recording file corresponding to the progress bar when the finger of the user leaves the progress bar.

In this design manner, in the process of playing the video recording file by the electronic device, when the electronic device plays an image of interest to the user, the user may control, by using the progress bar, the electronic device to display an image of interest to the user in the video recording file. After the electronic device detects that the finger of the user leaves the progress bar, the electronic device may use a frame of image in the video recording file corresponding to the progress bar when the finger of the user leaves the progress bar, as a candidate image to generate a highlight image.

In another possible design manner of the third aspect, the determining, by the electronic device, a candidate image from the video recording file in response to a selection operation performed by the user on one frame of image in the video recording file includes: in the process of playing the video recording file, selecting, by the electronic device in response to an operation of repeatedly viewing a segment in the video recording file by the user, one frame of image from the segment as the candidate image.

If the user repeatedly views one segment in the video recording file, it indicates that the user is interested in an image of the segment. In this case, the electronic device selects a frame of image from the segment as a candidate image to generate a highlight image, so as to obtain a highlight image that meets the user requirement.

In another possible design manner of the third aspect, the determining, by the electronic device, a candidate image from the video recording file in response to a selection operation performed by the user on one frame of image in the video recording file includes: in the process of playing the video recording file, receiving, by the electronic device, an adjustment operation performed by the user on a progress bar in the playback interface of the video recording file, and displaying an image in the video recording file according to a change of the progress bar; and detecting, by the electronic device, that the finger of the user stays on the progress bar, where the progress bar keeps in a same position; recording duration in which the progress bar keeps in the same position; and when the duration in which the progress bar keeps in the same position is greater than a preset time threshold, using, by the electronic device, a frame of image in the video recording file corresponding to the progress bar as the candidate image; or detecting, by the electronic device, that the finger of the user stays on the progress bar, where the playback interface of the video recording file keeps displaying a same frame of image; recording duration in which the playback interface of the video recording file keeps displaying the same frame of image; and when the duration in which the playback interface of the video recording file keeps displaying the same frame of image is greater than a preset time threshold, using a corresponding frame of image in the video recording file as the candidate image.

In another possible design manner of the third aspect, the selecting one frame of image from the segment as the candidate image includes: selecting, by the electronic device, a frame of image with highest definition in the segment as the candidate image.

According to a fourth aspect, this application provides an electronic device, where the electronic device includes a touchscreen, a memory, a display screen, one or more cameras, and one or more processors. The memory, the display screen, and the camera are coupled to the processor. The camera is configured to capture an image, the display screen is configured to display the image captured by the camera or an image generated by the processor; and the memory stores computer program code, the computer program code includes computer instructions, and when the computer instructions are executed by the processor, the electronic device is enabled to perform the method according to any one of the first aspect or the second aspect or the possible design manners of the first aspect, the second aspect, or the third aspect.

According to a fifth aspect, this application provides an electronic device, where the electronic device includes a touchscreen, a memory, a display screen, one or more cameras, and one or more processors. The memory, the display screen, and the camera are coupled to the processor. The camera is configured to collect an image. The display screen is configured to display the image collected by the camera or an image generated by the processor. The memory stores computer program code, and the computer program code includes computer instructions. When the computer instructions are executed by the processor, the electronic device is enabled to perform the following steps: receiving a first operation of a user; where the first operation is used to trigger starting video recording; displaying a first interface in response to the first operation; where the first interface is a viewfinder interface on which the electronic device is recording a video, the first interface includes a preview image, and the preview image is obtained from a first image collected by a camera of the electronic device after the electronic device receives the first operation; selecting a second image from a first video stream; where the second image includes an image of a target object; and the first video stream is obtained by an ISP of the electronic device by performing first processing on a plurality of frames of first images, and the first processing includes subsampling; buffering, in a first buffer queue, the first image collected by the camera; where n frames of first images collected by the camera are buffered in the first buffer queue, $n \geq 1$, and n is an integer; using, as an input, m frames of first images corresponding to the second image in the n frames of first images, and running a preset original RAW domain image processing algorithm to obtain a third image; where the preset RAW domain image processing algorithm has a function of improving image quality; and $m \geq 1$, and m is an integer; performing second processing on the third image by using the ISP, to obtain a fourth image; where the second processing does not include the subsampling; and after video recording ends, displaying a highlight image obtained by encoding the fourth image.

In a possible design manner of the fifth aspect, when the computer instructions are executed by the processor, the electronic device is enabled to perform the following steps: displaying, after video recording ends, a detail page of a video recording file in response to an operation of the user, where the detail page of the video recording file includes a first preset control; and displaying, in response to a tap operation performed by the user on the first preset control, the highlight image captured in a process of recording the video recording file by the electronic device.

In another possible design manner of the fifth aspect, when the computer instructions are executed by the processor, the electronic device is enabled to perform the following steps: displaying, after video recording ends, a detail page of a video recording file in response to an operation of the user; and displaying, in response to a preset gesture entered by the user on the detail page of the video recording file, the highlight image captured in a process of recording the video recording file by the electronic device.

In another possible design manner of the fifth aspect, $n \geq 2$.

In another possible design manner of the fifth aspect, when the computer instructions are executed by the processor, the electronic device is enabled to perform the following steps: selecting a fifth image corresponding to the second image from the n frames of first images; and using the m frames of first images in the n frames of first images as an input, and running the preset RAW domain image processing algorithm to obtain the third image; where the m frames of first images include the fifth image; another image other than the fifth image in the m frames of first images is used to perform picture quality enhancement on the fifth image; and in the n frames of first images, a time at which an image sensor of the camera outputs the fifth image is closest to a time at which the image sensor of the camera outputs the second image; or in the n frames of first images, the fifth image has highest definition.

In another possible design manner of the fifth aspect, the target object includes a face, the second image is an image when an expression of the target object meets a preset condition, and that the expression of the target object meets the preset condition includes a face is smiling; and/or the target object includes a human body, and the second image is an image when an action of the target object is a preset action.

In another possible design manner of the fifth aspect, the target object is preconfigured in the electronic device when the electronic device is delivered from a factory; and/or the target object is set by the user on a settings interface of the electronic device and received the electronic device.

In another possible design manner of the fifth aspect, when the computer instructions are executed by the processor, the electronic device is enabled to perform the following steps: before the electronic device selects the second image from the first video stream, displaying a second interface; where the second interface is a viewfinder interface on which the electronic device has not started to record a video, and a preview image included in the second interface is obtained from an image collected by the camera of the electronic device before the electronic device receives the first operation; the second interface further includes a start video recording button and a switch of a preset function; and the first operation is a tap operation on the start video recording button; displaying a settings interface of the target object in response to a second operation performed by the user on the switch of the preset function in the second interface, where the settings interface of the target object includes options of a plurality of to-be-selected photographing objects; and determining, in response to a selection operation performed by the user on an option of at least one photographing object in the options of the plurality of to-be-selected photographing object, a photographing object selected by the user as the target object.

In another possible design manner of the fifth aspect, the first interface further includes: a switch of a preset function. When the computer instructions are executed by the processor, the electronic device is enabled to perform the following steps: before the electronic device selects the second image from the first video stream, displaying a settings interface of the target object in response to a second operation performed by the user on the switch of the preset function in the first interface, where the settings interface of the target object includes options of a plurality of to-be-selected photographing objects; and determining, in response to a selection operation performed by the user on an option of at least one photographing object in the options of the plurality of to-be-selected photographing object, a photographing object selected by the user as the target object.

In another possible design manner of the fifth aspect, when the computer instructions are executed by the processor, the electronic device is enabled to perform the following steps: periodically selecting the second image from the first video stream.

In another possible design manner of the fifth aspect, m≥2.

In another possible design manner of the fifth aspect, the first processing includes image processing in an RAW domain and image processing in an RGB domain, and the second processing includes image processing in the RAW domain, image processing in the RGB domain, and image processing in a YUV domain.

In another possible design manner of the fifth aspect, when the computer instructions are executed by the processor, the electronic device is enabled to perform the following steps: if the first buffer queue includes a first image whose difference between a time indicated by time information thereof and a time indicated by time information of the second image is within preset duration, performing the second processing on the third image by using the ISP to obtain a fourth image.

In another possible design manner of the fifth aspect, when the computer instructions are executed by the processor, the electronic device is enabled to perform the following steps: if the first buffer queue does not include a first image whose difference between a time indicated by time information thereof and a time indicated by time information of the second image is within preset duration, performing third processing on the third image by using the ISP to obtain a sixth image; where the third processing includes image processing in the RAW domain and image processing in the RGB domain; performing picture quality enhancement on the second image by using the sixth image, to obtain a seventh image; performing fourth processing on the seventh image by using the ISP to obtain an eighth image, where the fourth processing includes image processing in the YUV domain, and the fourth processing does not include subsampling; and displaying, after video recording ends, a highlight image obtained by encoding the eighth image.

In another possible design manner of the fifth aspect, the third processing does not include subsampling. When the computer instructions are executed by the processor, the electronic device is enabled to perform the following steps: buffering the sixth image in a second buffer queue; generating a video recording file in response to an operation of ending video recording; where the video recording file includes an image generated from a plurality of frames of first images; in a process of playing the video recording file, determining a candidate image from the video recording file in response to a selection operation performed by the user on one frame of image in the video recording file; selecting a reference REF image corresponding to the candidate image from a plurality of frames of sixth images buffered in the second buffer queue, and performing picture quality enhancement on the candidate image by using the REF image to obtain a ninth image; performing fourth processing on the ninth image by using the ISP to obtain a tenth image, where the fourth processing includes image processing in the YUV domain, and the fourth processing does not include subsampling; and displaying a highlight image obtained by encoding the tenth image.

According to a sixth aspect, this application provides an electronic device, where the electronic device includes a touchscreen, a memory, a display screen, one or more cameras, and one or more processors. The memory, the display screen, and the camera are coupled to the processor. The camera is configured to collect an image. The display screen is configured to display the image collected by the camera or an image generated by the processor. The memory stores computer program code, and the computer program code includes computer instructions. When the computer instructions are executed by the processor, the electronic device is enabled to perform the following steps: receiving a first operation of a user; where the first operation is used to trigger starting video recording; displaying a first interface in response to the first operation; where the first interface is a viewfinder interface on which the electronic device is recording a video, the first interface includes a preview image, and the preview image is obtained from a first image collected by a camera of the electronic device after the electronic device receives the first operation; selecting a second image from a first video stream; where the second image includes an image of a target object; and the first video stream is obtained by an ISP of the electronic device by performing first processing on a plurality of frames of first images, and the first processing includes subsampling; buffering, in a first buffer queue, the first image collected by the camera; where n frames of first images collected by the camera are buffered in the first buffer queue, n≥1, and n is an integer; using, as an input, m frames of first images corresponding to the second image in the n frames of first images, and running a preset original RAW domain image processing algorithm to obtain a third image; where the preset RAW domain image processing algorithm has a function of improving image quality; and m≥1, and m is an integer; performing third processing on the third image by using the ISP, to obtain a sixth image; where the third processing includes image processing in the RAW domain and image processing in the RGB domain; performing picture quality enhancement on the second image by using the sixth image, to obtain a seventh image; performing fourth processing on the seventh image by using the ISP to obtain an eighth image, where the fourth processing includes image processing in the YUV domain, and the fourth processing does not include subsampling; and displaying, after video recording ends, a highlight image obtained by encoding the eighth image.

In another possible design manner of the sixth aspect, the first processing includes image processing in the RAW domain and image processing in the RGB domain.

In another possible design manner of the sixth aspect, the performing, by the electronic device, picture quality enhancement on the second image by using the sixth image includes: image fusion and/or image super-resolution; where the image super-resolution includes reference frame-based image super-resolution REF-SR.

According to a seventh aspect, this application provides an electronic device, where the electronic device includes a touchscreen, a memory, a display screen, one or more cameras, and one or more processors. The memory, the display screen, and the camera are coupled to the processor. The camera is configured to collect an image. The display screen is configured to display the image collected by the camera or an image generated by the processor. The memory stores computer program code, and the computer program code includes computer instructions. When the computer instructions are executed by the processor, the electronic device is enabled to perform the following steps: receiving a first operation of a user; where the first operation is used to trigger starting video recording; displaying a first interface in response to the first operation; where the first interface is a viewfinder interface on which the electronic device is recording a video, the first interface includes a preview image, and the preview image is obtained from a first image collected by a camera of the electronic device after the electronic device receives the first operation; selecting a second image from a first video stream; where the second image includes an image of a target object; and the first video stream is obtained by an ISP of the electronic device by performing first processing on a plurality of frames of first images, and the first processing includes subsampling; buffering, in a first buffer queue, the first image collected by the camera; where n frames of first images collected by the camera are buffered in the first buffer queue, n≥1, and n is an integer; using, as an input, m frames of first images corresponding to the second image in the n frames of first images, and running a preset original RAW domain image processing algorithm to obtain a third image; where the preset RAW domain image processing algorithm has a function of improving image quality; and m≥1, and m is an integer; performing third processing on the third image by using the ISP, to obtain a sixth image, and buffering the sixth image in a second buffer queue, where the third processing includes image processing in an RAW domain and image processing in an RGB domain, and the third processing does not include subsampling; generating a video recording file in response to an operation of ending video recording; where the video recording file includes an image generated from a plurality of frames of first images; determining a candidate image from the video recording file in response to a selection operation performed by the user on one frame of image in the video recording file; selecting a reference REF image corresponding to the candidate image from a plurality of frames of sixth images buffered in the second buffer queue, and performing picture quality enhancement on the candidate image by using the REF image to obtain a ninth image; performing fourth processing on the ninth image by using the ISP to obtain a tenth image, where the fourth processing includes image processing in the YUV domain, and the fourth processing does not include subsampling; and displaying a highlight image obtained by encoding the tenth image.

In a possible design manner of the seventh aspect, a detail page of the video recording file includes a second preset control; and the selection operation on one frame of image in the video recording file is a tap operation on the second preset control.

When the computer instructions are executed by the processor, the electronic device is enabled to perform the following steps: selecting, from the video recording file in response to a tap operation performed by the user on the second preset control in the detail page of the video recording file, an image corresponding to each frame of the sixth image buffered in the second buffer queue as the candidate image.

In another possible design manner of the seventh aspect, a playback interface of the video recording file includes a third preset control; and the selection operation on one frame of image in the video recording file is a tap operation on the third preset control.

When the computer instructions are executed by the processor, the electronic device is enabled to perform the following steps: in a process of playing the video recording file, using, in response to a tap operation performed by the user on the third preset control in the playback interface of the video recording file, one frame of image played by the electronic device when the user taps the third preset control as the candidate image.

In another possible design manner of the seventh aspect, when the computer instructions are executed by the processor, the electronic device is enabled to perform the following steps: in the process of playing the video recording file, using, in response to a pause playback operation and an enlarge image operation, one frame of image corresponding to the enlarge image operation as the candidate image, where the enlarge image operation is used to trigger the electronic device to enlarge one frame of image in the video recording file displayed by the electronic device when the electronic device pauses playing the video recording file.

In another possible design manner of the seventh aspect, when the computer instructions are executed by the processor, the electronic device is enabled to perform the following steps: in the process of playing the video recording file, receiving an adjustment operation performed by the user on a progress bar in the playback interface of the video recording file, and displaying an image in the video recording file according to a change of the progress bar; and after detecting that a finger of the user leaves the progress bar, using, as the candidate image, one frame of image in the video recording file corresponding to the progress bar when the finger of the user leaves the progress bar.

In another possible design manner of the seventh aspect, when the computer instructions are executed by the processor, the electronic device is enabled to perform the following steps: in the process of playing the video recording file, receiving an adjustment operation performed by the user on a progress bar in the playback interface of the video recording file, and displaying an image in the video recording file according to a change of the progress bar; and detecting that the finger of the user stays on the progress bar, where the progress bar keeps in a same position; recording duration in which the progress bar keeps in the same position; and when the duration in which the progress bar keeps in the same position is greater than a preset time threshold, using a frame of image in the video recording file corresponding to the progress bar as the candidate image; or detecting that the finger of the user stays on the progress bar, where the playback interface of the video recording file keeps displaying a same frame of image; recording duration in which the playback interface of the video recording file keeps displaying the same frame of image; and when the duration in which the playback interface of the video recording file keeps displaying the same frame of image is greater than a preset time threshold, using a corresponding frame of image in the video recording file as the candidate image.

In another possible design manner of the seventh aspect, when the computer instructions are executed by the processor, the electronic device is enabled to perform the following steps: in the process of playing the video recording file, selecting, in response to an operation of repeatedly viewing a segment in the video recording file by the user, one frame of image from the segment as the candidate image.

In another possible design manner of the seventh aspect, when the computer instructions are executed by the processor, the electronic device is enabled to perform the following steps: selecting a frame of image with highest definition in the segment as the candidate image.

According to an eighth aspect, this application provides a computer-readable storage medium, where the computer-readable storage medium includes computer instructions, and when the computer instructions are run on an electronic device, the electronic device is enabled to perform the method according to any one of the first aspect or the second aspect or the possible design manners of the first aspect or the second aspect.

According to a ninth aspect, this application provides a computer program product, where when the computer program product runs on a computer, the computer is enabled to perform the method according to any one of the first aspect or the second aspect or the possible design manners of the first aspect or the second aspect. The computer may be the foregoing electronic device.

It may be understood that for beneficial effects that can be achieved by the electronic device according to any one of the fourth aspect to the seventh aspect and the possible design manners thereof, the computer storage medium according to the eighth aspect, and the computer program product according to the ninth aspect, references may be made to the beneficial effects according to any one of the first aspect and the second aspect and the possible design manners thereof. Details are not described herein again.

BRIEF DESCRIPTION OF THE DRAWINGS

FIG. 6 is a flowchart of an image obtaining method according to an embodiment of this application;

FIG. 21 is a flowchart of another image obtaining method according to an embodiment of this application;

FIG. 25A and FIG. 25B are a flowchart of another image obtaining method according to an embodiment of this application;

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In description of the embodiments, unless otherwise described, "a plurality of" means two or more than two.

Currently, in a video recording process of an electronic device, an image sensor (Sensor) of the electronic device is controlled by exposure, so that images can be continuously output. Each frame of image is processed by using an image signal processor (ISP) or an image signal processing algorithm of the electronic device, and then encoded by using an encoder (ENCODER). In this way, a video file can be obtained. For the electronic device represented by a mobile phone, an original image output by the image sensor of the electronic device is usually an image in a Bayer format. Some image sensors can output images in formats such as RGGB, RGBW, CMYK, RYYB, and CMY. In the embodiments of this application, an example in which the image sensor of the mobile phone outputs the image in a Bayer format is used for description. It should be noted that the image sensor that output the images in formats such as RGGB, RGBW, CMYK, RYYB, and CMY, and another electronic device equipped with the image sensor are also applicable to the technical solution provided in the embodiment of this application.

RGGB is short for red green green blue, RGBW is short for red green blue white, CMYK is short for cyan magenta yellow black, RYYB is short for red yellow yellow blue, and CMY is short for cyan magenta yellow.

Figure 1:
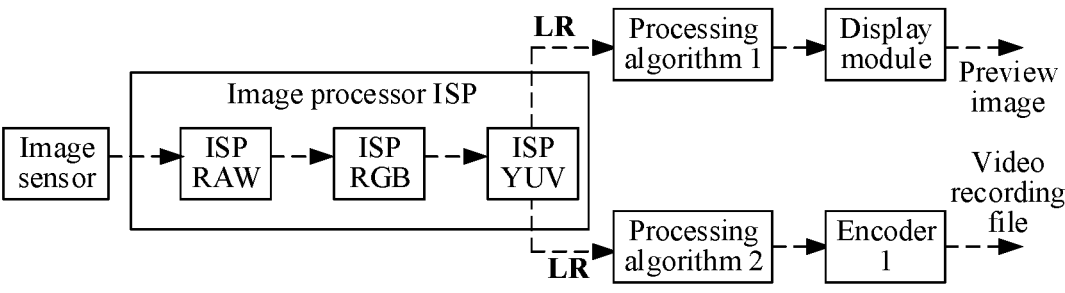
FIG. 1 is a flowchart of image processing in a video recording process.
Figure 2:
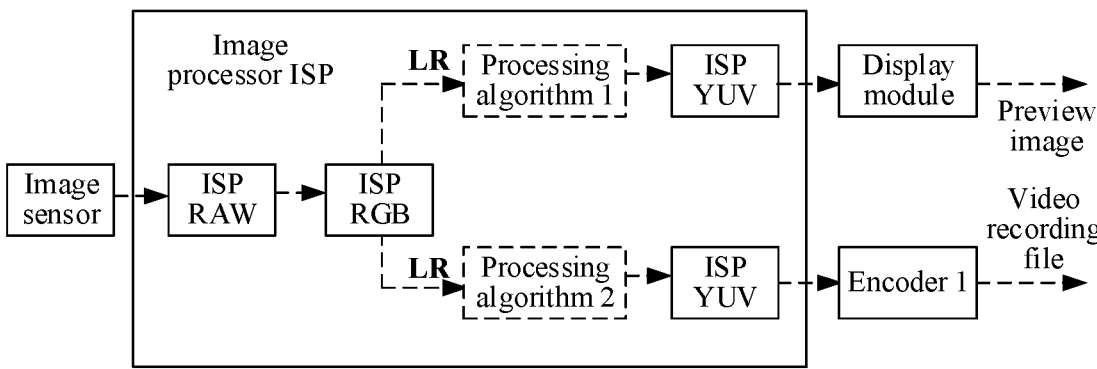
FIG. 2 is a flowchart of image processing in another video recording process.

FIG. 1 or FIG. 2 is a processing procedure of a preview image and a video recording file in a video recording process of a mobile phone. The preview image is an image that is finally used to be presented on a display screen to a user in the video recording process of the mobile phone. The video recording file refers to a video stream that is finally used to be stored, in a format of a video file, in the mobile phone for viewing by the user after video recording ends.

As shown in FIG. 1 or FIG. 2, ISP image processing of the mobile phone may be classified into processing in three image format domains: image processing in a RAW domain, image processing in an RGB domain, and image processing in a YUV domain.

The image processing in the RAW domain may include processing such as black level correction (BLC), linearization correction, lens shading correction (LSC), defect pixel correction (DPC), RAW denoising (Denoise), an automatic white balance (AWB), green imbalance correction (GIC), and chromatic aberration correction (CAC).

The image processing in the RGB domain may include: demosaicing (Demosiac), color correction CC, dynamic range control (DRC), Gamma correction, and RGB2YUV (RGB to YUV).

The image processing in the YUV domain may include: UV subsampling, color enhancement CE, spatial domain denoising YUVNF, color management 3DLUT, sharpening sharpness, and a scaling scalar.

It should be noted that classification of the "RAW domain", the "RGB domain", and the "YUV domain" in the ISP includes but is not limited to the foregoing division manner. For example, demosaicing (Demosiac) may be further included in the "RAW domain". This is not limited in this embodiment of this application.

In an implementation, as shown in FIG. 1, after an image sensor (Sensor) outputs an image, the ISP may perform the image processing in the "RAW domain", the "RGB domain", and the "YUV domain" on the image. After the image processing in the "YUV domain" is performed, the image may be divided into two data streams. One data stream is processed by using a processing algorithm 1 shown in FIG. 1, and then a display module performs encoding or format conversion to obtain and display a preview image. The other data stream is processed by using a processing algorithm 2 shown in FIG. 1, and then may be encoded by an encoder 1 to obtain a video recording file.

In an implementation, as shown in FIG. 2, after the image sensor (Sensor) outputs an image, the ISP may perform the image processing in the "RAW domain" and the "RGB domain" on the image. After the image processing in the "RGB domain" is performed, the image may be divided two data streams. One data stream is processed by using a processing algorithm 1 shown in FIG. 2, then the ISP performs the image processing in the "YUV domain" on an obtained data stream, and then a display module performs encoding or format conversion on an obtained data stream to obtain and display a preview image. The other data stream is processed by using a processing algorithm 2 shown in FIG. 2, then the ISP performs the image processing in the "YUV domain", and then encoding may be performed by an encoder 1 to obtain a video recording file.

The image processing based on the processing algorithm 1 and the processing algorithm 2 may be performed in the RGB domain, or may be performed in the YUV domain.

For example, in an example in which the image is processed by using the processing algorithm 1, after the ISP performs the image processing in "RGB domain" on the image, the ISP may process the image by using the processing algorithm 1 before the image is converted from the RGB format to the YUV format. Then, the ISP may convert the image that is processed by using the processing algorithm 1 into the YUV format, and then perform the image processing in "YUV domain" on the image.

For another example, still in the example in which the image is processed by using the processing algorithm 1, after the ISP performs the image processing in the "RGB domain" on the image, the ISP may first convert the image from the RGB format to the YUV format, and then process the image in the YUV format by using the processing algorithm 1. Then, the ISP may perform the image processing in "YUV domain" on an image that is processed by using the processing algorithm 1.

It should be noted that the processing algorithm 1 may also be referred to as a post-processing algorithm of the preview image, and the processing algorithm 2 may also be referred to as a post-processing algorithm of the video recording file. The processing algorithm 1 and the processing algorithm 2 may include processing functions such as anti-jitter processing, denoising processing, blurring processing, color adjustment, and brightness adjustment. The image output by the Sensor is the image in a Bayer format (referred to as a Bayer image). In FIG. 1 or FIG. 2, an input image of the ISP in the "RAW domain" is the image in the Bayer format (namely, the Bayer image), and an output image of the ISP in the "RAW domain" is an image in the RGB format (referred to as an RGB image). In FIG. 1 or FIG. 2, an input image of the ISP in the "RGB domain" is the image in the RGB format (namely, the RGB image), and an output image of the ISP in the "RGB domain" is an image in the YUV format (referred to as a YUV image). In FIG. 1 or FIG. 2, an input image of the ISP in the "YUV domain" is the image in the YUV format (namely, the YUV image), and an output image of the ISP in the "YUV domain" may be encoded (ENCODE) to obtain the preview image or the video recording file.

Bayer, RGB, and YUV are three expression formats of an image. For detailed descriptions of the Bayer image, the RGB image, and the YUV image, refer to related content in the conventional technology. Details are not described herein.

It should be noted that the Sensor outputs the image, the ISP and the encoder (namely, the ENCODER, for example, an encoder and the encoder 1 of the display module) process the image, which can be used for video recording. Therefore, data streams (such as a data stream of the video recording file and a data stream of the preview image) in a whole process in which the sensor outputs the image and the ISP and the encoder (ENCODER) process the image can be referred to as the video stream.

It should be noted that a manner in which the mobile phone processes the image in the video recording process to obtain the preview image and the video recording file includes but is not limited to the manners shown in FIG. 1 and FIG. 2. Other processing manners are not described in this embodiment of this application again. In the following embodiment, the processing manner shown in FIG. 1 is used as an example to describe a method in the embodiments of this application.

In a video recording process, the mobile phone may collect some highlight pictures. A user may expect the mobile phone to capture the highlight pictures and save the highlight pictures as photos for displaying to the user. However, in the video recording process of the mobile phone, a large quantity of images (for example, 30 frames of images) need to be processed per second. In this case, an operation resource and time that are reserved for each frame of image are limited. Therefore, the mobile phone can usually use a hardware processing module of the ISP to process the video stream (such as a data stream of the video recording file and a data stream of the preview image) in a simple processing manner, instead of using a complex algorithm to improve the picture quality (for example, denoising and brightening). Such an image processing effect can only meet a video requirement. However, photographing requires higher picture quality. Consequently, capturing the image in the video stream cannot obtain an image that the user is satisfied with.

In addition, considering factors such as power consumption and storage space, resolution selected for video recording (namely, recording a video) is lower than resolution of an image output by the Sensor. Therefore, an image output by the ISP to the Sensor is subsampled in the video recording process. Generally, the ISP may subsample the image frame in the video stream before performing image processing in the YUV domain on the video stream (such as a preview stream or a video stream). Subsampling may also be referred to as downsampling. Subsampling of the image can shrink the image and reduce resolution of the image. For example, a quantity of pixels of an image before subsampling may be 4000*3000, and a quantity of pixels of an image after subsampling may be 2000*1500. In this way, as shown in FIG. 1 or FIG. 2, the image output by the "RAW domain" of the ISP is a low-resolution image recorded as (low resolution, LR). However, a highlight image that the user needs to obtain in the video recording process is a high resolution image.

Based on this, embodiments of this application provide an image obtaining method and an electronic device, so as to automatically select and present a highlight image in a video record to a user, and improve image quality (for example, resolution and picture quality) of the highlight image.

Figure 3:
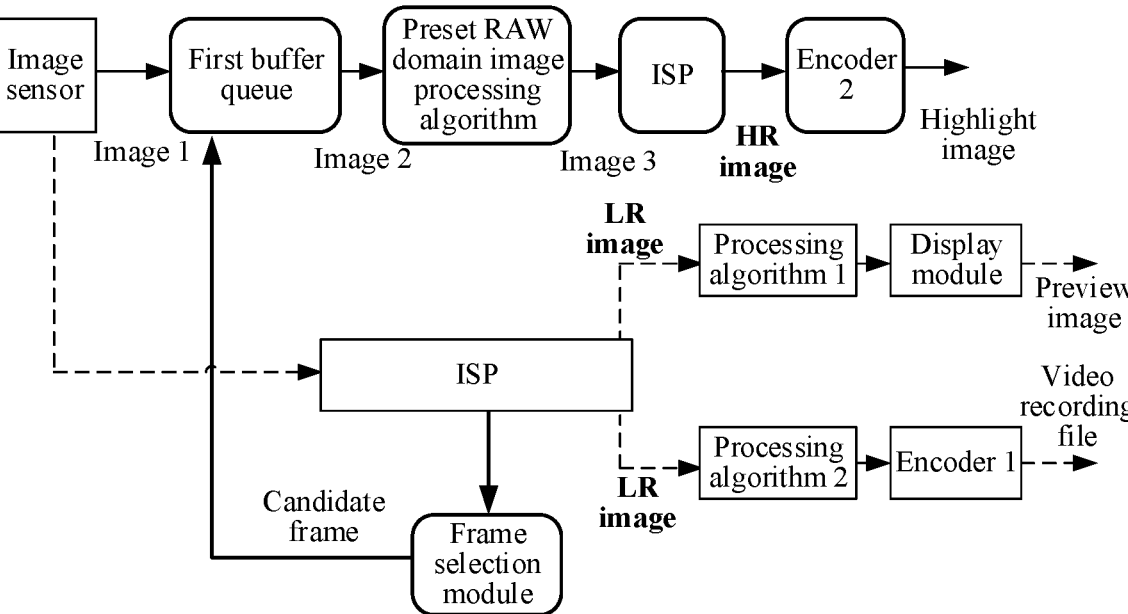
FIG. 3 is a schematic block diagram of an image obtaining method according to an embodiment of this application.

An image output by an image sensor (Sensor) of the electronic device (such as a mobile phone) may be processed by an ISP to obtain a video stream (such as a data stream of a video recording file and a data stream of a preview image). In this solution, as shown in FIG. 3, a frame selection module of the electronic device may select a candidate frame from a video stream processed by the ISP (such as "RAW domain" and "RGB domain" of the ISP, referred to as ISP RAW+RGB for short), that is, a candidate highlight frame (also referred to as a highlight image). For the highlight frame or a definition of the highlight frame, refer to descriptions in the following embodiments. Details are not described herein again.

As shown in FIG. 3, the electronic device may buffer a Bayer image (that is, an image 1) exposed and output by the image sensor (Sensor) in a first buffer queue (Buffer). A plurality of frames of Bayer images may be buffered in the first buffer queue. In this way, even if there is a delay from "outputting the Bayer image corresponding to the candidate frame by the Sensor" to "selecting the candidate frame by the frame selection module", the Bayer image corresponding to the candidate frame may be buffered in the first buffer queue. In this way, the mobile phone may obtain the Bayer image corresponding to the candidate frame (an image 2 shown in FIG. 3) from the first buffer queue.

In addition, as shown in FIG. 3, the electronic device may further process the image 2 by using a preset RAW domain image processing algorithm to obtain an image 3, which helps improve picture quality of a highlight image. With reference to the foregoing description, it can be learned that: the image LR in the video stream corresponding to the preview image and the video recording file is subsampled. However, the image HR obtained by the ISP by processing the image 3 shown in FIG. 3 is not subsampled. Therefore, the highlight image obtained by encoding the image HR by the encoder 2 is a high-resolution image. Finally, the electronic device may display the highlight image shown in FIG. 3 to the user after video recording ends.

In conclusion, by using this solution, the electronic device may automatically select and present the highlight image in the video record to the user, and image quality (such as resolution and picture quality) of the highlight image can be improved.

The preset RAW domain image processing algorithm is a deep learning network for picture quality enhancement in the RAW domain. The preset RAW domain image processing algorithm may also be referred to as a preset picture quality enhancement algorithm, a preset picture quality enhancement algorithm model, or a preset RAW domain AI model.

For example, the preset RAW domain image processing algorithm may run in a graphics processing unit (GPU) and a neural-network processing unit (NPU) of the electronic device or another processor that has a capability of running a neural network model. Before running the preset RAW domain image processing algorithm, any one of the above processors may load the preset RAW domain image processing algorithm from a memory.

In some embodiments, the preset RAW domain image processing algorithm may be a software image processing algorithm. The preset RAW domain image processing algorithm may be a software algorithm in an algorithm library at a hardware abstraction layer (HAL) of the mobile phone.

In some other embodiments, the preset RAW domain image processing algorithm may be a hardware image processing algorithm. The preset RAW domain image processing algorithm may be the hardware image processing algorithm implemented by invoking a "RAW domain" image processing algorithm capability in the ISP. Alternatively, the preset RAW domain image processing algorithm may be the hardware image processing algorithm implemented by invoking "RAW domain" and "RGB domain" image processing algorithm capabilities in the ISP. Alternatively, the preset RAW domain image processing algorithm may be the hardware image processing algorithm implemented by invoking "RAW domain", "RGB domain", and "YUV domain" image processing algorithm capabilities in the ISP.

It should be noted that, the preset RAW domain image processing algorithm may also be referred to as a preset image processing algorithm. In this embodiment of this application, the reason why the algorithm is referred to as the preset RAW domain image processing algorithm is that an image in the RAW domain is input to the preset RAW domain image processing algorithm. The preset RAW domain image processing algorithm may output an image in the RAW domain, or may output an image in the RGB domain.

The encoder, the encoder 1, and the encoder 2 in the display module shown in FIG. 1 or FIG. 2 may be three different encoders. The mobile phone may perform encoding or format conversion by using the three different encoders to obtain the preview image, the video recording file, and the captured image. Alternatively, the encoder, the encoder 1, and the encoder 2 in the display module may be a same encoder. One encoder may include a plurality of encoding units. The mobile phone may separately perform encoding or format conversion by using three different encoding units in one encoder to obtain the preview image, the video recording file, and the captured image. Alternatively, the encoder and the encoder 1 in the display module may be two different encoding units in a same encoder, and the encoder 2 may be another encoder.

Encoding manners of different encoders may be the same or different. Encoding manners of different encoding units of the same encoder may be the same or different. Therefore, image formats output by the encoder and the encoder 1 in the display module may be the same or different. For example, images output by the encoder and the encoder 1 in the display module may be images in any format, for example, joint photographic experts group (JPEG) or tag image file format (TIFF).

For example, the electronic device in the embodiments of this application may be a device including a camera, such as a mobile phone, a tablet computer, a smartwatch, a desktop computer, a laptop computer, a handheld computer, a notebook computer, an ultra-mobile personal computer (UMPC), a netbook, a cellular phone, a personal digital assistant (PDA), or an augmented reality (AR)\ virtual reality (VR) device. A specific form of the electronic device is not particularly limited in the embodiments of this application.

Figure 4:
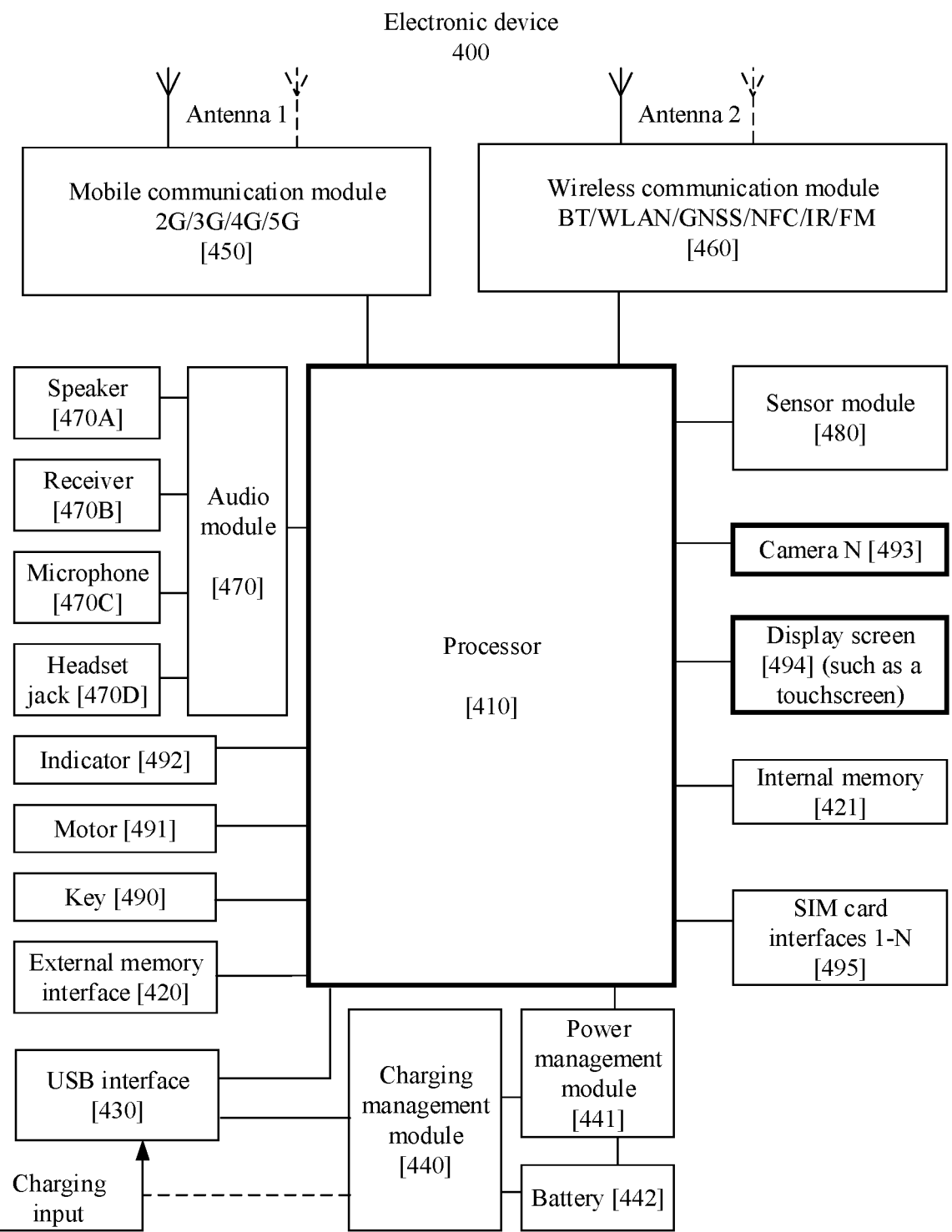
FIG. 4 is a schematic diagram of a hardware structure of a mobile phone according to an embodiment of this application.

The following describes implementations of the embodiments of this application in detail with reference to the accompanying drawings. FIG. 4 is a schematic structural diagram of an electronic device 400 according to an embodiment of this application. As shown in FIG. 4, an electronic device 400 may include: a processor 410, an external memory interface 420, an internal memory 421, a universal serial bus (USB) interface 430, a charging management module 440, a power management unit 441, a battery 442, an antenna 1, an antenna 2, a mobile communication module 450, a wireless communication module 460, an audio module 470, a speaker 470A, a phone receiver 470B, a microphone 470C, a headset jack 470D, a sensor module 480, a key 490, a motor 491, an indicator 492, a camera 493, a display screen 494, a subscriber identity module (SIM) card interface 495, and the like.

The sensor module 480 may include sensors, for example, a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the schematic structure in this embodiment constitutes no specific limitation on the electronic device 400. In some other embodiments, the electronic device 400 may include more or fewer components than those shown in the figure, or some components may be combined, or some components may be split, or components are arranged in different manners. The components shown in the figure may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 400. The controller may generate an operating control signal according to an instruction operation code and a sequence signal, to complete control of fetching and executing an instruction.

A memory may be further disposed in the processor 410, and is configured to store instructions and data. In some embodiments, the memory in the processor 410 is a cache memory. The memory may store an instruction or data that has been used or cyclically used by the processor 410. If the processor 410 needs to use the instruction or the data again, the processor 410 may directly invoke the instruction or the data from the memory, which avoids repeated access and reduces a waiting time of the processor 410, thereby improving system efficiency.

In some embodiments, the processor 410 may include one or more interfaces. It may be understood that a schematic interface connection relationship between the modules in the embodiments is merely an example for description, and constitutes no limitation on the structure of the electronic device 400. In some other embodiments, the electronic device 400 may alternatively use an interface connection manner different from that in the foregoing embodiment, or use a combination of a plurality of interface connection manners.

The charging management module 440 is configured to receive a charging input from a charger. The charging management module 440 may supply power to the electronic device by using the power management module 441 while charging the battery 442.

The power management module 441 is configured to connect the battery 442, the charging management module 440, and the processor 410. The power management module 441 receives an input of the battery 442 and/or the charging management module 440, to supply power to the processor 410, the internal memory 421, an external memory, the display screen 494, the camera 493, the wireless communication module 460, and the like.

A wireless communication function of the electronic device 400 may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. In some embodiments, in the electronic device 400, the antenna 1 and the mobile communication module 450 are coupled, and the antenna 2 and the wireless communication module 460 are coupled, so that the electronic device 400 can communicate with a network and another device by using a wireless communication technology.

The electronic device 400 implements a display function by using the GPU, the display screen 494, the application processor, and the like. The GPU is a microprocessor for image processing and is connected to the display screen 494 and the application processor. The GPU is configured to perform mathematical and geometric calculation, and is configured to render graphics. The processor 410 may include one or more GPUs, and the GPU executes a program instruction to generate or change display information.

The display screen 494 is configured to display an image, a video, and the like. The display screen 494 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, and quantum dot light emitting diodes (QDLED).

The electronic device 400 may implement a photographing function by using the ISP, the camera 493, the video codec, the GPU, the display screen 494, the application processor, and the like.

The ISP is configured to process data fed back by the camera 493. For example, during photographing, a shutter is open, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may further perform algorithm optimization on noise, brightness, and a skin tone of the image. The ISP may further optimize parameters such as exposure and a color temperature of a photographing scenario. In some embodiments, the ISP may be arranged in the camera 493.

The camera 493 is configured to capture a static image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into a standard image signal in a format such as RGB or YUV. In some embodiments, the electronic device 400 may include N cameras 493, where N is a positive integer greater than 1.

The digital signal processor is configured to process a digital signal, and can process another digital signal in addition to the digital image signal. For example, when the electronic device 400 performs frequency selection, the digital signal processor is configured to perform Fourier transform and the like on frequency energy.

The video encoder and decoder is configured to compress or decompress a digital video. The electronic device 400 may support one or more video codecs. In this way, the electronic device 400 may play or record videos in a plurality of encoding formats, for example, moving picture experts group (moving picture experts group, MPEG)1, MPEG2, MPEG3, and MPEG4.

The NPU is a neural-network (NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 400, for example, image recognition, facial recognition, voice recognition, and text understanding.

The external memory interface 420 may be configured to connect to an external memory card, for example, a Micro SD card, to expand a storage capability of the electronic device 400. The external memory card communicates with the processor 410 through the external memory interface 420, to implement a data storage function, storing a file such as a music or a video in the external storage card.

The internal memory 421 may be configured to store computer executable program code, and the executable program code includes instructions. The processor 410 runs the instruction stored in the internal memory 421, to perform various function applications and data processing of the electronic device 400. For example, in this embodiment of this application, the processor 410 may perform the instructions stored in the internal memory 421, and the internal memory 421 may include a program storage area and a data storage area.

The program storage area may store an operating system, an application required by at least one function (such as a voice playing function and an image playing function), and the like. The data storage area may store data (for example, audio data and an address book) and the like created when the electronic device 400 is used. In addition, the internal memory 421 may include a high-speed random access memory, and may further include a non-volatile memory, for example, at least one disk storage device, a flash memory device, or a universal flash storage (AFS).

The electronic device 400 may implement an audio function by using the audio module 470, the speaker 470A, the receiver 470B, the microphone 470C, the headset jack 470D, the application processor, for example, music playing and sound recording.

The key 490 includes a power key, a volume key, and the like. The motor 491 may generate a vibration prompt. The indicator 492 may be an indicator light, and may be configured to indicate a charging state or a battery change, or may be further configured to indicate a message, a missed call, a notification, or the like.

The SIM card interface 495 is configured to connect to a SIM card. The SIM card may be inserted into the SIM card interface 495 or plugged from the SIM card interface 495, to come into contact with or be separated from the electronic device 400. The electronic device 400 may support 1 or N SIM card interfaces, N being a positive integer greater than 1. The SIM card interface 495 may support a Nano SIM card, a Micro SIM card, a SIM card, and the like.

Figure 5:
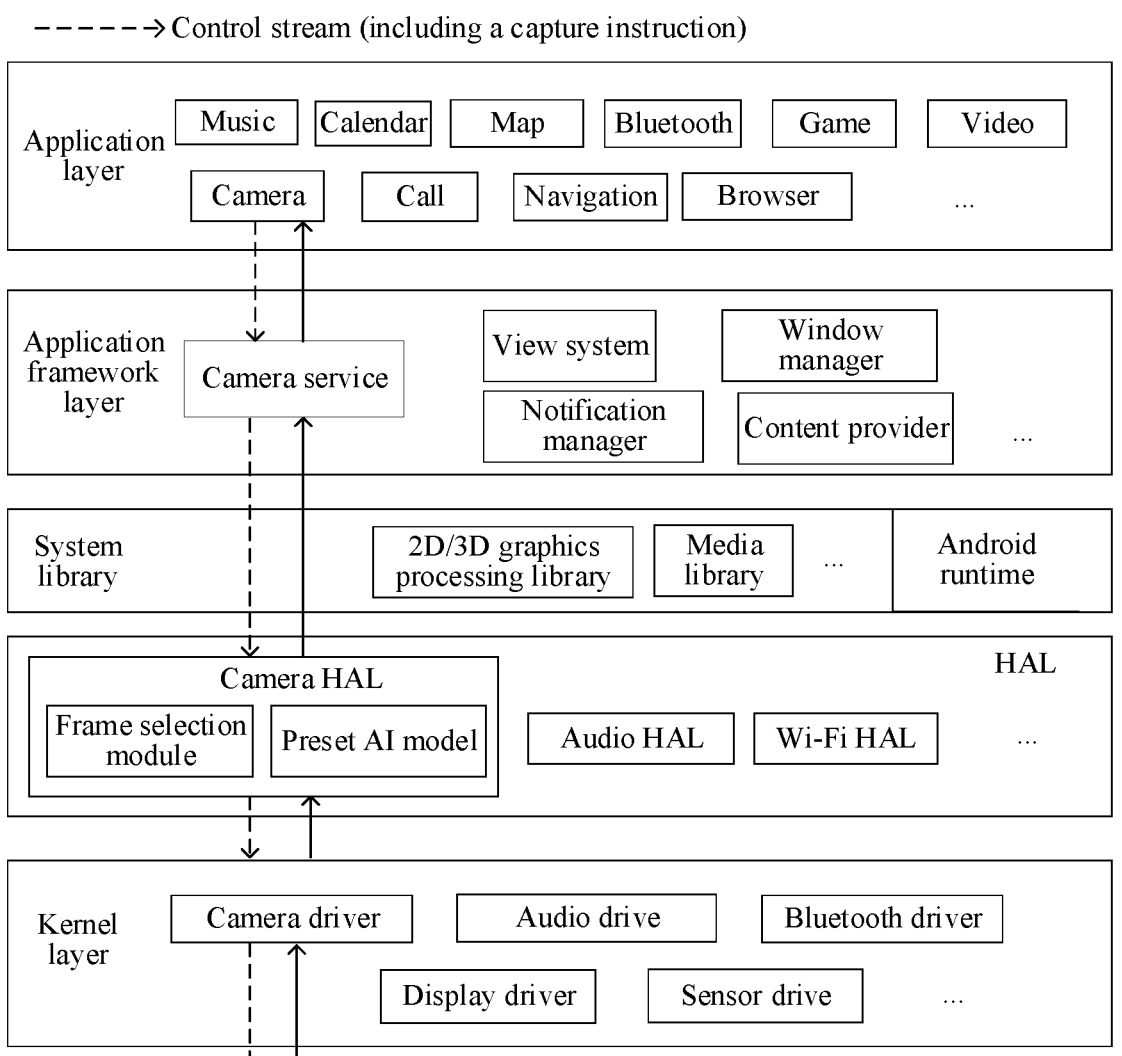
FIG. 5 is a schematic diagram of a software architecture of a mobile phone according to an embodiment of this application.

Methods in the following embodiments may all be implemented in the electronic device 400 having the foregoing hardware structure. In the following embodiments, an example in which the electronic device 400 is the mobile phone is used to describe the method in the embodiments of this application. FIG. 5 is a block diagram of the software structure of the mobile phone in this embodiment of this application.

In the layered architecture, software is divided into several layers, and each layer has a clear role and task. The layers communicate with each other through a software interface. In some embodiments, an Android™ system is divided into five layers: an application layer, an application framework layer, an Android runtime and a system library, a hardware abstraction layer (HAL), and a kernel layer from top to bottom. It should be understood that the Android system is used as an example for description in this specification. In another operating system (for example, a Harmony™ system or an IOS™ system), the solutions of this application can be implemented, provided that functions implemented by functional modules are similar to those implemented in the embodiments of this application.

The application layer may include a series of application packages.

As shown in FIG. 5, applications such as Phone, Memo, Browser, Contacts, Gallery, Calendar, Map, Bluetooth, Music, Video, and SMS may be installed at the application layer.

In this embodiment of this application, an application with a photographing function, for example, a camera application, may be installed at the application layer. Certainly, when another application needs to use the photographing function, the camera application may be invoked to implement the photographing function.

The application framework layer provides an application programming interface (API) and a programming framework for an application at the application layer. The application framework layer includes some predefined functions.

For example, the application framework layer may include a window manager, a content provider, a view system, a resource manager, and a notification manager. This is not limited in this embodiment of this application.

For example, the window manager is configured to manage a window program. The window manager may obtain a size of the display screen, determine whether there is a status bar, lock the screen, take a screenshot, and the like. The content provider is configured to store and obtain data and make the data accessible to an application. The data may include a video, an image, an audio, calls that are made and received, a browsing history and bookmarks, an address book, and the like. The view system may be configured to construct a display interface of an application. Each display interface may be composed of one or more controls. Generally, the control may include interface elements such as icon, button, menu, tab, text box, dialog box, status bar, navigation bar, and widget (Widget). The resource manager provides various resources such as a localized character string, an icon, an image, a layout file, and a video file for an application. The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the mobile phone vibrates, or the indicator light blinks.

As shown in FIG. 5, the Android runtime includes a kernel library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, For example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports playback and recording in a plurality of commonly used audio and video formats, and static image files. The media library may support a plurality of audio and video encoding formats, for example, MPEG4, H.264, MP3, AAC, AMR, JPG, and PNG. The three-dimensional graphics processing library is used to implement three-dimensional graphics drawing, image rendering, composition, layer processing, and the like. The 2D graphics engine is a drawing engine for 2D drawing.

The kernel layer is located below the HAL, and is a layer between hardware and software. The kernel layer includes at least a display driver, a camera driver, an audio driver, and a sensor driver. This is not limited in this embodiment of this application.

In this embodiment of this application, still as shown in FIG. 5 and using the camera application as an example, a camera service (Camera Service) may be disposed at the application framework layer. The camera application may enable the Camera Service by invoking a preset API. During running, the Camera Service can interact with a Camera HAL at the hardware abstraction layer (HAL). The Camera HAL is responsible for interacting with a hardware device (for example, the camera) that implements a photographing function and that is in the mobile phone. On the one hand, the Camera HAL hides implementation details (for example, a specific image processing algorithm) of a related hardware device. In addition, the camera HAL can provide an interface for invoking the related hardware device to the Android system.

For example, during running, the camera application can send, to the Camera Service, a related control command (for example, a preview, zooming in, photographing, video recording, or capture instruction) delivered by a user. On the one hand, the Camera Service can send the received control command to the Camera HAL, so that the Camera HAL can invoke the camera driver at the kernel layer based on the received control command. The camera driver drives hardware devices such as the camera to collect image data in response to the control command. For example, the camera may transmit, at a specific frame rate, the data of each frame of the collected image to the Camera HAL by using the camera driver. For a transfer process of the control command in the operating system, refer to a detailed transfer process of a control flow in FIG. 5.

On the other hand, after receiving the control command, the Camera Service can determine a photographing policy at this time based on the received control command, and a specific image processing task that needs to be executed on the collected image data is set in the photographing policy. For example, in a preview mode, the Camera Service may set an image processing task 1 in the photographing policy to implement a face detection function. For another example, if the user enables a facial beautification function in the preview mode, the Camera Service may further set an image processing task 2 in the photographing policy to implement the facial beautification function. Further, the Camera Service may send the determined photographing policy to the Camera HAL.

After receiving the data of each frame of image collected by the camera, the Camera HAL may execute a corresponding image processing task on the image data according to the photographing policy delivered by the Camera Service, to obtain each frame of photographed image obtained after image processing. For example, the Camera HAL may execute the image processing task 1 on the received data of each frame of image according to a photographing policy 1, to obtain each corresponding frame of photographed image. After the photographing policy 1 is updated to a photographing policy 2, the Camera HAL may execute the image processing task 2 on the received data of each frame of image according to the photographing policy 2, to obtain each corresponding frame of photographed image.

Subsequently, the Camera HAL can report each frame of photographed image obtained after the image processing to the camera application by using the Camera Service. The camera application can display each frame of photographed image on the display interface, or the camera application saves each frame of photographed image in a form of a photo or a video in the mobile phone. For a transfer process of the photographed image in the operating system, refer to a detailed transfer process of a data stream in FIG. 5.

With reference to FIG. 5, this embodiment of this application describes an operating principle for implementing the method in the embodiments of this application at each software layer in the mobile phone. When running in a video recording mode, the camera application may send a capture instruction delivered by the user to the Camera Service. In the video recording mode, the Camera HAL may invoke, based on the previously received video recording instruction, the camera driver at the kernel layer. The camera driver drives the hardware devices such as the camera to collect the image data in response to the video recording instruction. For example, the camera may transmit, at a specific frame rate, the data of each frame of the collected image to the Camera HAL by using the camera driver. A data stream that includes each frame of image transmitted by the camera driver based on the video recording instruction to the Camera HAL may be the video stream (such as a preview stream and a video recording stream) described in the embodiments of this application. The HAL includes a frame selection module. The Camera HAL may invoke the frame selection module to select a candidate frame (that is, a highlight frame) from the first buffer queue.

In this embodiment of this application, each frame of image (such as the image 1 shown in FIG. 3) that is exposed and output by the image sensor (Sensor) of the camera may be buffered in the first buffer queue (Buffer). The Camera HAL may invoke the frame selection module to select, from the first buffer queue, a frame of image (such as the image 2 shown in FIG. 3) that matches the candidate frame (that is, the highlight frame). The first buffer queue may be disposed at any layer of a mobile phone software system. For example, the first buffer queue may be provided in a memory area that is accessed by the Camera HAL by using a software interface.

The HAL further includes a preset RAW domain image processing algorithm. The Camera HAL may invoke the preset RAW domain image processing algorithm to process the image 2 that matches the foregoing candidate frame to obtain the processed image frame (the image 3 shown in FIG. 3). Then, as shown in FIG. 3, the ISP may process the image 3 to obtain a high-resolution image, which is recorded as (high resolution, HR). An encoder 2 may encode the HR to obtain a highlight image. After video recording ends, the mobile phone can display the highlight image to the user.

An embodiment of this application provides an image obtaining method. The method may be applied to a mobile phone, and the mobile phone includes a camera.

In an embodiment of this application, the method may be applied to a video recording process of the mobile phone. During video recording of the mobile phone, the mobile phone can automatically select a highlight image in a video record and present the highlight image to the user after video recording ends. An action of automatically selecting the highlight image in the video record is invisible to the user. After video recording of the mobile phone ends, not only a recorded video can be presented to the user, but also the highlight image in the video record can be presented, so as to achieve an effect of Magic Take. Specifically, as shown in FIG. 6, the method may include S601 to S607.

S601: The mobile phone receives a first operation of a user, where the first operation is used to trigger the mobile phone to start to record a video.

Figure 7:
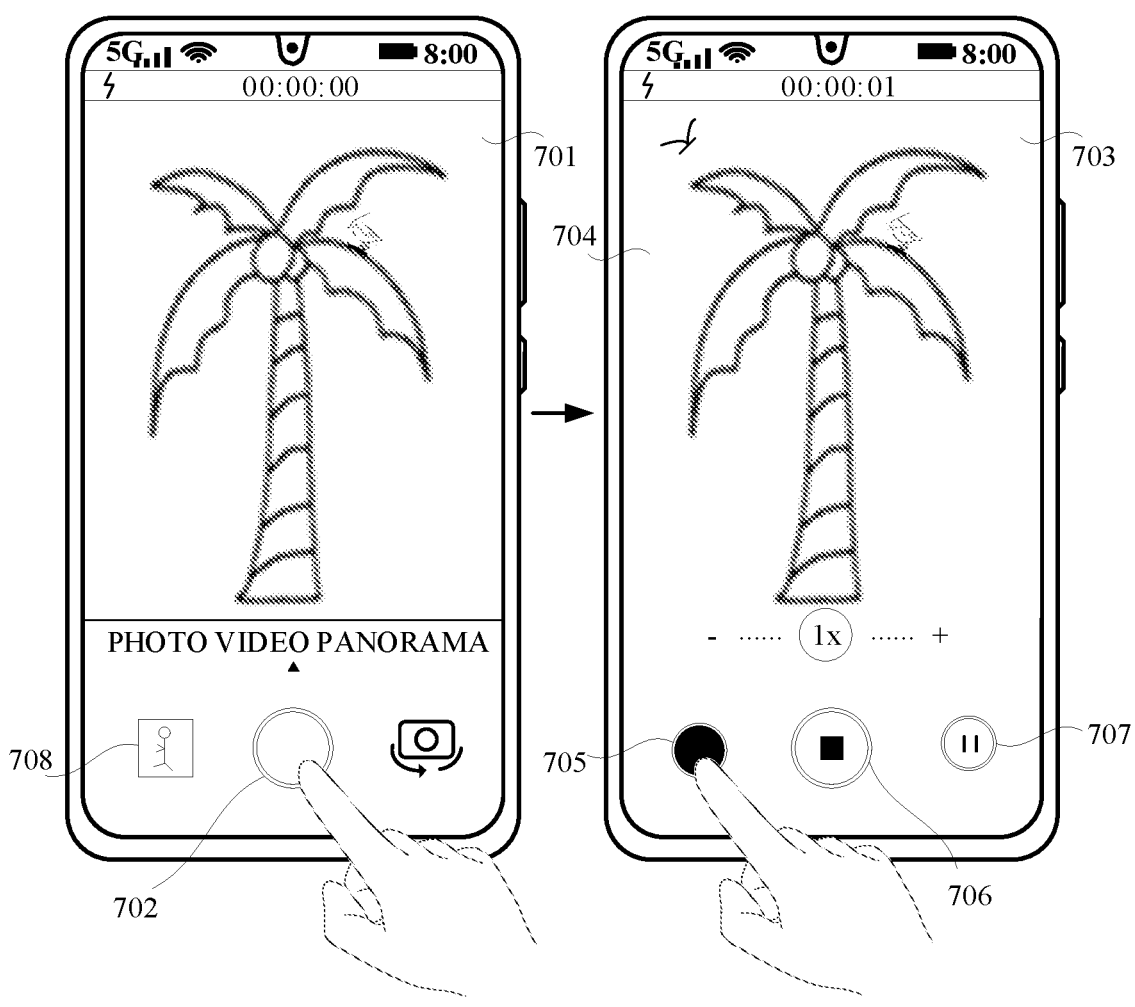
FIG. 7 is a schematic diagram of a display interface of a mobile phone during video recording according to an embodiment of this application.

For example, the mobile phone may display a video viewfinder interface 701 shown in FIG. 7. The video viewfinder interface 701 is a viewfinder interface before the mobile phone starts recording. The video viewfinder interface 701 includes a "start video recording" button 702. The first operation may be a tap operation performed by the user on the "start video recording" button 702 to trigger the mobile phone to start to record a video.

S602: The mobile phone displays the first interface in response to the first operation, where the first interface is the viewfinder interface on which the mobile phone is recording the video. The first interface includes a preview image, and the preview image is obtained from a first image collected by the camera of the mobile phone after the mobile phone receives the first operation.

For example, that the first operation is the tap operation performed by the user on the "start video recording" button 702 is used as an example. The mobile phone responds to the tap operation performed by the user on the "start video recording" button 702, so that a display screen of the mobile phone may display a first interface 703 shown in FIG. 7. The first interface 703 is the viewfinder interface on which the mobile phone is recording the video. As shown in FIG. 7, the first interface 703 includes a preview image 704. The preview image 704 is obtained from the first image collected by the camera of the mobile phone after the mobile phone receives the first operation.

This embodiment of this application describes a method for obtaining the preview image 704 based on the first image by the mobile phone. After the camera of the mobile phone collects the first image, and before the mobile phone displays the first interface, the mobile phone may use the ISP of the mobile phone, and sequentially perform RAW image processing, RGB image processing, and YUV image processing on the first image to obtain the preview image 704. It should be noted that an ISP of the mobile phone may perform image processing in the RAW domain, image processing in an RGB domain, and image processing in a YUV domain on each frame of first image collected by the camera.

Figure 8A:
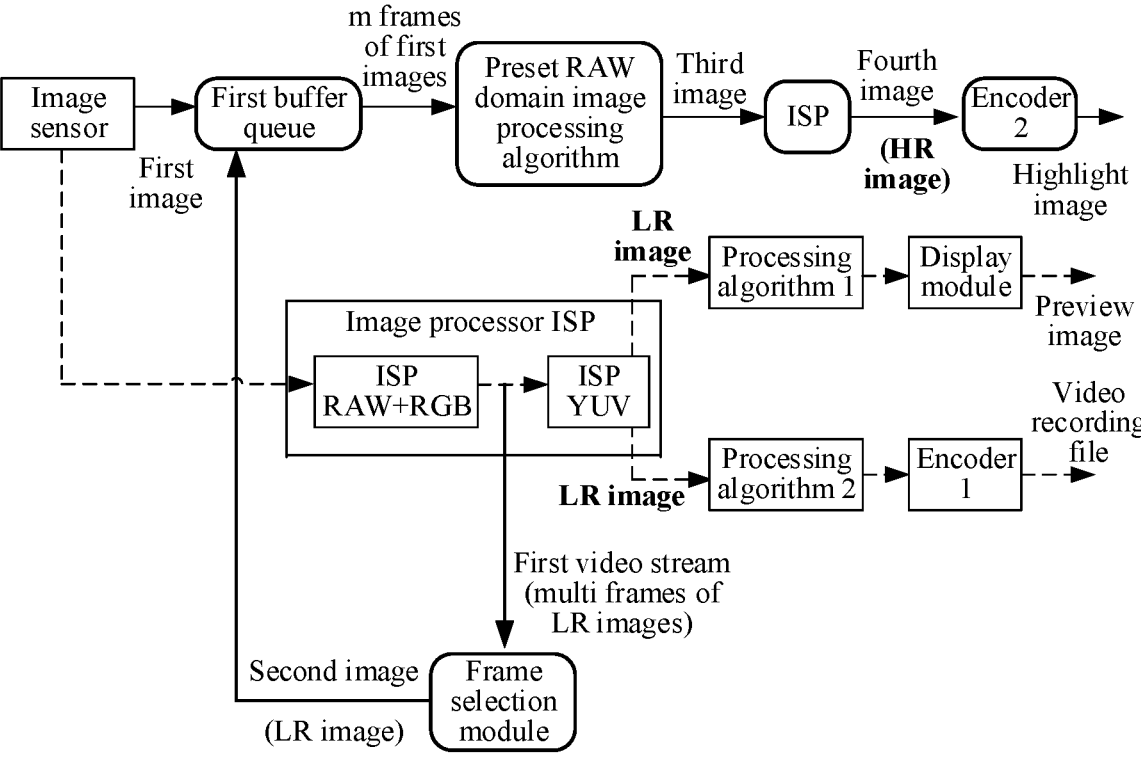
FIG. 8A is a schematic block diagram of another image obtaining method according to an embodiment of this application.

For example, FIG. 8A is a schematic diagram of an image processing principle in a video recording process according to an embodiment of this application. For the method for obtaining the preview image 704 based on the first image by the mobile phone, refer to a processing method of the "preview image" shown in FIG. 8A.

As shown in FIG. 8A, an image sensor (Sensor) of the mobile phone is controlled by exposure, so that Bayer images (that is, the first image) can be continuously output. The ISP of the mobile phone performs the image processing in the RAW domain on each frame of Bayer image (that is, the first image) to obtain an RGB image, and the ISP performs the image processing in the RGB domain on the RGB image to obtain a YUV image. The YUV image is processed by a processing algorithm 1, and then the ISP performs image processing in the YUV domain, and then sends the image to the encoder of the display module for coding or format conversion, to obtain the preview image 704. The plurality of frames of preview images 704 processed may form a segment of video stream that can be previewed.

In a processing procedure of the preview image, for detailed descriptions of the image processing in the RAW domain, the image processing in the RGB domain, and the image processing in the YUV domain, reference may be made to related descriptions in the foregoing embodiments. Details are not described herein again. For a manner of processing the video recording file in FIG. 8A, refer to the descriptions of the manner of processing the video recording file in the foregoing embodiments. Details are not described herein again.

In some embodiments, as shown in FIG. 7, the first interface 703 further includes a snapshot shutter 702. The snapshot shutter 702 is configured to trigger the mobile phone to capture an image to obtain a photo. Specifically, the snapshot shutter 702 is configured to trigger the mobile phone to capture, in a video recording process, the image to obtain the photo. It can be figured out that, in a process of recording a video (namely, video recording), the mobile phone may collect some highlight pictures. In the video recording process of the mobile phone, a user may expect the mobile phone to capture the highlight picture and save the highlight pictures as photos for displaying to the user. The user taps the snapshot shutter 702 to implement a function of shooting a highlight image in the video recording process. In this embodiment, in the video recording process of the mobile phone, even if a tap operation performed by the user on the snapshot shutter 702 is not received, the mobile phone may automatically select and present a highlight image in the video record to the user. Specifically, after S602, the method in this embodiment of this application may further include S603-S607.

In some other embodiments, the first interface 703 may not include the snapshot shutter 702. During the video recording process of the mobile phone, the mobile phone can automatically select and present the highlight image in the video record to the user. Specifically, after S602, the method in this embodiment of this application may further include S603-S07.

To ensure that the mobile phone can automatically select and present the highlight image in the video record to the user, the mobile phone may buffer the Bayer image exposed and output by the Sensor in the first buffer queue buffer (Buffer). In this case, even if there is delay duration from receiving the capture operation of the user to receiving the capture instruction by a snapshot program, When the capture operation of the user is received, the Bayer image output by the Sensor can be further buffered in the first buffer queue. In this way, the mobile phone can obtain the frame of image from the first buffer queue. Specifically, in response to the first operation, the mobile phone may further perform S603.

S603: The mobile phone buffers, in the first buffer queue, the first image collected by the camera, where the n frames of first images collected by the camera are buffered in the first buffer queue, n≥1, and n is an integer.

Figure 9:
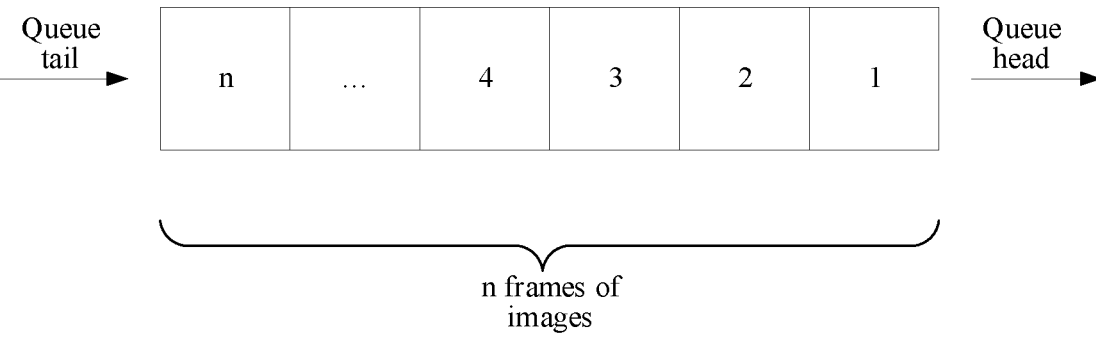
FIG. 9 is a schematic diagram of a first buffer queue Buffer according to an embodiment of this application.

For example, in response to the first operation, the mobile phone may buffer, in a first buffer queue buffer (Buffer) shown in FIG. 8A, the first image collected by the camera. For example, the n frames of first images collected by the camera may be buffered in the first buffer queue according to a first in first out rule. As shown in FIG. 9, an enqueuing operation that is used to insert the first image may be performed at a queue tail of the first buffer queue, and a dequeuing operation that is used to delete the first image may be performed at a queue head of the first buffer queue. When the n frames of first images are buffered in the first buffer queue, each time a frame of first image is inserted at the queue tail of the first buffer queue, a frame of first image is deleted at the queue head of the first buffer queue.

In some embodiments, n may be equal to 1. In this case, one frame of first image may be buffered in the first buffer queue. In this way, when the mobile phone performs S605, only one frame of first image can be input to a preset RAW domain image processing algorithm.

In some other embodiments, n may be greater than 1. In this case, a plurality of frames of first images may be buffered in the first buffer queue. In this way, when the mobile phone performs S605, one frame of first image or a plurality of frames of first images can be input to the preset RAW domain image processing algorithm. That the plurality of frames of first images are input to the preset RAW domain image processing algorithm may play a role of picture quality enhancement on a reference frame. This makes it easy to obtain information such as noise and a texture, to further improve picture quality of an image output by the preset RAW domain image processing algorithm.

For example, n may be a preset positive integer. Assuming that the Sensor can expose a frames of Bayer images per second, and the delay duration shown in FIG. 3 is b seconds, the sensor can expose the b/(1/a)=a×b frames of Bayer images within the delay duration b seconds. n may be an integer greater than or equal to a×b.

S604. The mobile phone selects a second image from the first video stream. The second image includes an image of a target object. The first video stream is obtained by an ISP of the mobile phone by performing first processing on a plurality of frames of first images, and the first processing includes subsampling.

Specifically, the first video stream may be a data stream of the preview image. Alternatively, the first video stream may be a data stream of the video recording file. For example, as shown in FIG. 8A, after the image sensor (Sensor) outputs an image, the ISP may perform image processing in the "RAW domain", "RGB domain", and "YUV domain" on the image. After image processing in the "YUV domain", there may be two data streams: One is a data stream of the preview image and the other is a data stream of the video recording file. The first video stream may be a data stream obtained after the ISP performs image processing in the "RAW domain" and the "RGB domain" on the first image output by the Sensor.

For example, the target object may be at least one of a face, a human body, a gourmet, an animal, a building, or the like. That is, the mobile phone may recognize the image in the first video stream, and use the image including the target object as the second image.

In some embodiments, the target object includes a face, and the second image may be an image in which an expression of the target object meets a preset condition. That is, the mobile phone (a frame selection module of the mobile phone) may select, from the first video stream, an image in which an expression of the target object meets the preset condition as the second image shown in FIG. 8A (that is, the candidate frame shown in FIG. 3).

For example, that the expression of the target object meets the preset condition may be specifically: The face is smiling. That is, the second image may be a frame of including a smiling face image in the first video stream. In this example, the mobile phone may capture a highlight image of the smiling face in a video record.

In some other embodiments, the target object includes a human body. The second image may be an image in which an action of the target object meets a preset condition. That is, the mobile phone (a frame selection module of the mobile phone) may select, from the first video stream, an image in which an action of the target object meets the preset condition as the second image shown in FIG. 8A (that is, the candidate frame shown in FIG. 3).

For example, that the action of the target object meets the preset condition may be specifically: The action of the human body is a preset action. For example, the preset action may be a human body action that the human body jumps to a highest point, a dance performance, or a highlight action in a sports performance process, or a high-difficulty action in a human body exercise process. That is, the second image may be a frame of image in which the first video stream includes a preset action of the human body. In this example, the mobile phone may capture, in a video recording process, a highlight image having a preset action in a motion process of the human body.

In some embodiments, the target object may be preconfigured in the mobile phone when the mobile phone is delivered from a factory. A plurality of target objects may be preconfigured in the mobile phone.

In some other embodiments, the target object may alternatively be set by the user on the mobile phone. For example, the mobile phone may receive a type of the target object that is set by the user on a settings interface.

Figure 10A:
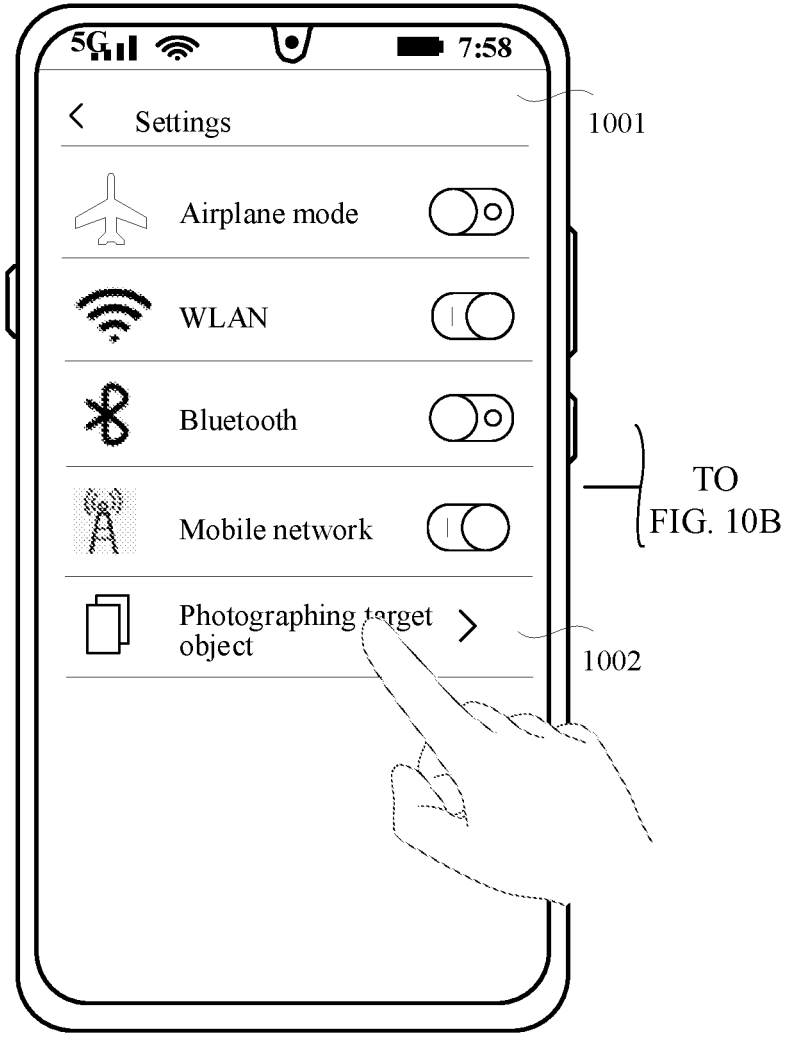
FIG. 10A to FIG. 10C are a schematic diagram of another display interface of a mobile phone during video recording according to an embodiment of this application.
Figure 10B:
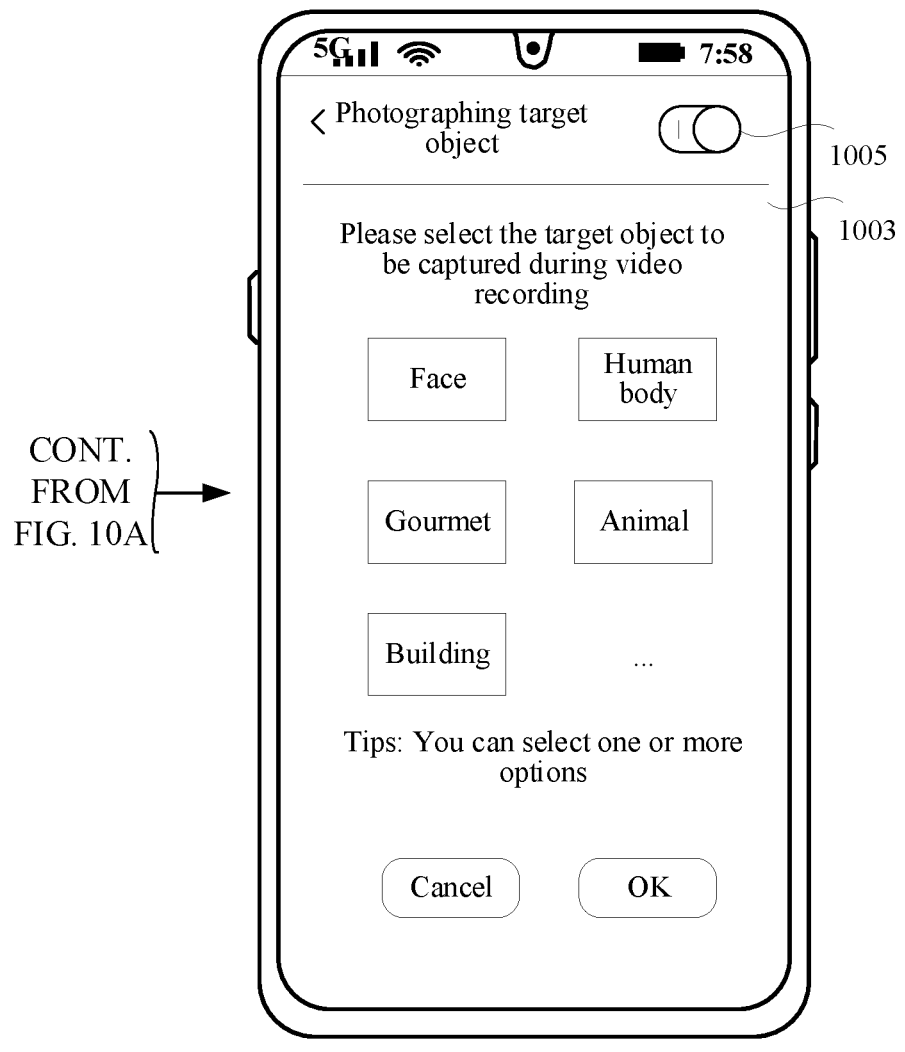

For example, the mobile phone may display a settings interface 1001 shown in FIG. 10A. The settings interface 1001 includes a preset option, such as a "photographing target object" option 1002. The "photographing target object" option 1002 is used to trigger the mobile phone to set the target object that needs to be captured in the video recording process. In response to a tap operation performed by the user on the "photographing target object" option 1002, the mobile phone may display a target object settings interface 1003 shown in FIG. 10B. The target object settings interface 1003 includes a plurality of photographing object options, such as a "face" option, a "human body" option, a "gourmet" option, an "animal" option, and a "building" option. The mobile phone may receive an operation of selecting any one of the plurality of photographing object options by the user. For example, the mobile phone may receive an operation of selecting the "face" option and the "gourmet" option shown in FIG. 10B, and display the target object settings interface 1004 shown in FIG. 10B. Then, the mobile phone may receive a tap operation performed by the user on an "OK" button in the target object settings interface 1004. In response to the tap operation performed by the user on the "OK" button, the mobile phone can set the face and gourmet as target objects.

Figure 11:
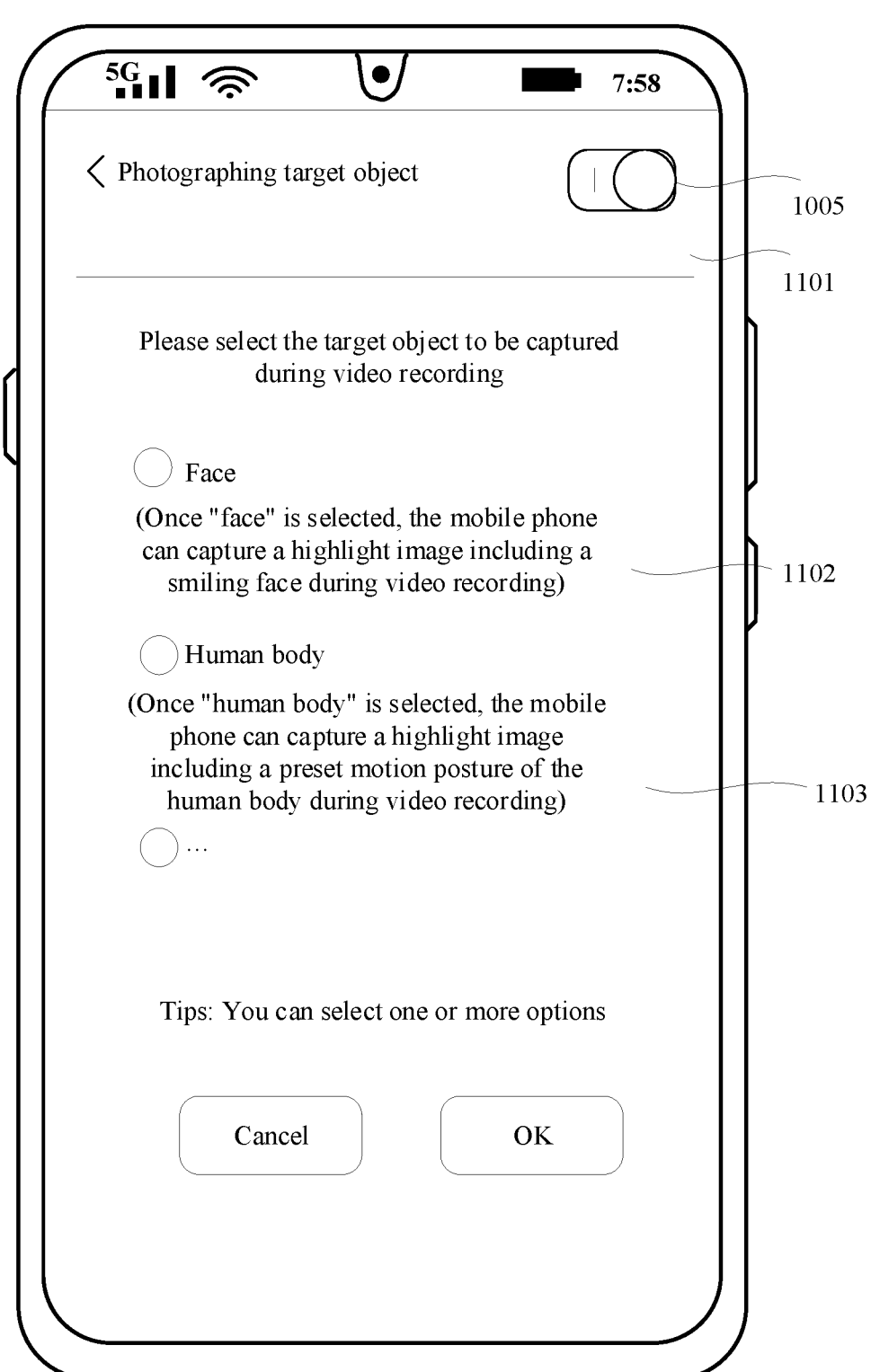
FIG. 11 is a schematic diagram of another display interface of a mobile phone during video recording according to an embodiment of this application.

In a possible implementation, the target object settings interface may include not only options of a plurality of photographing objects, but also prompt information of each photographing object. The prompt information may be used to remind the user of a function that may be implemented by the mobile phone after a corresponding photographing object is selected as a target object. For example, the target object settings interface 1003 shown in FIG. 10B may be replaced with a target object settings interface 1101 shown in FIG. 11. The target object settings interface 1101 includes not only options of a plurality of photographing objects (such as a "face" option and a "human body" option), but also prompt information of each photographing object. For example, the target object settings interface 1101 includes prompt information 1102 of a photographing object "face" (for example, after "face" is selected, the mobile phone may capture a highlight image of a smiling face in the video recording process) and prompt information 1103 of a photographing object "human body" (for example, after "human body" is selected, the mobile phone may capture a highlight image of a preset motion when the human body moves in the video recording process). By using the prompt information of each photographing object, the user may determine a function that can be implemented by the mobile phone after a corresponding photographing object is selected as a target object. In this way, the user can set a target object that meets a user requirement according to a function that the user needs to implement in the video recording process of the mobile phone.

In some embodiments, only after the preset function is enabled, the mobile phone can perform the method in this embodiment of this application to capture a highlight image of the target object in the video recording process. The preset function is a function of capturing the highlight image of the target object by the mobile phone in the video recording process.

Figure 10C:
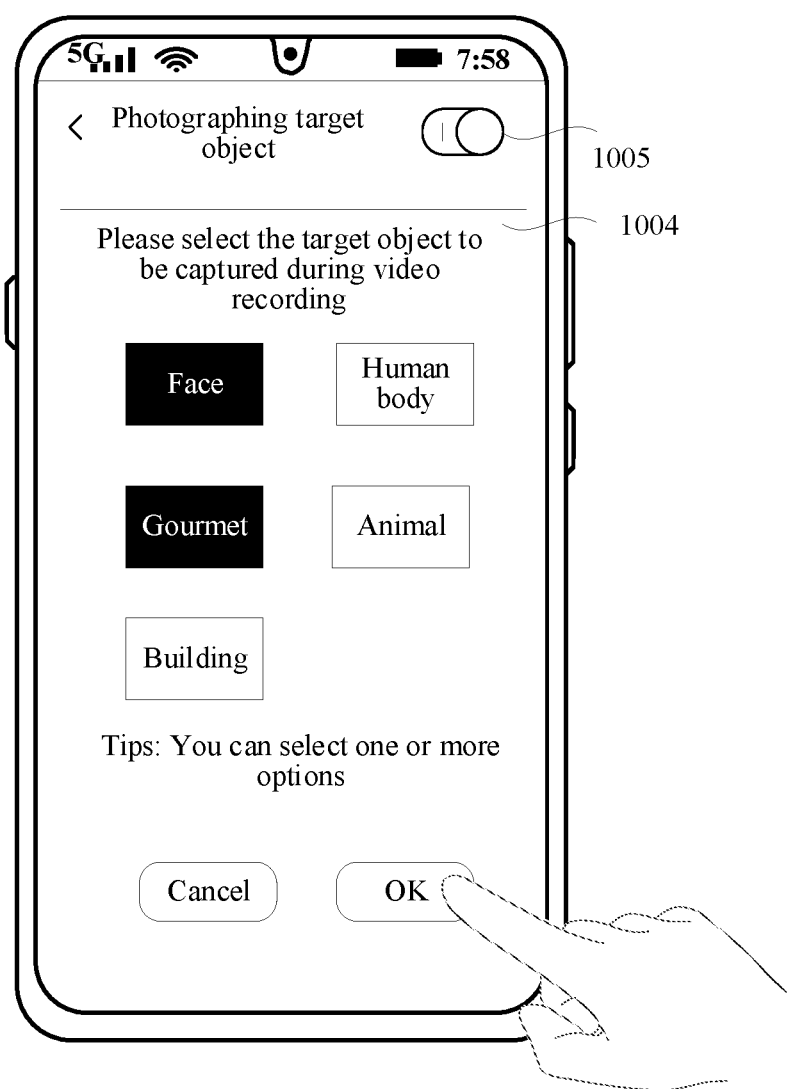

In an implementation, the mobile phone may enable or disable the preset function on the target object settings interface 1101. For example, the target object settings interface 1003 shown in FIG. 10B, the target object settings interface 1004 shown in FIG. 10C, and the target object settings interface 1001 shown in FIG. 11 may include a switch 1005 of the preset function. The mobile phone may receive a selection operation performed by the user on the switch 1005 of the preset function, to enable or disable the preset function.

In another implementation, the mobile phone may enable or disable the preset function on the viewfinder interface during video recording.

Figure 12:
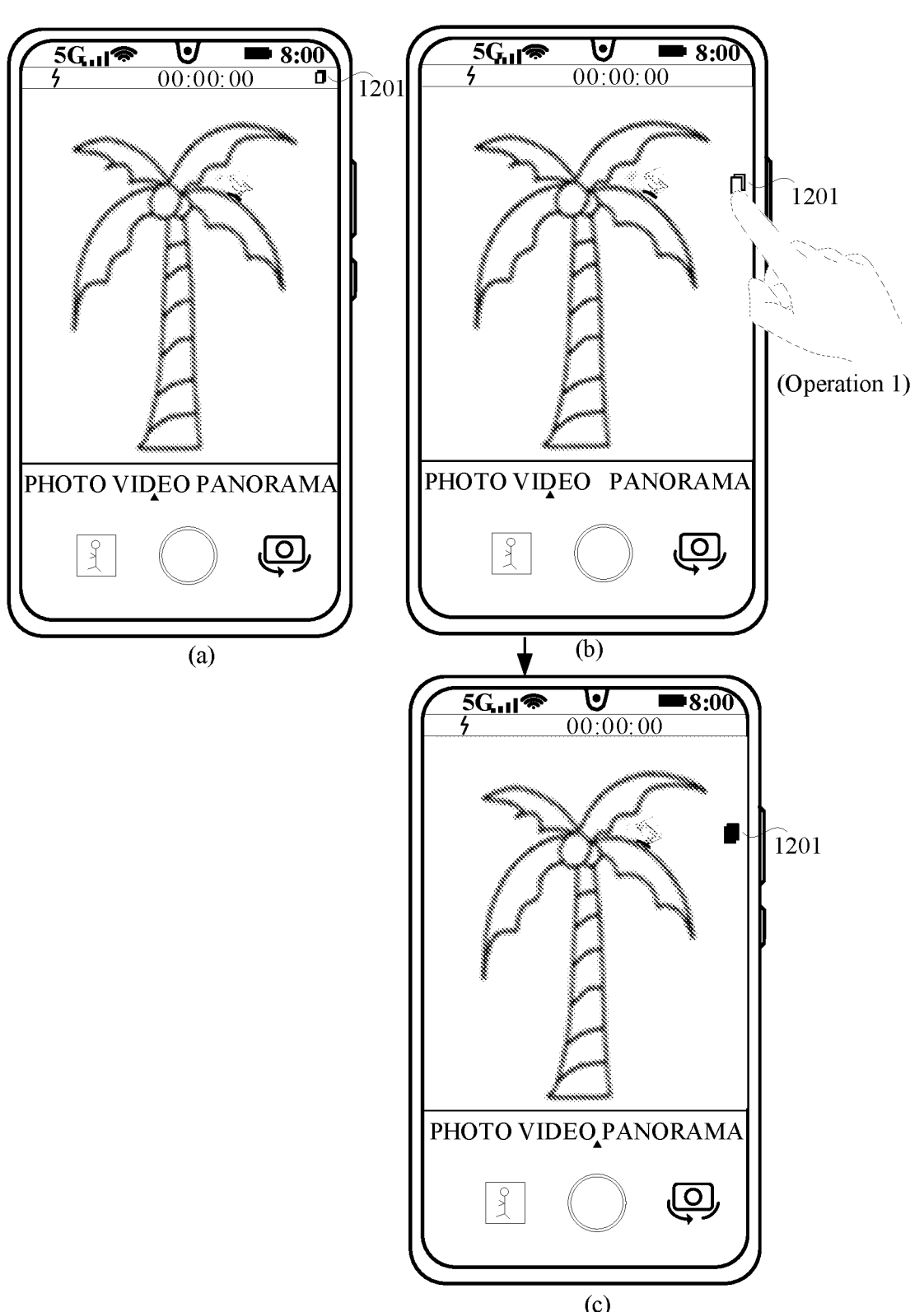
FIG. 12 is a schematic diagram of another display interface of a mobile phone during video recording according to an embodiment of this application.

For example, the mobile phone may enable or disable the preset function on the viewfinder interface on which the mobile phone has not started video recording. As shown in (a) in FIG. 12 or (b) in FIG. 12, the viewfinder interface on which the mobile phone has not started video recording includes a switch 1201 of the preset function. The mobile phone may receive an operation 1 performed by the user on the switch 1201 of the preset function shown in (b) in FIG. 12 (for example, any operation such as a tap operation, a double-tap operation, or a long-press operation), and display a viewfinder interface shown in (c) in FIG. 12. The operation 1 is a third operation. It is assumed that the switch 1201 of the preset function is in an off state in the viewfinder interface shown in (a) in FIG. 12 or (b) in FIG. 12, and the switch 1201 of the preset function in the viewfinder interface shown in (c) in FIG. 12 is in an on state. Certainly, the mobile phone may further receive the operation 1 performed by the user on the switch 1201 of the preset function shown in (c) in FIG. 12, display the viewfinder interface shown in (b) in FIG. 12, and disable the preset function.

Figure 13:
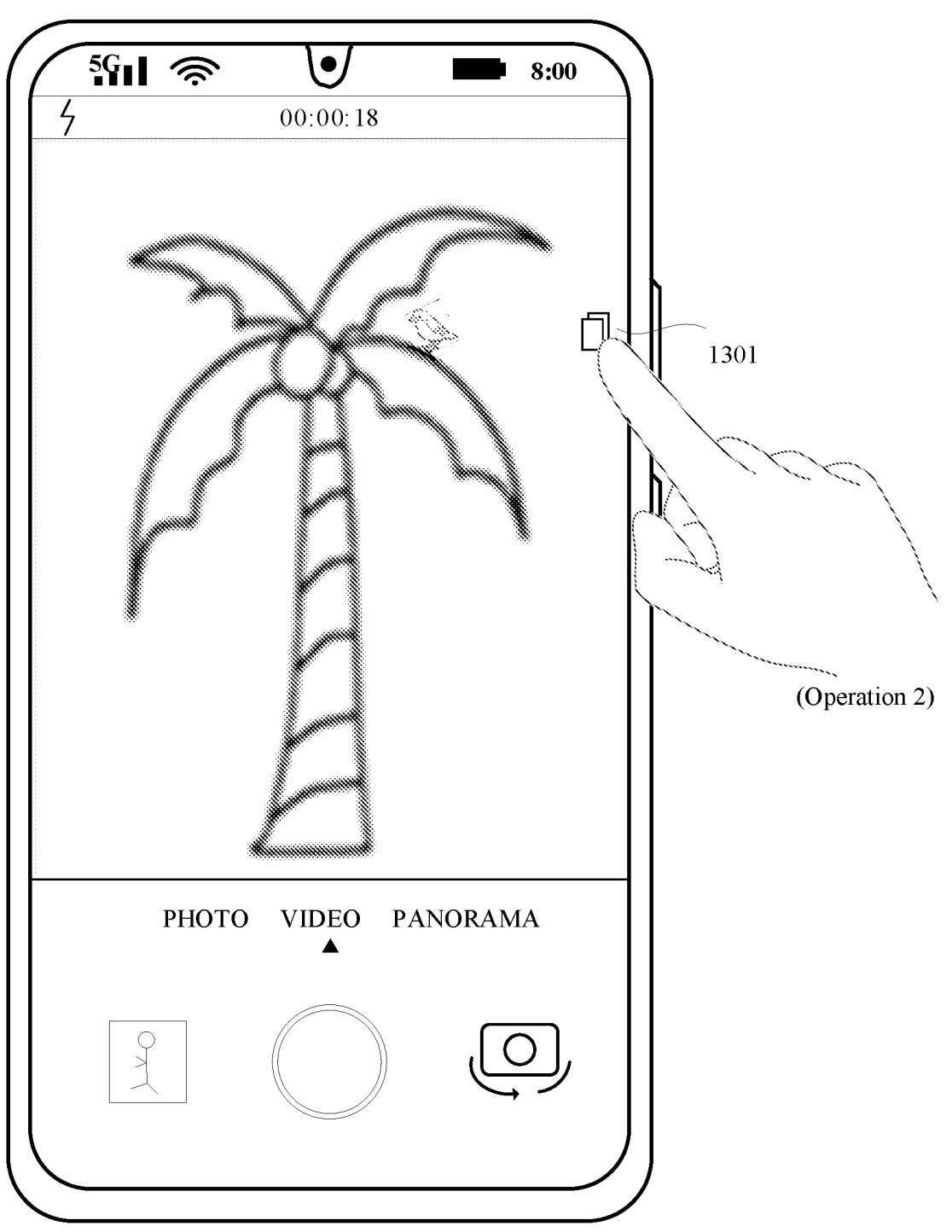
FIG. 13 is a schematic diagram of another display interface of a mobile phone during video recording according to an embodiment of this application.

For another example, the mobile phone may enable or disable the preset function on the viewfinder interface in which the mobile phone has started video recording. As shown in FIG. 13, the viewfinder interface on which the mobile phone has started video recording includes a switch 1301 of a preset function. For a method in which the mobile phone starts or disables the preset function on the viewfinder interface on which the video recording has started, references may be made to the method in which the mobile phone starts or disables the preset function on the viewfinder interface on which the video recording has not started in the foregoing embodiment. Details are not described in this embodiment of this application.

In some other embodiments, the target object may alternatively be set by the user on the mobile phone. For example, the mobile phone may receive a type of the target object that is set by the user on the viewfinder interface during video recording. The viewfinder interface during video recording may include: in a video recording mode, a viewfinder interface on which video recording has started (that is, the first interface) and a viewfinder interface on which video recording has not started (that is, the second interface).

Figure 14:
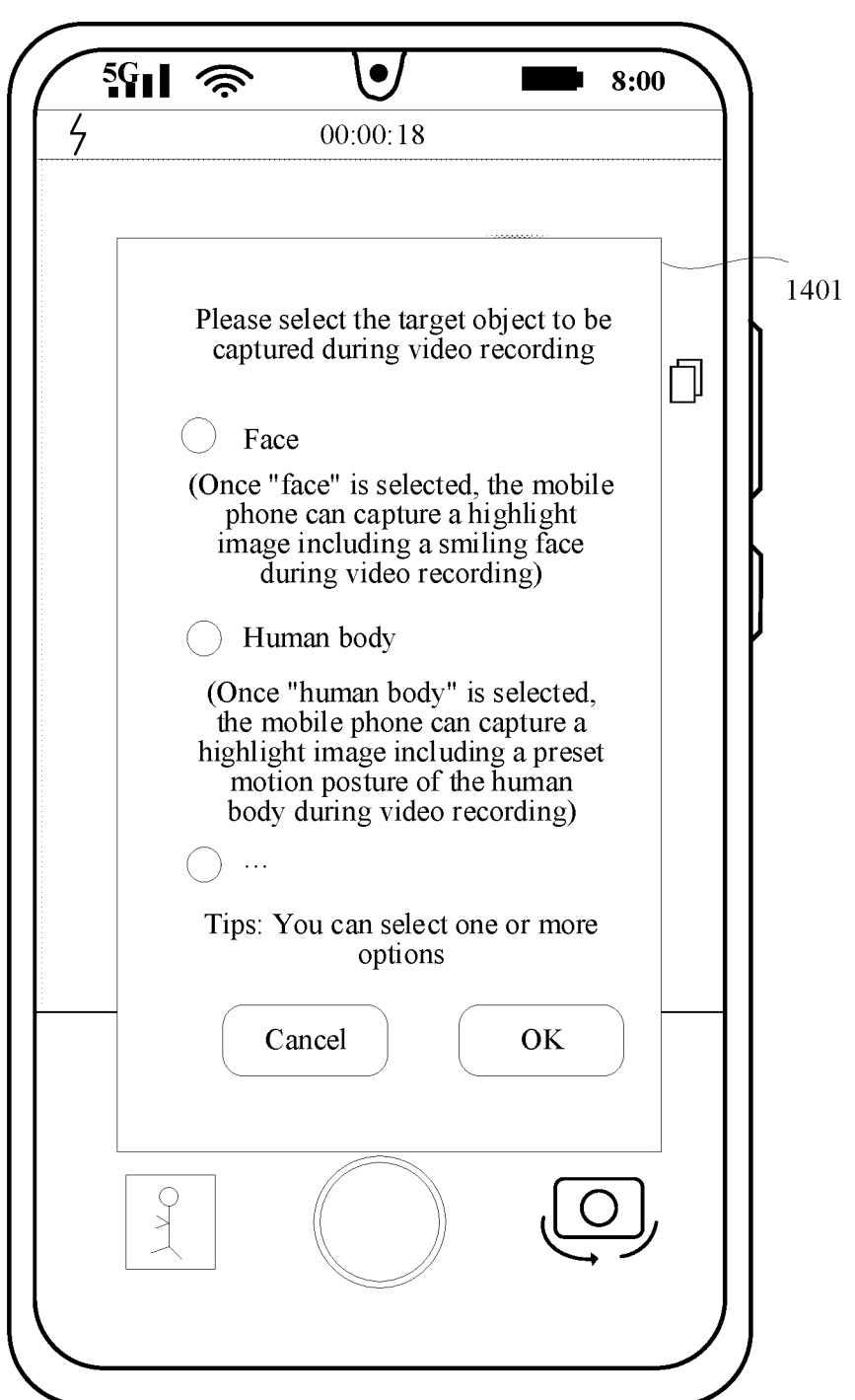
FIG. 14 is a schematic diagram of another display interface of a mobile phone during video recording according to an embodiment of this application.

For example, the viewfinder interfaces shown in (a) in FIG. 12, (b) in FIG. 12, (c) in FIG. 12, and FIG. 13 all include a switch of a preset function. The mobile phone may receive an operation 2 performed by the user on the switch of the preset function (for example, any operation such as a tap operation, a double-tap operation, or a long-press operation). The operation 2 is different from the operation 1. The operation 2 is a second operation. In response to the operation 2, the settings interface of the target object is displayed. The settings interface of the target object includes to-be-selected options of a plurality of photographing objects. For example, in response to the operation 2 performed by the user on a switch 1301 of a preset function shown in FIG. 13, the mobile phone may display a target object settings interface 1401 shown in FIG. 14. The mobile phone may determine a photographing object selected by the user as a target object in response to a selection operation performed by the user on the to-be-selected options of the plurality of photographing objects in the target object settings interface 1401. Alternatively, in response to the operation 2 performed by the user on the switch 1301 of the preset function shown in FIG. 13, the mobile phone may display the target object settings interface 1101 shown in FIG. 11. In response to a tap operation performed by the user on a "Cancel" button or an "OK" on the target object settings interface 1101, the mobile phone may return to the viewfinder interface shown in FIG. 13.

In some other embodiments, the target object may be a preconfigured photographing object in a target scenario. For example, the target scenario may be at least one photographing scenario of a portrait scenario, a sports scenario, a pet scenario, a gourmet scenario, or the like. For different photographing scenarios, one or more photographing objects may be preset.

For example, a preconfigured photographing object (that is, a target object) in a portrait scenario may be a face. That the expression of the target object meets the preset condition may be specifically: The face is smiling. That is, the second image may be a frame of image including a smiling face image. In this example, the mobile phone may capture a highlight image of the smiling face in a video record.

For another example, a preconfigured photographing object in a motion scenario may be a human body. An action of the target object is a preset action. For description of the preset action, refer to the description in the foregoing embodiment. Details are not described herein again. In this example, the mobile phone may capture, in a video recording process, a highlight image having a preset action in a motion process of the human body.

In this embodiment, in the video recording mode, the mobile phone may identify the target scenario according to the first image collected by the camera. Then, the mobile phone may identify whether the expression or the action of the preconfigured photographing object (that is, the target object) in the target scenario meets the preset condition. If a frame of image in the first video stream includes an image of the target object, and an expression or an action of the target object in the frame of image meets a preset condition, the mobile phone may select the image frame as the second image.

The target scenario may be preconfigured in the mobile phone when the mobile phone is delivered from a factory. A plurality of target object scenarios may be preconfigured in the mobile phone. Alternatively, the target scenario may be set by the user on the mobile phone. For example, the mobile phone may receive a target scenario set by the user on the settings interface. For another example, the mobile phone may receive the type of the target object that is set by the user on the viewfinder interface during video recording. The viewfinder interface during video recording may include: in a video recording mode, a viewfinder interface on which video recording has started and a viewfinder interface on which video recording has not started. For a method for receiving an operation of the user to set the target scenario, refer to the method for setting a target object in the foregoing embodiment. Details are not described herein in this embodiment of this application. For example, the target object settings interface shown in FIG. 10B, FIG. 10C, FIG. 11, and FIG. 14 may be replaced with the target scenario settings interface, and the option of the photographing object in the target object settings interface may be replaced with the option of the photographing scenario.

Figure 8B:
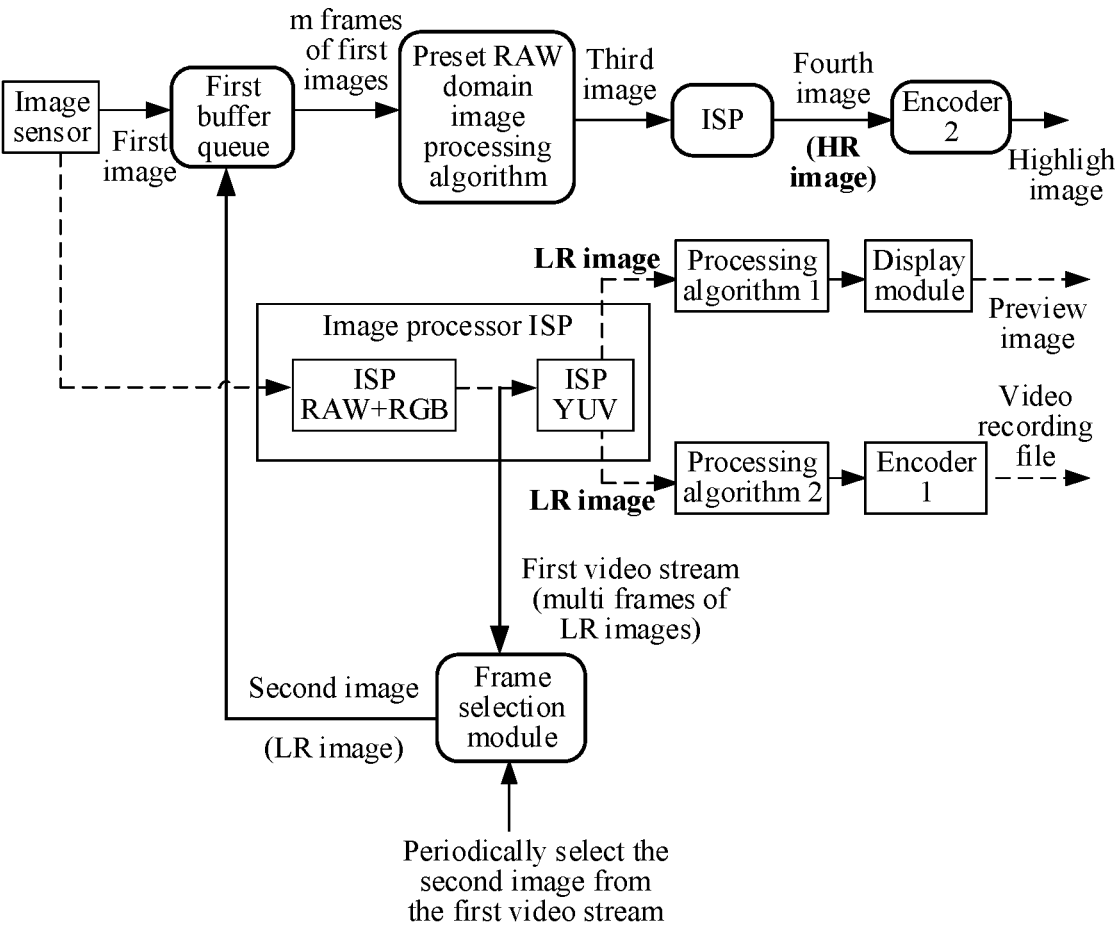
FIG. 8B is a schematic block diagram of another image obtaining method according to an embodiment of this application.

The first video stream is obtained by the ISP of the mobile phone by performing first processing on the plurality of frames of first images. The first processing includes subsampling. Subsampling may also be referred to as downsampling. Subsampling of the image can shrink the image and reduce resolution of the image. For example, a quantity of pixels of an image before subsampling may be 4000*3000, and a quantity of pixels of an image after subsampling may be 2000*1500. In this way, as shown in any of the accompanying drawings in FIG. 1, FIG. 2, FIG. 3, and FIG. 8A, the image output by the "RAW domain" of the ISP is a low-resolution image recorded as an LR image. The first video stream includes a plurality of frames of LR images. Starting from receiving the first operation, the mobile phone may start to select a second image from the first video stream in real time. Alternatively, starting from receiving the first operation, as shown in FIG. 8B, the mobile phone may start to periodically select a second image from the first video stream.

In this embodiment of this application, as shown in FIG. 5, a Camera HAL at an HAL of the mobile phone may include a frame selection module. After receiving a video recording instruction from the Camera Service, the Camera HAL may start to select the second image (also referred to as a reference frame) from the first video stream in real time or periodically.

It should be understood that the second image is selected from a plurality of frames of subsampled LR images (that is, the first video stream). Therefore, resolution of the second image is also low. However, a highlight image that the user needs to obtain in the video recording process is a high resolution image. Therefore, in this embodiment of this application, after selecting the second image from the first video stream, the mobile phone further needs to obtain a high-resolution image with same or similar image content according to the second image. Specifically, after S604, the method in this embodiment of this application may further include S605.

S605. The mobile phone uses, as an input, m frames of first images corresponding to the second image in the n frames of first images, and runs a preset RAW domain image processing algorithm to obtain a third image. The preset RAW domain image processing algorithm has a function of improving image quality. m≥1, and m is an integer.

Figure 15:
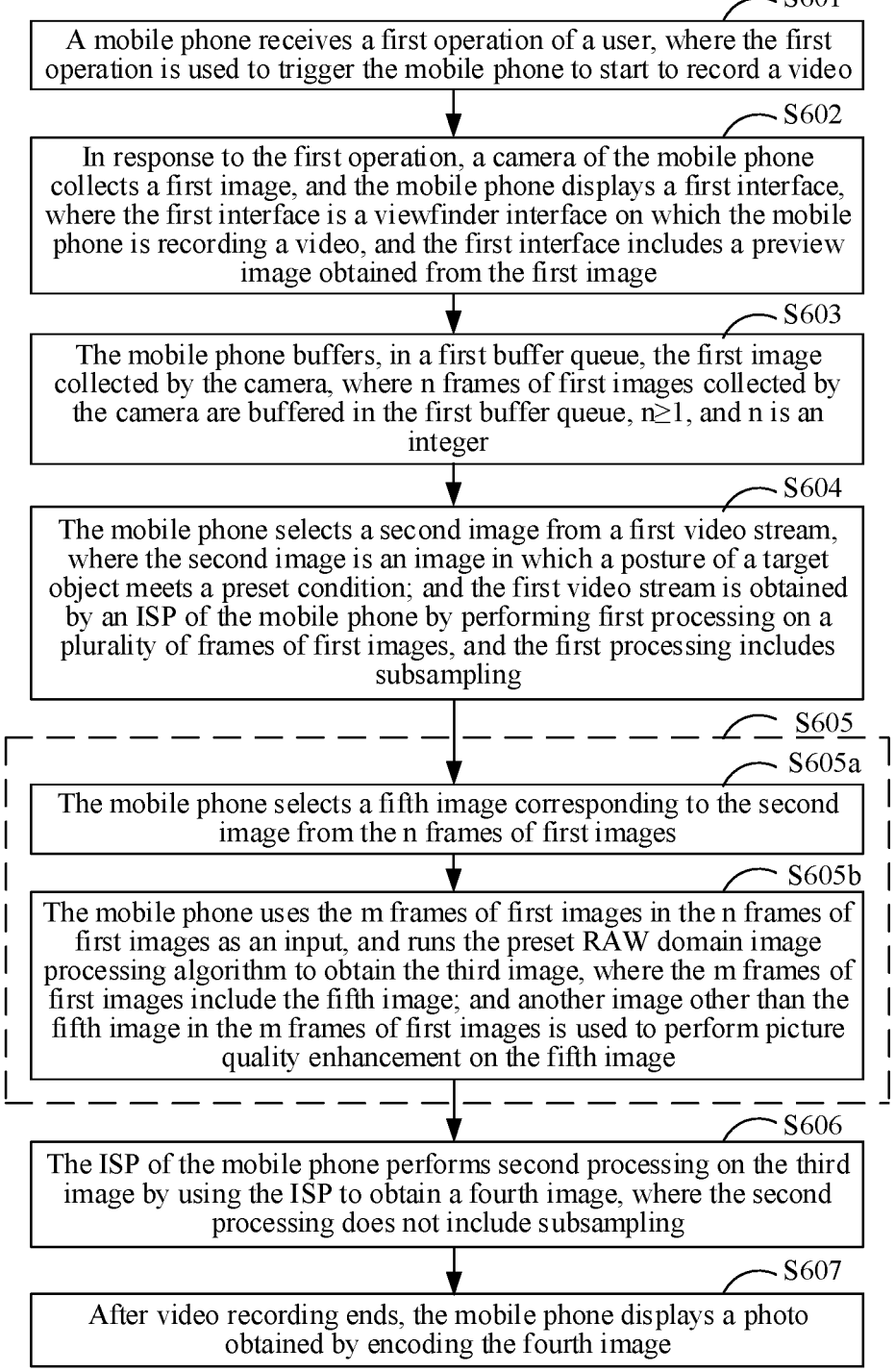
FIG. 15 is a flowchart of another image obtaining method according to an embodiment of this application.

For example, the mobile phone performs S603 to buffer the image output by the Sensor in the first buffer queue. The first buffer queue may buffer n frames of first images. In addition, the first image buffered in the first buffer queue is not subsampled, and is a high-resolution image. Therefore, the mobile phone may find, from the n frames of first images buffered in the first buffer queue, a high-resolution image whose image content is the same or similar to that of the second image. Specifically, as shown in FIG. 15, S605 may include S605a and S605b.

S605a. The mobile phone selects a fifth image corresponding to the second image from the n frames of first images.

In the n frames of first images, a time at which an image sensor of the camera outputs the fifth image is closest to a time at which the image sensor of the camera outputs the second image; or in the n frames of first images, the fifth image has highest definition. Certainly, reference may also be made to the foregoing two frame selection bases (such as resolution and time), and different weights are used and weighted to serve as a basis for selecting the fifth image. In the following embodiment, the method in this embodiment of this application is described by using an example in which the time at which the image sensor of the camera outputs the fifth image is closest to the time at which the image sensor of the camera outputs the second image.

In some embodiments, each frame of first image corresponds to one piece of time information, and the time information records a time at which the image sensor Sensor outputs a corresponding first image. The time information may also be referred to as a time stamp. In this way, the mobile phone (for example, the frame selection module) may select the first image, in the first buffer queue Buffer, whose time recorded in the time stamp is closest to the time recorded in the time stamp of the second image as the fifth image.

In this embodiment of this application, the mobile phone may buffer the Bayer image exposed and output by the Sensor in the first buffer queue Buffer. A plurality of frames of Bayer images may be buffered in the first buffer queue. In this way, even if there is delay duration from the Sensor outputting the first image corresponding to the second image to the mobile phone (for example, the frame selection module) selecting the second image from the first video stream, when the mobile phone selects the second image from the first video stream, the Bayer image output by the Sensor may also be buffered in the first buffer queue. The mobile phone may also select, from the Buffer, a high-resolution image whose image content is the same as or similar to that of the second image.

It should be noted that, on some platforms, an exposure end time of the Sensor may be used as a time stamp, and on some other platforms, an exposure start time of the Sensor may be used as the time stamp. This is not limited in this embodiment of this application.

S605b. The mobile phone uses the m frames of first images in the n frames of first images as an input, and runs the preset RAW domain image processing algorithm to obtain the third image. The m frames of first images include the fifth image. Another image other than the fifth image in the m frames of first images is used to perform picture quality enhancement on the fifth image; and In some embodiments, m may be equal to 1. That is, the m frames of first images are the fifth image. In this case, the mobile phone can obtain the third image with high picture quality by running the preset RAW domain image processing algorithm by using the fifth image as the input. The preset RAW domain image processing algorithm is a single-frame input single-frame output image processing algorithm. However, because parameters such as data integrity and a texture of one frame of image are limited, that the frame of image is used as the input to run the preset RAW domain image processing algorithm cannot effectively improve picture quality of this frame of image.

Based on this, in some other embodiments, m may be greater than 1. Specifically, the mobile phone may run the preset RAW domain image processing algorithm by using the fifth image and at least one frame of image adjacent to the fifth image as an input. That is, m frames of first images that are in the n frames of first images and that include the fifth image may be used as the input to run the preset RAW domain image processing algorithm. The preset RAW domain image processing algorithm is a multi-frame input single-frame output image processing algorithm. It should be understood that images in the m frames of first images other than the fifth image may play a role of picture quality enhancement on the fifth image. This makes it easy to obtain information such as noise and a texture, to further improve picture quality of the third image.

In some embodiments, the m frames of first images are adjacent m frames of images in the first buffer queue. In some other embodiments, the m frames of first images may alternatively be m frames of images that are in the n frames of first images buffered in the first buffer queue and that are not adjacent to each other but include the fifth image.

That is, the preset RAW domain image processing algorithm described in this embodiment of this application may be a multi-frame input single-frame output neural network model. The preset RAW domain image processing algorithm is a deep learning network for picture quality enhancement in the RAW domain. In this solution, algorithm processing of the preset RAW domain image processing algorithm is added. Compared with the image processing in the RAW domain, the image processing in the RGB domain, and the image processing in the YUV domain in which only the ISP hardware is used, a combination of the preset RAW domain image processing algorithm and the ISP has a better effect, which improves image quality of the third image.

It should be noted that, the first image buffered in the first buffer queue is not subsampled, and is a high-resolution image. Therefore, the mobile phone may find, from the n frames of first images buffered in the first buffer queue, a high-resolution image (that is, the fifth image) whose image content is the same or similar to that of the second image. In addition, the mobile phone may perform picture quality enhancement on the fifth image by using another image other than the fifth image in the m frames of first images. In this way, a third image with high resolution and high image quality can be obtained.

S606. The mobile phone performs second processing on the third image by using the ISP, to obtain a fourth image. The second processing does not include subsampling.

In this embodiment of this application, the mobile phone may process the first image to obtain a preview image by using the ISP in a time division multiplexing manner, and process the third image to obtain the fourth image. That is, that the mobile phone processes the first image to obtain the preview image by using the ISP does not affect that the mobile phone processes the third image to obtain the fourth image by using the ISP. The fourth image is used to generate a highlight image in the video recording process. In other words, processing of the highlight image shown in FIG. 8A or FIG. 8B by the mobile phone does not affect processing of the preview image and the video recording file shown in FIG. 8A or FIG. 8B by the mobile phone.

For example, the mobile phone may process the first image by using the hardware module of the ISP to obtain the preview image, and process the third image to obtain the fourth image. An image processing procedure for obtaining the preview image based on the first image further includes a processing procedure of a processing algorithm 1. In some embodiments, the processing algorithm 1 may be included in an ISP hardware module.

In some other embodiments, the processing algorithm 1 may be included in another processor (for example, any one of a CPU, GPU, or an NPU) of the mobile phone. In this embodiment, the ISP hardware module may invoke the processing algorithm 1 in the another processor to process the first image to obtain the preview image.

It should be emphasized that the third image is a high-resolution image with relatively high image quality. Therefore, the fourth image obtained by the mobile phone by performing, by using the ISP, second processing not including subsampling on the third image is also a high-resolution image. In addition, the fourth image is processed by the ISP, and image quality may be improved compared with that of the third image. Therefore, the fourth image is also an image with high resolution and high image quality.

S607. After video recording ends, the mobile phone displays a highlight image obtained by encoding the fourth image.

As shown in FIG. 8A or FIG. 8B, the mobile phone may process the m frames by using the preset RAW domain image processing algorithm to obtain the third image (that is, perform S605). The mobile phone may process the third image by using the ISP to obtain the fifth image (that is, perform S606). Then, the mobile phone may encode the fourth image (that is, the HR image) by using the encoder 2 to obtain a highlight image. In addition, the mobile phone may display the highlight image to the user after video recording ends.

Figure 16:
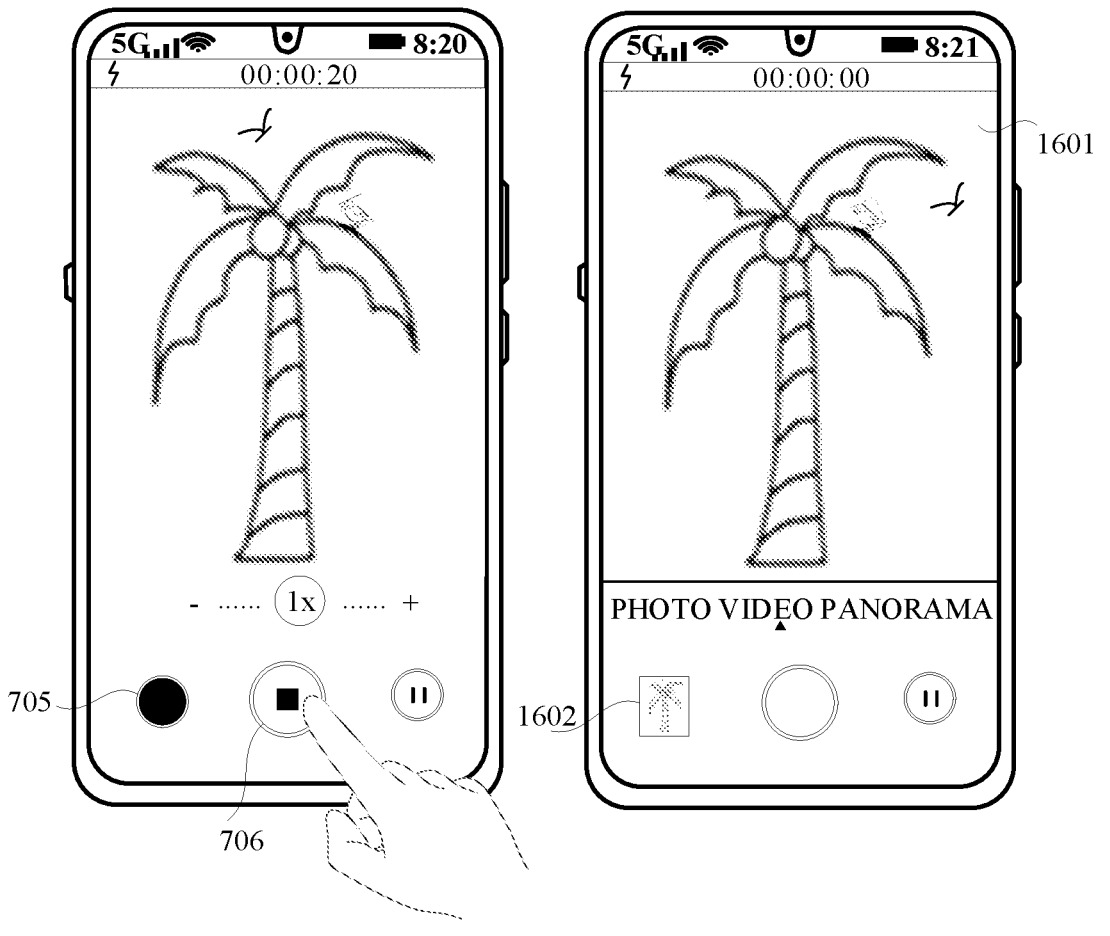
FIG. 16 is a schematic diagram of another display interface of a mobile phone during video recording according to an embodiment of this application.

For example, in response to a tap operation (that is, the first operation) performed by the user on the "start video recording" button 702 shown in FIG. 7, the mobile phone may perform S601-S606, and encode the fourth image to obtain a highlight image. Then, the mobile phone may receive a tap operation performed by the user on the "end video recording" button 706 shown in FIG. 7 or FIG. 16, and may end video recording and generate a video recording file. For example, in response to a tap operation performed by the user on a "stop recording" button 706 shown in FIG. 16, the mobile phone may display a video viewfinder interface 1601 shown in FIG. 16. The video viewfinder interface 1601 is a viewfinder interface before the mobile phone starts recording. In comparison with the video viewfinder interface 701 shown in FIG. 7, a photo in a photo option on the viewfinder interface of the mobile phone is updated from 708 shown in FIGS. 7 to 1602 shown in FIG. 16.

Figure 17:
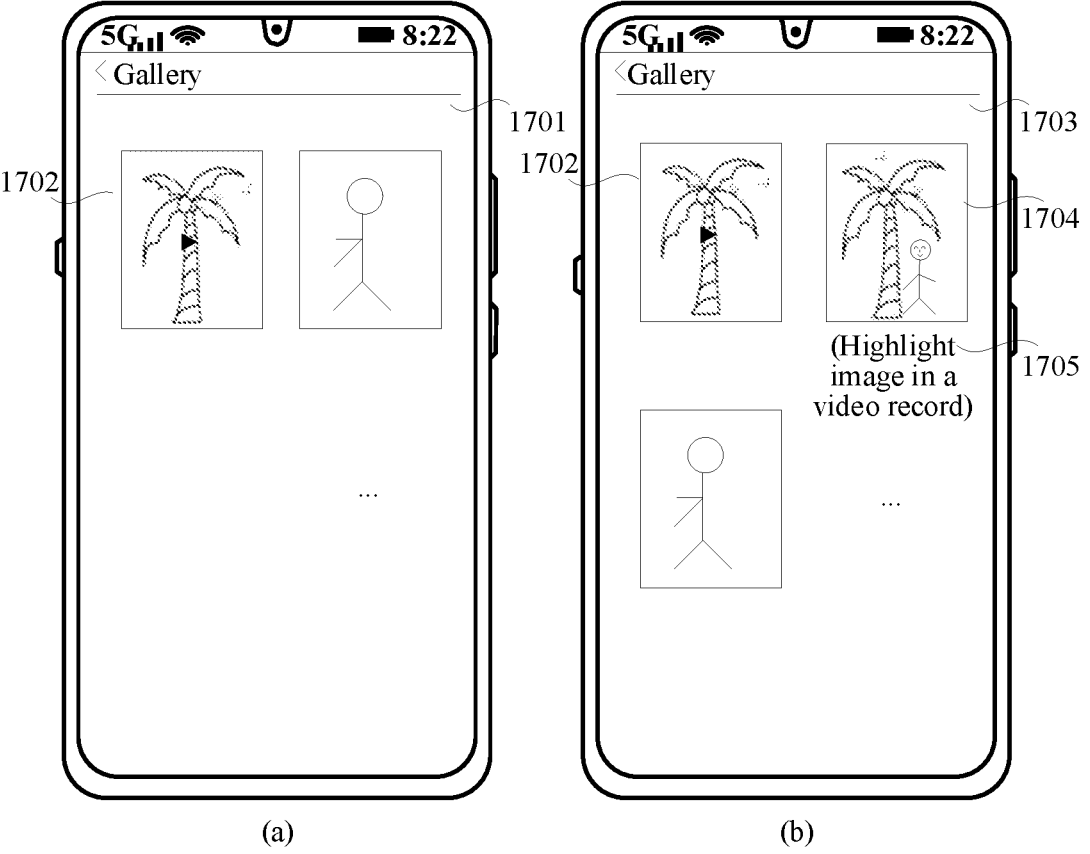
FIG. 17 is a schematic diagram of another display interface of a mobile phone during video recording according to an embodiment of this application.

The mobile phone may display an album list interface 1701 shown in (a) in FIG. 17 or an album list interface 1703 shown in FIG. 7 in response to an enable operation performed by the user on an album application. The album list interface 1701 includes one or more photos and videos that can be stored in the mobile phone. For example, the album list interface 1701 and the album list interface 1703 include a video recording file 1702 recorded by the mobile phone.

After video recording of the mobile phone ends, a highlight image captured in the video recording process may be displayed to the user, so as to achieve an effect of Magic Take. Magic Take means that after video recording ends, the mobile phone can not only obtain the video recording file, but also obtain the highlight image captured in a video record.

In an implementation (1) of the foregoing embodiment, the highlight image captured by the mobile phone in a video record is visible to the user in the album. The user can view the highlight image captured in a video record from the album. For example, as shown in FIG. 7, the album list interface 1703 further includes a photo 1704 that includes a highlight image and that is captured by the mobile phone in the process of recording the video recording file 1702. For example, the target object is a face. The photo 1704 includes a smiling face image.

In an implementation (2) of the foregoing embodiment, the highlight image captured by the mobile phone in a video record is invisible to the user in the album. The user cannot view the highlight image captured in a video record from the album. For example, as shown in FIG. 7, the album list interface 1701 does not include the photo 1704 shown in (b) in FIG. 17.

Figure 18:
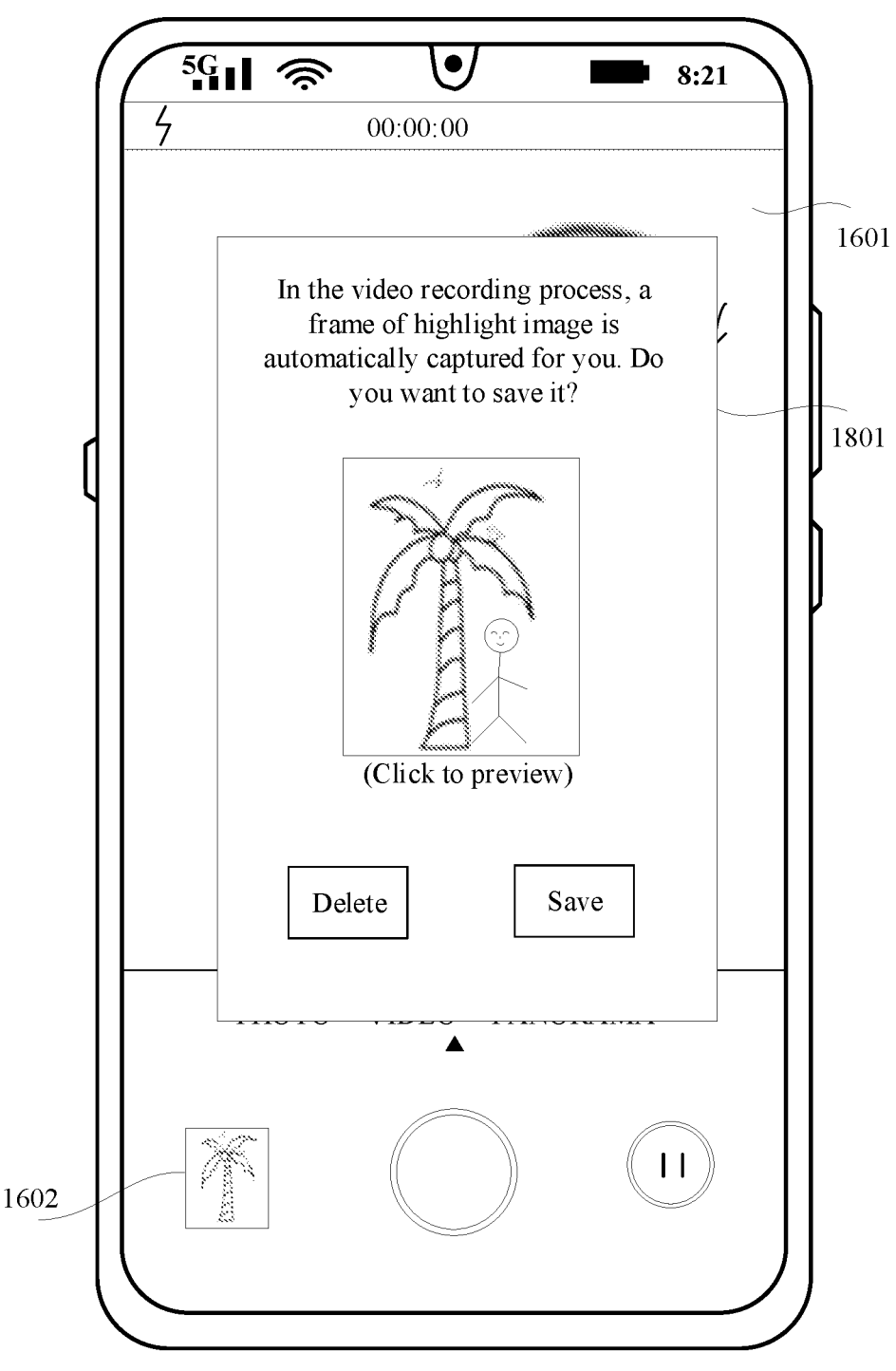
FIG. 18 is a schematic diagram of another display interface of a mobile phone during video recording according to an embodiment of this application.

In some embodiments, the mobile phone may send first prompt information in response to an operation of ending video recording. The first prompt information is used to request the user to confirm whether to reserve a captured highlight image in the video recording process. For example, in response to a tap operation performed by the user on the "end video recording" button 706 shown in FIG. 16, as shown in FIG. 18, the mobile phone may display first prompt information 1801 on the viewfinder interface 1601, for example, "In the video recording process, a frame of high-light image is automatically captured for you. Do you want to save it?". The first prompt information 1801 may further include a preview image of the highlight image, so that the user determines, according to the preview image, whether to reserve the highlight image.

With reference to the foregoing implementation (2), in this embodiment, in response to an operation 3 performed by the user on the first prompt information 1801, the mobile phone may store the highlight image in the album. For example, the operation 3 may be a tap operation performed by the user on the "reserve" button in the first prompt information 1801. As shown in FIG. 7, the album list interface 1701 does not include the photo 1704 shown in (b) in FIG. 17. With reference to the implementation (2), in response to the operation 3 performed by the user on the first prompt information 1801, the mobile phone may further display the highlight image in another manner. For a manner of displaying a highlight image by the mobile phone, reference may be made to detailed descriptions in the following embodiments, and details are not described herein.

It should be noted that with reference to the foregoing implementation (1), the embodiment does not display a highlight image in the album of the mobile phone. However, in response to the operation 3 performed by the user on the first prompt information 1801, the mobile phone may still display the highlight image in another manner. For a manner of displaying a highlight image by the mobile phone, reference may be made to detailed descriptions in the following embodiments, and details are not described herein.

Regardless of whether the highlight image captured by the mobile phone in a video record is visible to the user in the album, after video recording ends, a manner of triggering the mobile phone to display the highlight image to the user may include at least the following manner (a) and manner (b):

Manner (a): After video recording ends, the mobile phone may generate a video recording file. A detail page of the video recording file may include a first preset control. The mobile phone may receive a tap operation performed by the user on the first preset control. In response to the tap operation performed by the user on the first preset control, the mobile phone may display a highlight image captured in the process of shooting the video recording file (that is, a video record).

Figure 19A:
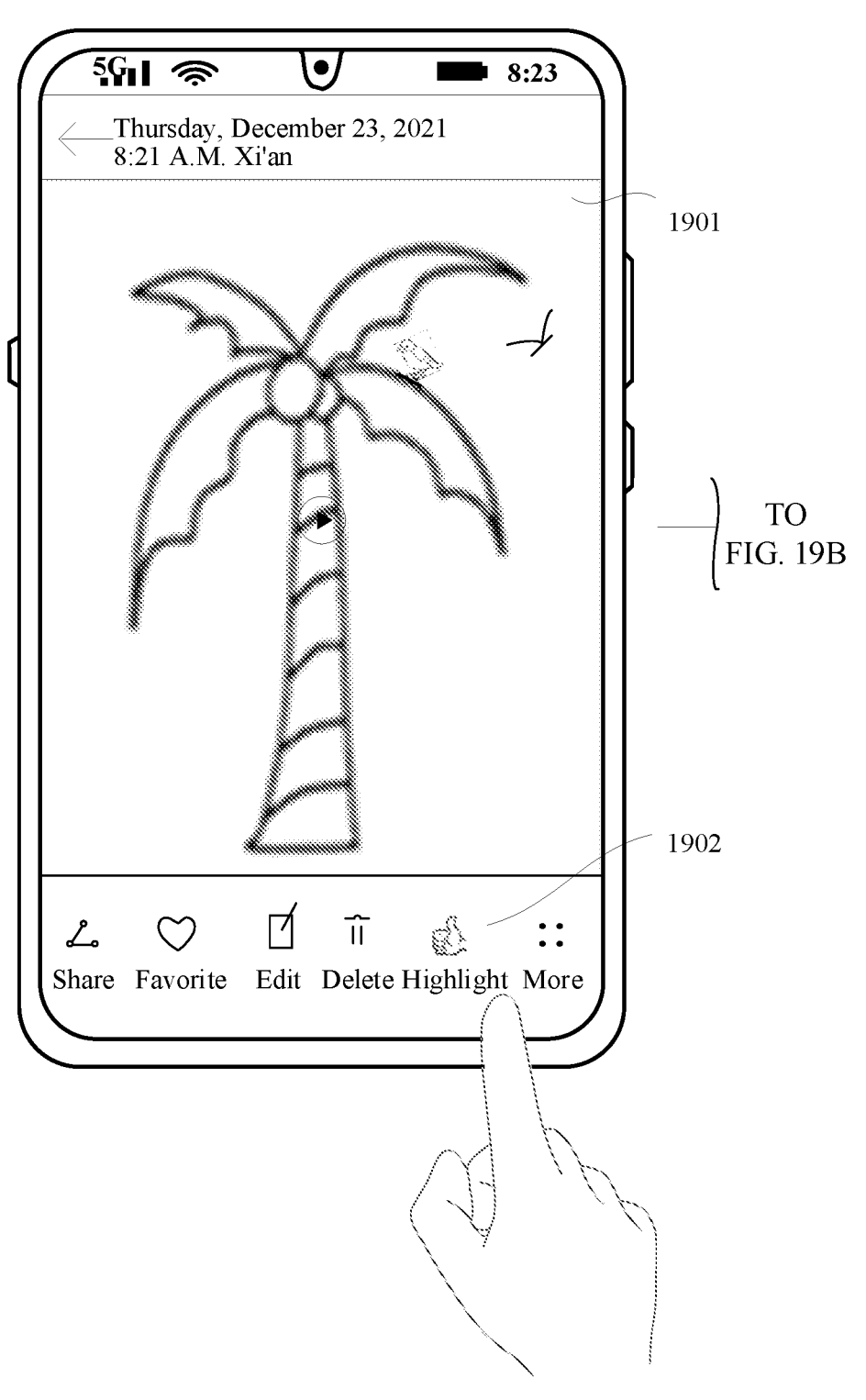
FIG. 19A to FIG. 19C are a schematic diagram of another display interface of a mobile phone during video recording according to an embodiment of this application.
Figures 19A, 19B:
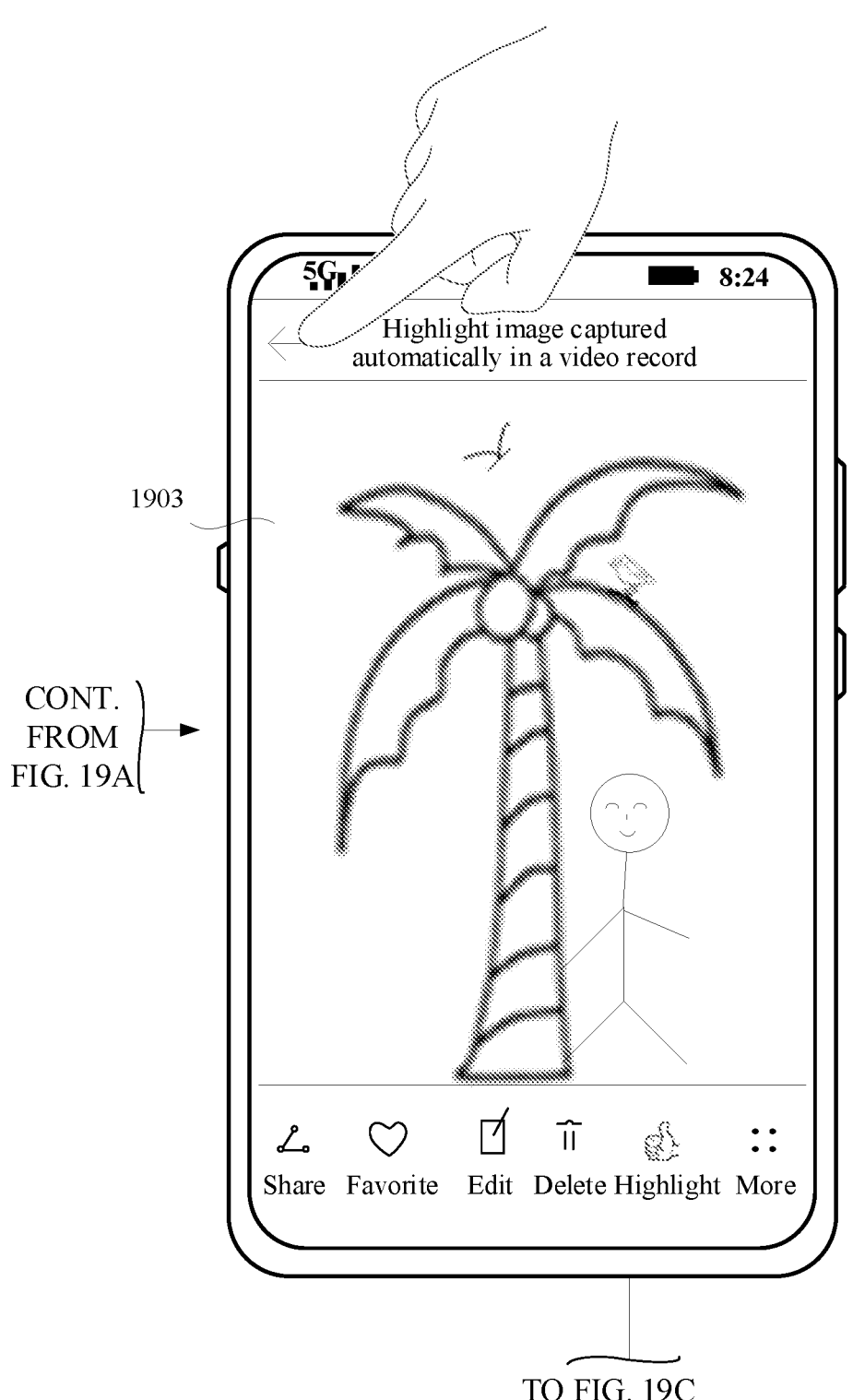

For example, as shown in FIG. 19A, the mobile phone may display a detail page 1901 of the video recording file 1702 in response to a tap operation performed by the user on the video recording file 1702 shown in (a) in FIG. 17 or (b) in FIG. 17. As shown in FIG. 19A, the detail page 1901 includes a first preset control 1902. In response to a tap operation performed by the user on the first preset control 1902, as shown in FIG. 19B, the mobile phone may display a detail page 1903 of the highlight image captured in the process of shooting the video recording file 1702, and display the highlight image to the user.

Figures 19B, 19C:
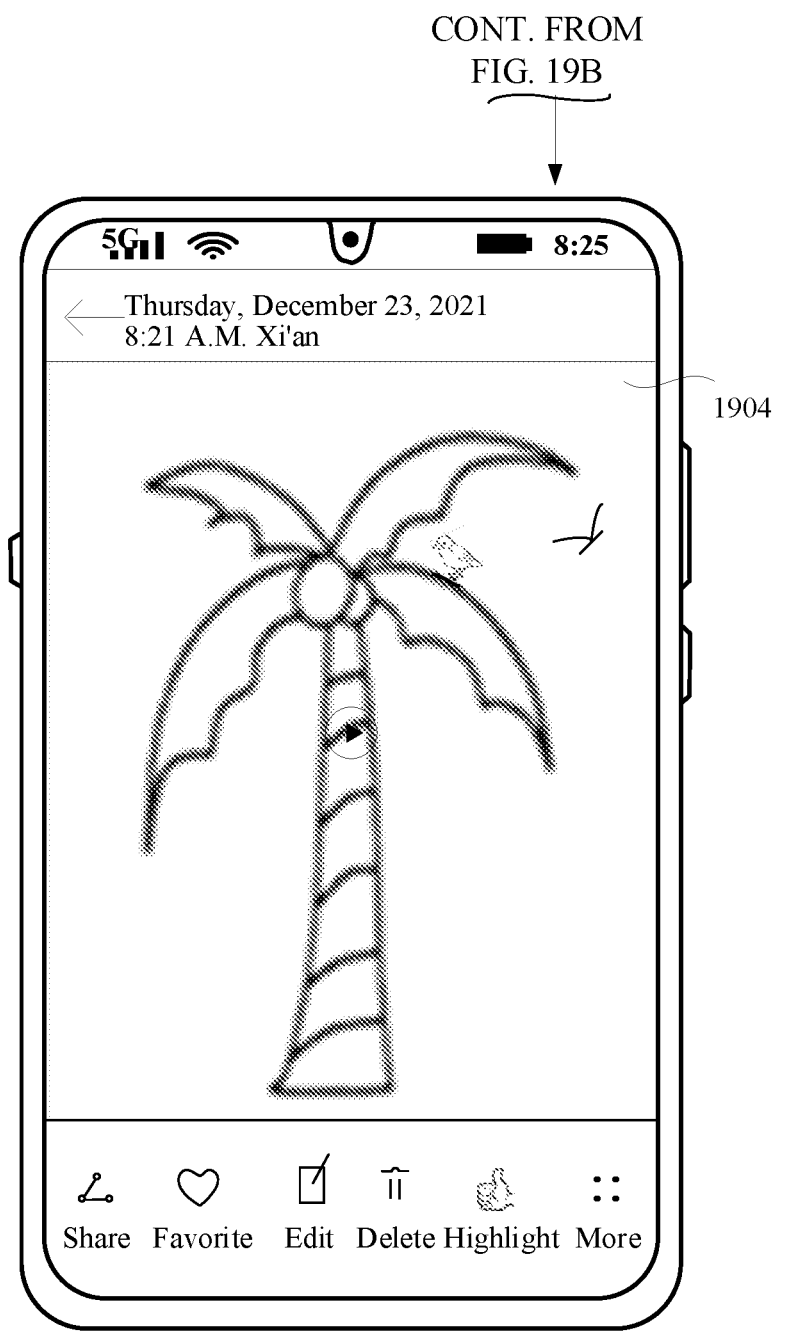

As shown in FIG. 19C, the mobile phone may display a detail page 1904 of the video recording file 1702 in response to a tap operation performed by the user on a back button in the detail page 1903.

Manner (b): After video recording ends, the mobile phone may generate a video recording file. The mobile phone may receive a preset gesture entered by the user on a detail page of the video recording file. In response to the preset gesture, the mobile phone may display a highlight image captured in a process of shooting the video recording file (that is, a video record).

For example, the preset gesture may be any one of a slide upward or downward gesture, an S-type slide gesture, a V-type slide gesture, or the like.

Figure 20A:
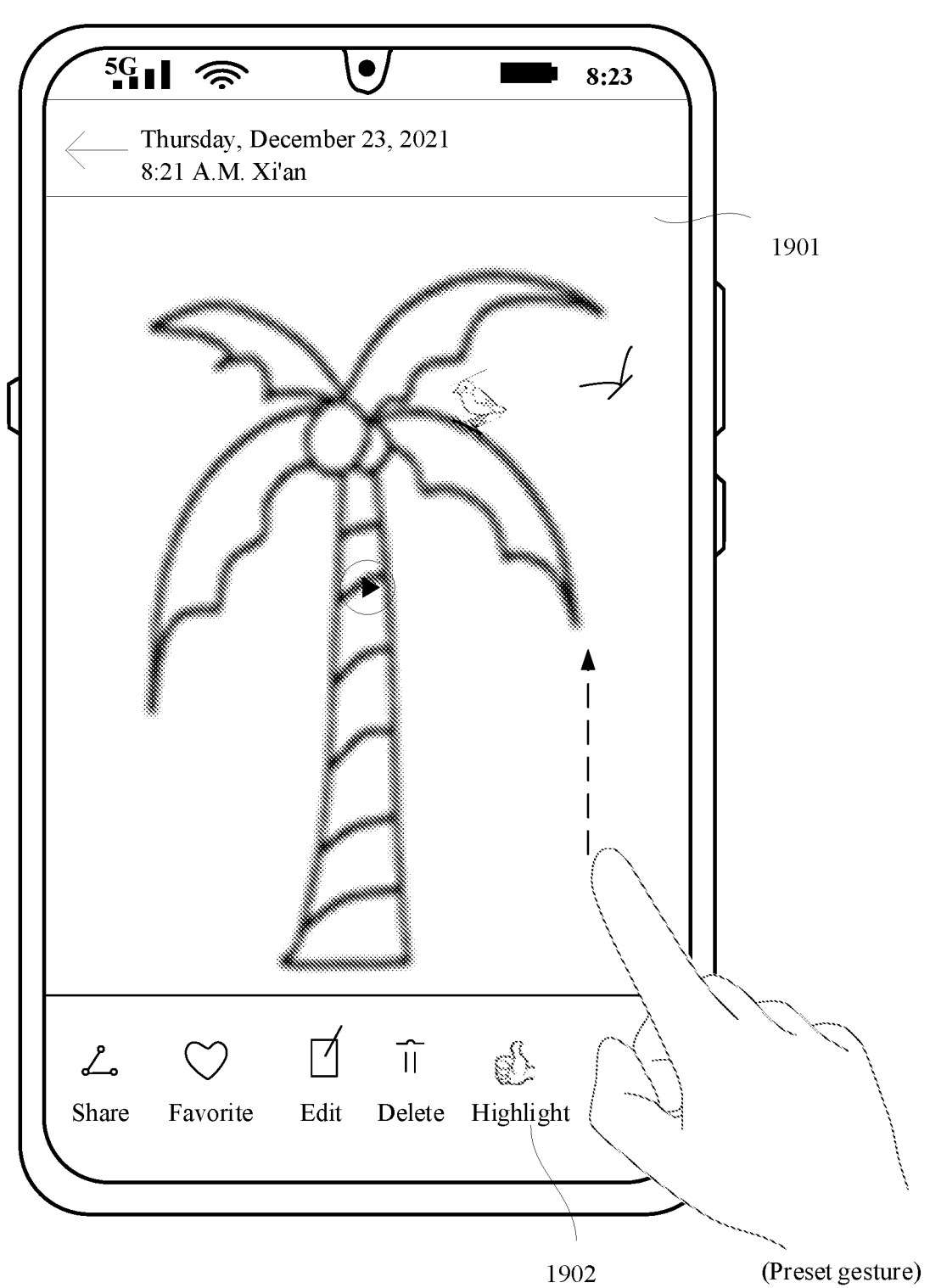
FIG. 20A and FIG. 20B are a schematic diagram of another display interface of a mobile phone during video recording according to an embodiment of this application.

For example, as shown in FIG. 20A, the mobile phone may display a detail page 1901 of the video recording file 1702 in response to a tap operation performed by the user on the video recording file 1702 shown in (a) in FIG. 17 or (b) in FIG. 17. Then, the mobile phone may receive a preset gesture (such as a slide upward gesture) entered by the user on the detail page 1901. In response to the preset gesture, the mobile phone may display a detail page 1903 of a highlight image captured in the process of shooting the video recording file 1702, and display the highlight image to the user.

Figure 20B:
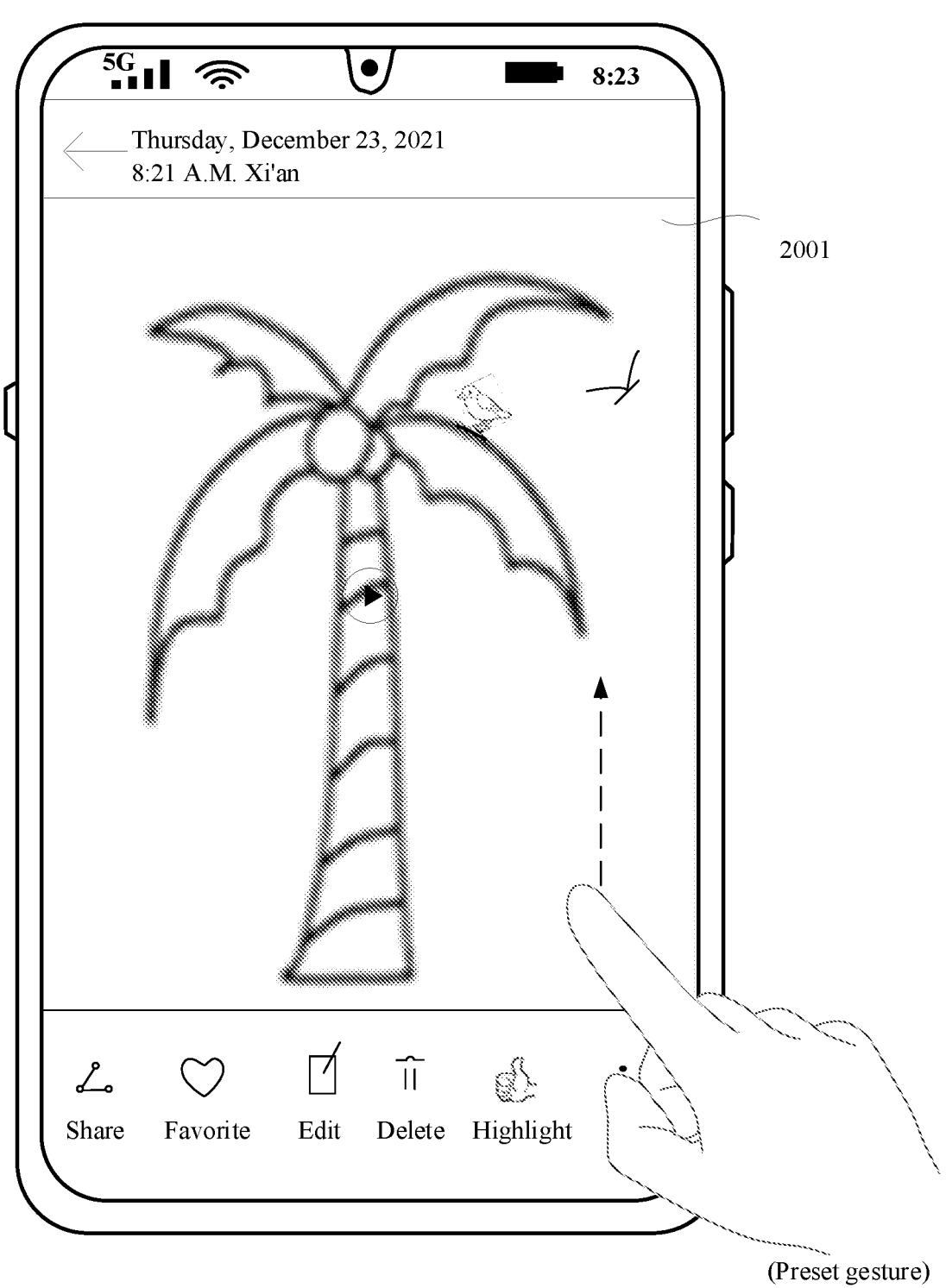

In Manner (b), the detail page of the video recording file 1702 may include the first preset control 1902, or may not include the first preset control 1902. For example, the detail page 1901 shown in FIG. 20A includes the first preset control 1902. For example, a detail page 2001 shown in FIG. 20B does not include the first preset control 1902. The mobile phone may also display, in response to the preset gesture (such as a slide upward gesture) entered by the user on the detail page 2001, the detail page 1903 of the highlight image captured in the process of shooting the video recording file 1702, and display the highlight image to the user.

It should be noted that, after video recording of the mobile phone ends, a manner of triggering the mobile phone to display the highlight image to the user includes but is not limited to the foregoing manner (a) and manner (b). Details are not described in this embodiment of this application.

In this embodiment of this application, the mobile phone may buffer the Bayer image (that is, the image 1) exposed and output by the Sensor in a first buffer queue (Buffer). A plurality of frames of Bayer images may be buffered in the first buffer queue. In this way, even if there is a delay from "outputting the Bayer image corresponding to the candidate frame by the Sensor" to "selecting the candidate frame by the frame selection module", the Bayer image corresponding to the candidate frame may be buffered in the first buffer queue. In this way, the mobile phone may obtain the Bayer image corresponding to the candidate frame (an image 2 shown in FIG. 3) from the first buffer queue.

In addition, as shown in FIG. 3, the mobile phone may further process the image 2 by using a preset RAW domain image processing algorithm to obtain an image 3, which helps improve picture quality of a highlight image. With reference to the foregoing description, it can be learned that: the image LR in the video stream corresponding to the preview image and the video recording file is subsampled. However, the image HR obtained by the ISP by processing the image 3 shown in FIG. 3 is not subsampled. Therefore, the highlight image obtained by encoding the image HR by the encoder 2 is a high-resolution image. Finally, the mobile phone may display the highlight image shown in FIG. 3 to the user after video recording ends.

In conclusion, by using this solution, the mobile phone may automatically select and present the highlight image in the video record to the user, and image quality (such as resolution and picture quality) of the highlight image can be improved.

In some cases, a buffer space of the first buffer queue is limited. Therefore, a first image whose time information is the same as that of the second image may not be buffered in the first buffer queue. In other words, the time information of the first image buffered in the first buffer queue may be greatly different from the time information of the second image. In this case, image content of the first image buffered in the first buffer queue may be greatly different from image content of the second image. Therefore, in this case, the first image that is in the first buffer queue and whose time is closest to the time of the second image (or the first image that is in the first buffer queue and that is with the highest definition) is directly used as the image that is used to code and generate the highlight image (that is, the fourth image in S606 and S607), so that the highlight image corresponding to the second image may not be accurately captured.

Based on this, in some embodiments, the mobile phone may still select, according to the method in the foregoing embodiments, the fifth image described in S605a and S605b from the first buffer queue according to the second image. However, the fifth image described in S605a and S605b can no longer be used as a base image used to generate a highlight image, but the second image is used as a base image used to generate a highlight image. The m frames of first images including the fifth image described in S606 and S607 may be used to enhance picture quality of the second image.

Specifically, as shown in FIG. 21, the method in this embodiment of this application may include S601-S605 and S2101-S2104. For detailed description of S601-S605, refer to the description in the foregoing embodiment. Details are not described herein again.

S2101. The mobile phone performs third processing on the third image by using the ISP, to obtain a sixth image. The third processing includes image processing in a RAW domain and an RGB domain.

It should be noted that, the third processing in S2101 is different from the second processing in S606. The second processing in S606 may include image processing in the RAW domain, the RGB domain, and the YUV domain. The third processing in S2101 includes image processing in the RAW domain and the RGB domain, and does not include image processing in the YUV domain. Therefore, the sixth image obtained by performing S2101 by the mobile phone is different from the fourth image obtained by performing S606 by the mobile phone.

S2102. The mobile phone performs picture quality enhancement on the second image by using the sixth image, to obtain a seventh image.

Figure 22:
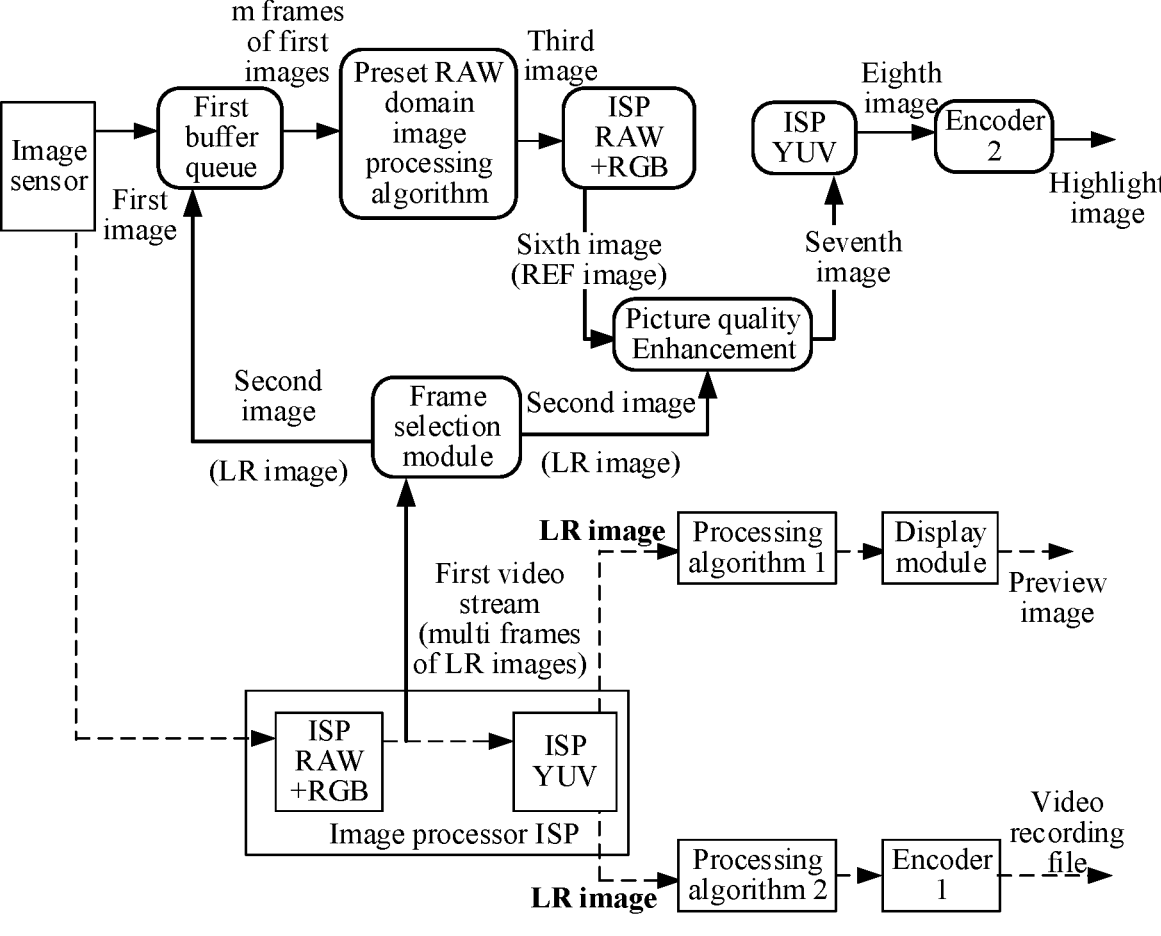
FIG. 22 is a schematic block diagram of another image obtaining method according to an embodiment of this application.

FIG. 22 is a schematic diagram of an image processing principle in a video recording process according to an embodiment of this application. As shown in FIG. 22, an image sensor (Sensor) of the mobile phone is controlled by exposure, so that Bayer images (that is, the first image) can be continuously output. For content description corresponding to S2101-S2105 in FIG. 22, refer to detailed description of S601-S605 in the foregoing embodiment. Details are not described herein again. For a method for generating and displaying a preview image and generating a video recording file in FIG. 22, refer to related descriptions in the foregoing embodiment. Details are not described herein again.

Differently, as shown in FIG. 22, after the mobile phone processes the m frames of first images by using the preset RAW domain image processing algorithm to obtain the third image, the mobile phone does not directly process the third image by using the ISP to obtain an image that is used to encode and generate a highlight image. With reference to the foregoing description, it is considered that image content of the first image buffered in the first buffer queue may be greatly different from image content of the second image. Therefore, in this embodiment, the first image whose time in the first buffer queue is closest to the time in the second image (or the first image whose resolution is highest in the first buffer queue) is not directly used as the image used to encode and generate a highlight image. Instead, the second image is used as a base image used to generate a highlight image. Then, the mobile phone may perform picture quality enhancement on the second image by using the sixth image with higher image quality, to obtain an image with higher resolution and whose image content is basically the same as that of the second image.

Specifically, as shown in FIG. 22, the mobile phone may perform RAW image processing and RGB domain image processing on the third image to obtain the sixth image. It should be understood that the third image is obtained by processing the m frames of first images by using the preset RAW domain image processing algorithm, and the sixth image is obtained by processing the third image by using the ISP. Therefore, the sixth image may include more image details than the second image obtained by ISP processing. In this way, as shown in FIG. 22, the mobile phone may use the sixth image as a reference (REF) image, and perform picture quality enhancement on the second image by using the sixth image (that is, the REF image), to obtain a seventh image with higher image quality.

S2103. The mobile phone performs fourth processing on the seventh image by using the ISP to obtain an eighth image. The fourth processing includes image processing in the YUV domain, and the fourth processing does not include subsampling.

In this embodiment of this application, the mobile phone may process, by using the ISP in a time division multiplexing manner, the first image to obtain the preview image, process the third image to obtain the sixth image, and process the seventh image to obtain the eighth image. That is, that the mobile phone processes the first image by using the ISP to obtain the preview image does not affect that the mobile phone processes the third image by using the ISP to obtain the sixth image, and processes the seventh image to obtain the eighth image. The eighth image is used to generate a highlight image in the video recording process. In other words, processing of the highlight image shown in FIG. 22 by the mobile phone does not affect processing of the preview image and the video recording file shown in FIG. 22 by the mobile phone.

S2104. After video recording ends, the mobile phone displays a highlight image obtained by encoding the eighth image.

As shown in FIG. 22, the mobile phone may process the seventh image by using the ISP to obtain the eighth image (that is, perform S2103). Then, the mobile phone may encode the eighth image by using the encoder 2 to obtain a highlight image. In addition, the mobile phone may display the highlight image to the user after video recording ends.

It should be noted that, for a method for displaying, by the mobile phone, a highlight image obtained by encoding the eighth image by performing S2104, reference may be made to the method for displaying, by the mobile phone, a highlight image obtained by encoding the fourth image by performing S607 in the foregoing embodiment, which is not described in this embodiment of this application.

In some embodiments, after S604, the mobile phone may perform S605a to find, from the first buffer queue buffer, a first image whose difference between a time indicated by time information thereof and a time indicated by time information of the second image is within preset duration.

If the mobile phone performs S605a to find the image from the first buffer queue buffer, the mobile phone uses the found image as the fifth image. Then, the mobile phone may perform S605b and S606-S607.

If the mobile phone cannot find the foregoing image from the first buffer queue buffer by performing S605a, the mobile phone may use, as the fifth image, a frame of first image whose time indicated by the time information is closest to the time indicated by the time information of the second image. Then, the mobile phone may perform S605b and S2101-S2104.

Figure 23:
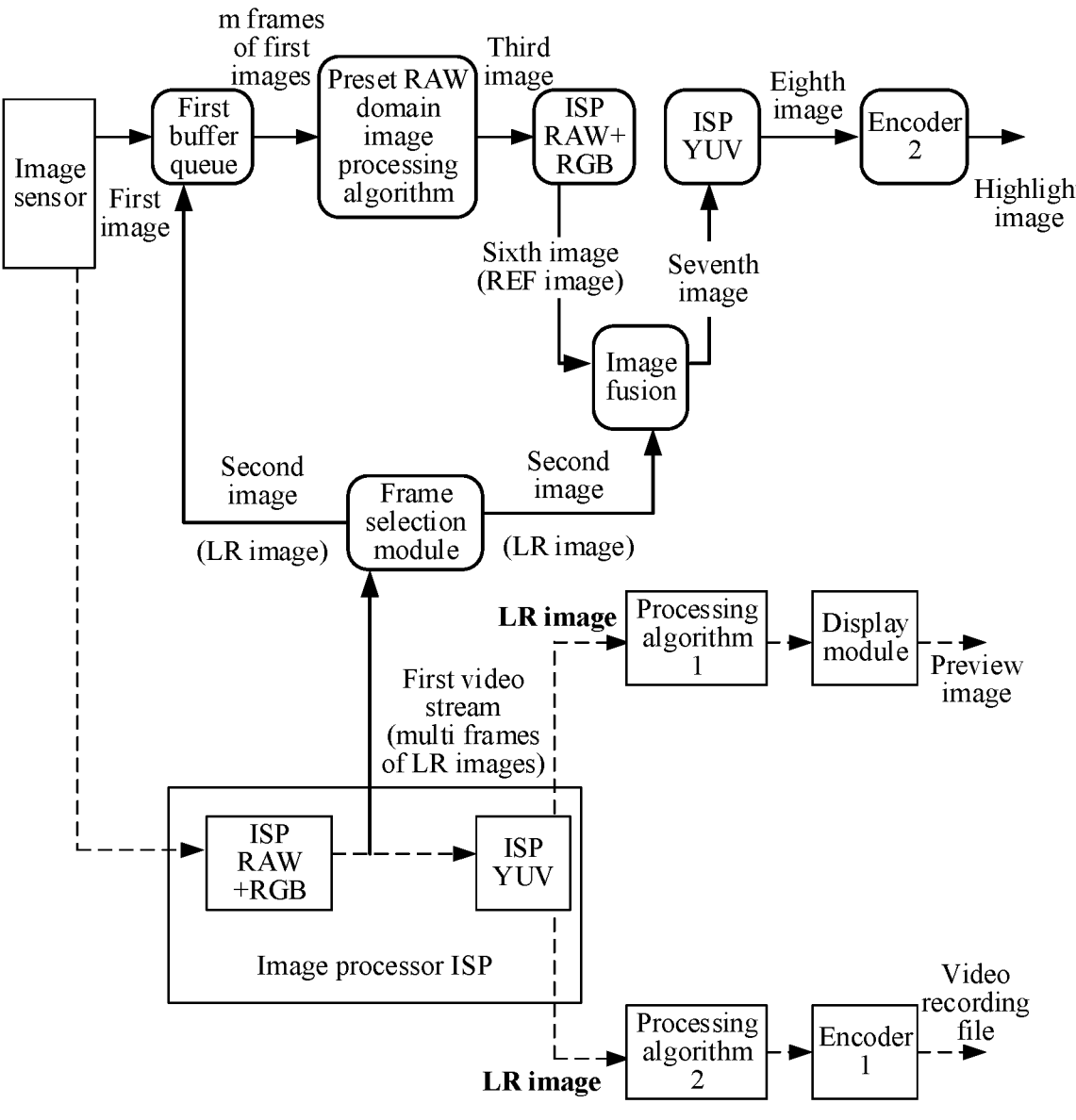
FIG. 23 is a schematic block diagram of another image obtaining method according to an embodiment of this application.

In some embodiments, picture quality enhancement in S2102 may include image fusion. For example, picture quality enhancement shown in FIG. 22 may be replaced with image fusion shown in FIG. 23. In this embodiment, S2102 may be replaced with S2102'. S2102': The mobile phone performs image fusion on the sixth image and the second image to obtain the seventh image. In this embodiment, the third processing described in S2101 may include subsampling, or may not include subsampling.

When the third processing described in S2101 includes subsampling, the resolution of the sixth image obtained by performing the third processing on the third image by the mobile phone by using the ISP is less than the resolution of the third image. Because the second image is an image obtained after the first processing including subsampling, the resolution of the second image is also relatively low. In this case, both the sixth image and the second image may be images with relatively low resolution. Certainly, the resolution of the sixth image may be the same as or different from the resolution of the second image.

Although both the sixth image and the second image may be low-resolution images, the third image is obtained by processing the m frames of first images by using the preset RAW domain image processing algorithm, and the sixth image is obtained by processing the third image by using the ISP. Therefore, the sixth image may include more image details than the second image obtained by ISP processing. Therefore, in this embodiment, the mobile phone performs S1202, so that relatively rich image details in the sixth image can be added to the second image to obtain the seventh image. In this way, image quality of the seventh image can be improved.

For example, the mobile phone may perform picture quality enhancement on the second image by using the sixth image through a fusion network (which is also referred to as an image fusion network) to obtain the seventh image. For a method in which the mobile phone performs image enhancement through the fusion network, refer to a related method in a conventional technology. Details are not described herein again in this embodiment of this application.

In some embodiments, before the mobile phone performs S2102, the sixth image and the second image may be registered. Then, the mobile phone may perform image fusion (Fusion) on the registered second image by using the registered sixth image. Before the mobile phone performs fusion (Fusion), registration is performed on the second image and the sixth image, thereby increasing a success rate and improving an effect of picture quality enhancement performed by the mobile phone.

Generally, registration may include two manners: global registration and local registration.

Feature point detection and matching are usually used for global registration. For example, the mobile phone performs registration on the sixth image and the second image. The mobile phone may detect matched feature points (such as pixels) in the sixth image and the second image. Then, the mobile phone may filter for the matched feature points. If a quantity of good feature points in the matched feature points is greater than a preset threshold 1, the mobile phone may consider that global registration has a good effect, and fusion may be performed.

An optical flow method is usually used for local registration. For example, the mobile phone performs registration on the sixth image and the second image. The mobile phone may first calculate optical flows for the sixth image and the second image. Then, the mobile phone may make a difference between a second image transformed by optical flow registration and a sixth image transformed by optical flow registration. If the difference is less than a preset threshold 2, the mobile phone may consider that local registration has a good effect, and fusion may be performed.

In some other embodiments, before registering the sixth image and the second image, the mobile phone may first compare a texture similarity between the sixth image and the second image. If the texture similarity between the sixth image and the second image is greater than a preset similarity threshold, it indicates that the texture similarity between the sixth image and the second image is high. In this case, a success rate of registering the sixth image and the second image by the mobile phone is high. By using this solution, the success rate of registering by the mobile phone can be improved.

If the texture similarity between the sixth image and the second image is less than or equal to the preset similarity threshold, it indicates that the texture similarity between the sixth image and the second image is low. In this case, the mobile phone does not register the sixth image and the second image. In this way, power consumption of the mobile phone caused by invalid registration is reduced. In this case, the mobile phone may directly use the sixth image as the seventh image.

For example, picture quality enhancement above can implement functions such as denoising, definition improvement, change or expansion of a dynamic range (Dynamic Range), and image super-resolution.

In some embodiments, picture quality enhancement in S2102 may include image super-resolution. For example, picture quality enhancement shown in FIG. 22 may be replaced with image super-resolution shown in FIG. 24. In this embodiment, S2102 may be replaced with S2102". S2102": The mobile phone performs super-resolution on the second image by using the sixth image to obtain the seventh image. In this embodiment, the third processing in S2101 may not include subsampling.

Figure 24:
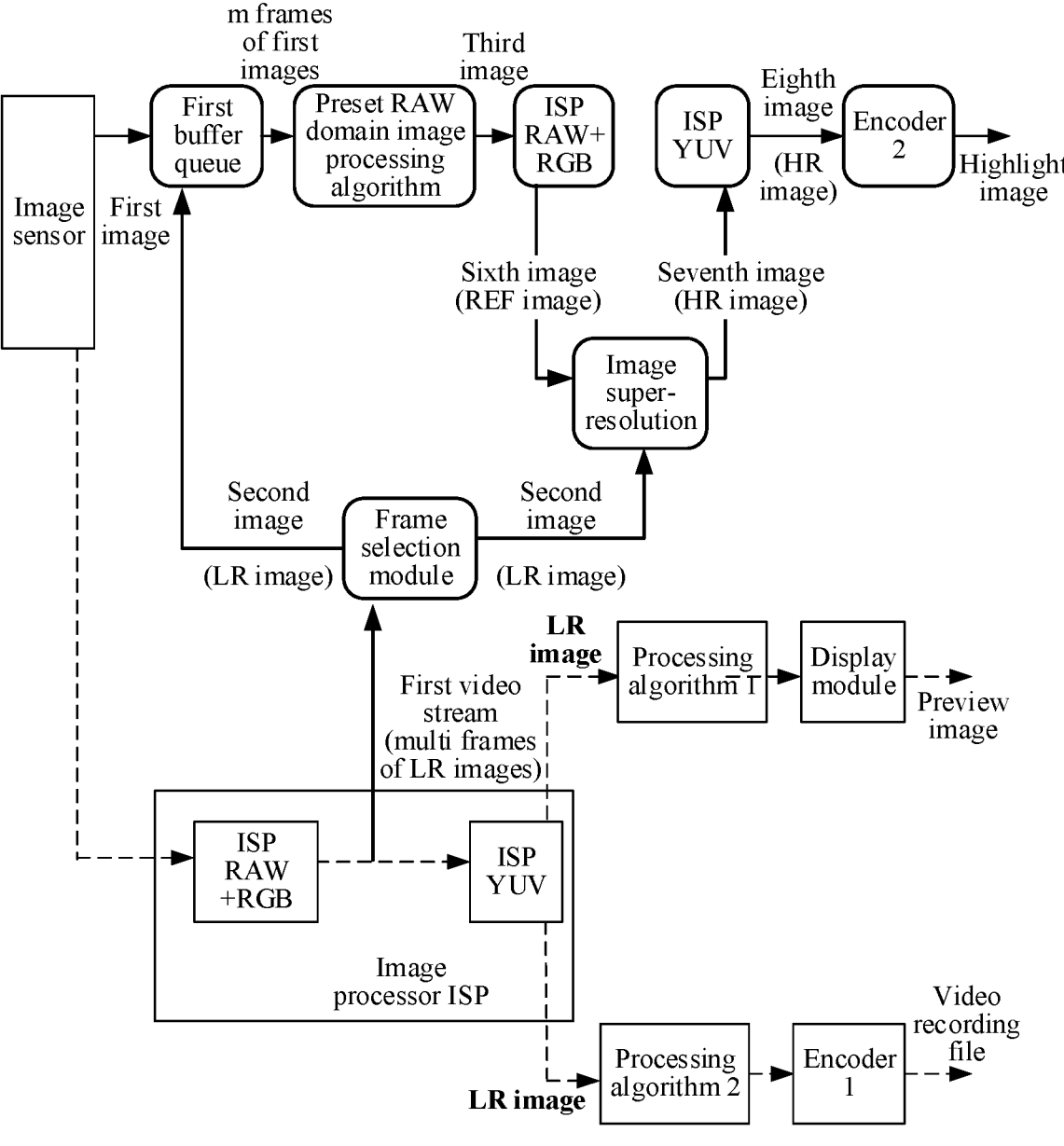
FIG. 24 is a schematic block diagram of another image obtaining method according to an embodiment of this application.

When the third processing in S2101 does not include subsampling, the resolution of the sixth image is higher than the resolution of the third image. As shown in FIG. 24, the sixth image is a high resolution (LR) image. Generally, considering factors such as power consumption and storage space, resolution selected for video recording (namely, recording a video) is lower than resolution of an image output by the Sensor. Therefore, an image output by the ISP to the Sensor is subsampled in the video recording process. Subsampling of the image can reduce resolution of the image. In this way, as shown in FIG. 24, the second image in the video recording file is an LR image. However, a highlight image that the user needs to obtain in the video recording process is a high resolution image. Based on this, the mobile phone may use the sixth image as a guide image, and perform picture quality enhancement (including image super-resolution) on the second image, thereby improving the resolution of the second image.

For example, it is assumed that the resolution of the second image is 1080p, and the resolution of the sixth image is 4 k. When performing S2101, the mobile phone may perform picture quality enhancement on the fourth image whose resolution is 1080p by using the sixth image whose resolution is 4 k as a guide image. The resolution of the picture-quality-enhanced second image (that is, the seventh image) may be 4 k.

For example, the image super-resolution in this embodiment of this application may be reference super-resolution (REF SR) based on a reference frame.

In some other embodiments, if the resolution of the sixth image is higher than the resolution of the second image, the mobile phone may perform S2102". If the resolution of the sixth image is less than or equal to the resolution of the second image, the mobile phone may perform S2102'.

In this embodiment of this application, even if the first image whose time information is the same as the time information of the second image is not buffered in the first buffer queue, and image content of the buffered first image in the first buffer queue is greatly different from image content of the second image, the mobile phone may also use the second image as a base image used to generate a highlight image, and use an image that is obtained by processing the first image in the first buffer queue by using the preset RAW domain image processing algorithm as a guide image, so as to improve image quality of the second image.

In an embodiment of this application, the method may be applied to highlight frame identification and generation after video recording of the mobile phone ends. In the video recording process of the mobile phone, the mobile phone may automatically select a reference (REF) image that meets a requirement in a video record and buffer the reference image in a second buffer queue. After video recording ends, the mobile phone may determine a candidate image from the video recording file in response to a selection operation performed by the user on any frame of image in the video recording file. The candidate image may be an image preferred by the user in the video recording file. Then, the mobile phone may perform picture quality enhancement on the candidate image by using the foregoing REF, so as to generate a highlight image and present the highlight image to the user.

An action of generating and buffering a REF image in the video recording process of the mobile phone and an action of generating a highlight image after video recording of the mobile phone ends are invisible to the user. After video recording of the mobile phone ends, not only a recorded video can be presented to the user, but also the highlight image in the video record can be presented, so as to achieve an effect of Magic Take.

Figure 25A:
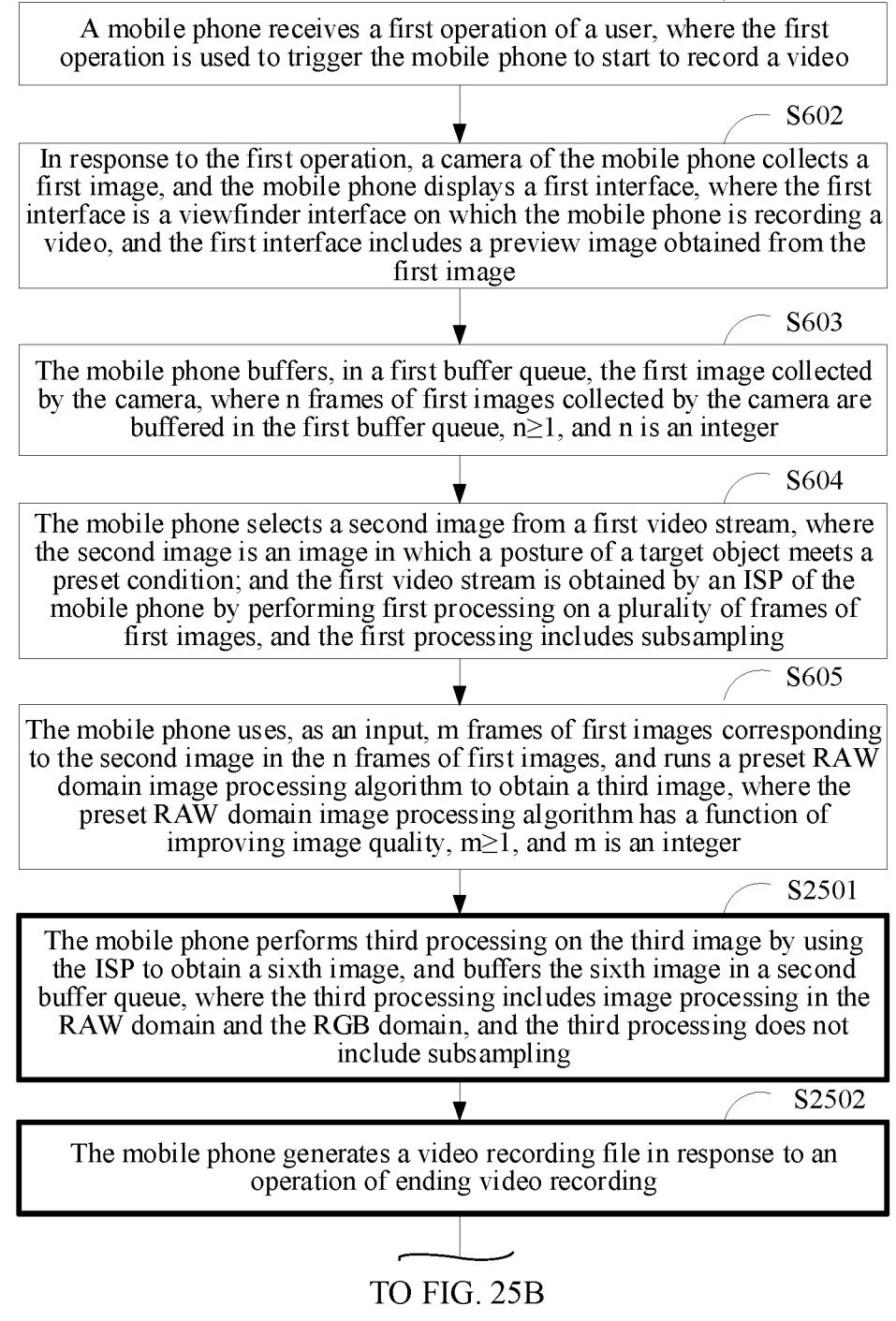

Specifically, as shown in FIG. 25A and FIG. 25B, the method in this embodiment of this application may include S601-S605 and S2501-S2506. For detailed description of S601-S605, refer to the description in the foregoing embodiment. Details are not described herein again.

S2501. The mobile phone performs third processing on the third image by using the ISP to obtain a sixth image, and buffers the sixth image in a second buffer queue. The third processing includes image processing in the RAW domain and the RGB domain, and the third processing does not include subsampling.

The third processing in S2501 is different from the second processing in S606. The second processing in S606 may include image processing in the RAW domain, the RGB domain, and the YUV domain. The third processing in S2101 includes image processing in the RAW domain and the RGB domain, and does not include image processing in the YUV domain. Therefore, the sixth image obtained by performing S2501 by the mobile phone is different from the fourth image obtained by performing S606 by the mobile phone. The second buffer queue may buffer a plurality of frames of sixth images.

On one hand, the third processing in S2501 does not include subsampling. Therefore, the sixth image buffered in the second buffer queue is a high-resolution HR image. In addition, the sixth image is an image that is processed by using the preset RAW domain image processing algorithm and has relatively rich image details and high image quality.

On the other hand, the sixth image is generated by the mobile phone by performing S605 and S2501 based on the second image. The second image is an image that includes the target object and is included in the video recording file. It can be learned that the sixth image also includes the image of the target object. In this way, after video recording of the mobile phone ends, it is more likely that the user wants to select, from the video recording file, a frame of image corresponding to the sixth image as a highlight image.

Therefore, in this embodiment of this application, the mobile phone may buffer a plurality of frames of sixth images in the second buffer queue, and is configured to: when a user requirement of selecting a frame of image from the video recording file as a highlight image appears, perform picture quality enhancement (including image super-resolution) on the frame of image by using the sixth image in the second buffer queue, so as to obtain a highlight image with relatively high image quality (including relatively high resolution).

S2502. The mobile phone generates a video recording file in response to an operation of ending video recording.

For example, in response to a tap operation (that is, the first operation) performed by the user on the "start video recording" button 702 shown in FIG. 7, the mobile phone may perform S601-S605 and S2501. For example, the operation of ending video recording in S2502 may be a tap operation performed by the user on the "end video recording" button 706 shown in FIG. 7 or FIG. 16. The mobile phone may end video recording and generate a video recording file in response to the tap operation performed by the user on the "end video recording" button 706 shown in FIG. 7 or FIG. 16. For example, in response to a tap operation performed by the user on a "stop recording" button 706 shown in FIG. 16, the mobile phone may display a video viewfinder interface 1601 shown in FIG. 16. The video viewfinder interface 1601 is a viewfinder interface before the mobile phone starts recording. In comparison with the video viewfinder interface 701 shown in FIG. 7, a photo in a photo option on the viewfinder interface of the mobile phone is updated from 708 shown in FIGS. 7 to 1602 shown in FIG. 16.

The mobile phone may display an album list interface 1701 shown in (a) in FIG. 17 or an album list interface 1703 in response to an enable operation performed by the user on an album application. The album list interface 1701 includes one or more photos and videos that can be stored in the mobile phone. For example, the album list interface 1701 and the album list interface 1703 include a video recording file 1702 recorded by the mobile phone.

In this embodiment, a highlight image is not generated when video recording of the mobile phone ends. Therefore, as shown in FIG. 7, the album list interface 1701 does not include the photo 1704 shown in (b) in FIG. 17.

S2503. In a process of playing the video recording file, the mobile phone determines a candidate image from the video recording file in response to a selection operation performed by the user on one frame of image in the video recording file.

Figure 26:
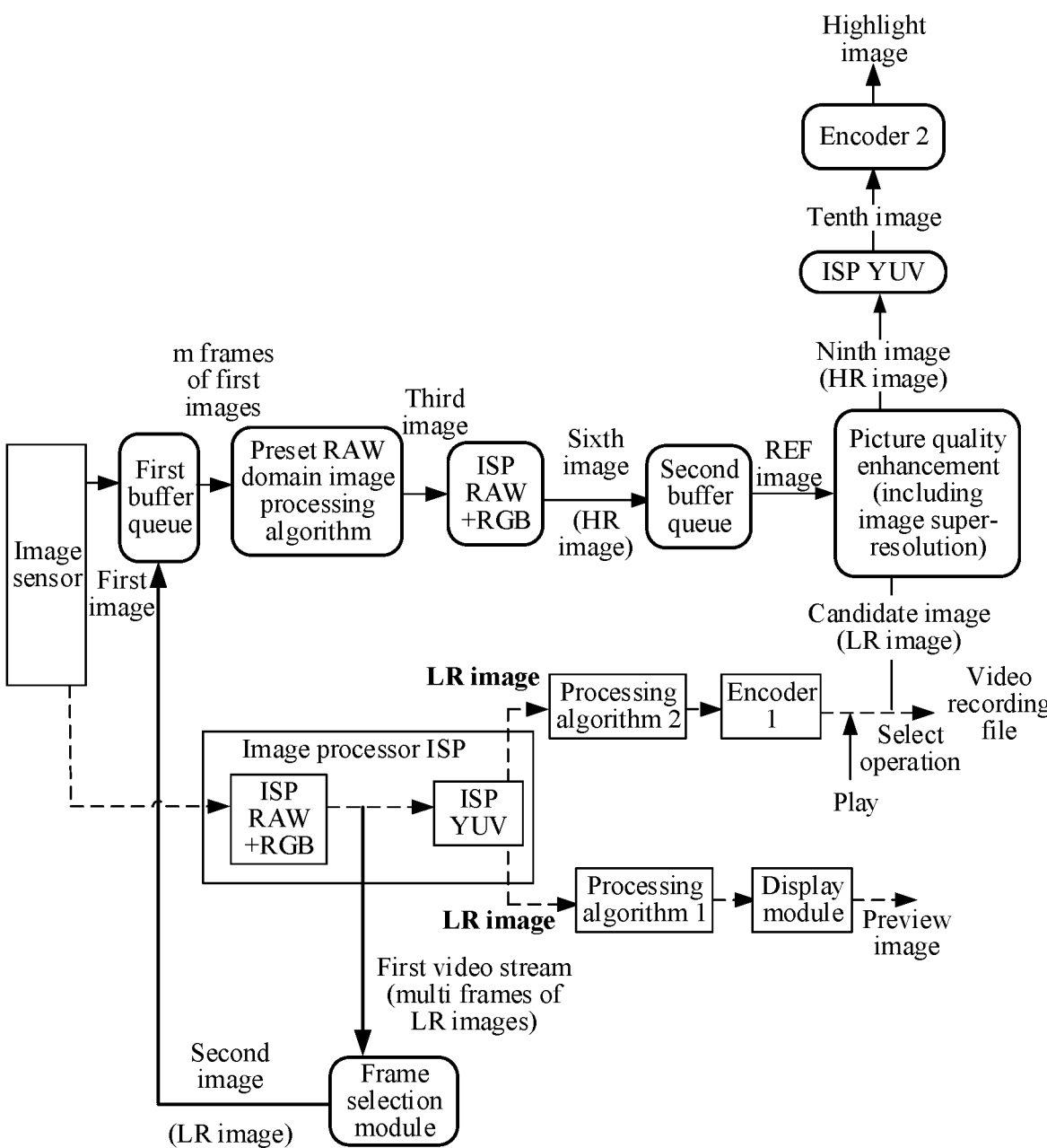
FIG. 26 is a schematic block diagram of another image obtaining method according to an embodiment of this application.

Compared with the resolution of the sixth image buffered in the second buffer queue, the resolution of the image (including the candidate image) in the video recording file is lower. As shown in FIG. 26, the sixth image is an HR image, and the candidate image is an LR image. For detailed description of S2503, refer to descriptions in the following embodiments. Details are not described herein.

S2504. The mobile phone selects a reference (REF) image corresponding to the candidate image from the second buffer queue, and performs picture quality enhancement on the candidate image by using the REF image to obtain a ninth image.

In the plurality of frames of sixth images buffered in the second buffer queue, a time at which the image sensor of the camera outputs the REF image is closest to a time at which the image sensor of the camera outputs the candidate image. The time information of the sixth image is the same as the time information of the third image. The time information of the third image is the same as the time information of the fifth image in the m first images.

In this embodiment of this application, the mobile phone may buffer a sixth image with high picture quality and high resolution in the second buffer queue Buffer. The second buffer queue may buffer a plurality of frames of sixth images. In this way, when a user requirement for selecting a frame of image from a video recording file as a highlight image appears, a sixth image that is in the second buffer queue and whose time is closest to time of the frame of image may be used as a guide image, and picture quality enhancement (including image super-resolution) is performed on the frame of image, so as to obtain a highlight image with relatively high image quality.

The sixth image buffered in the second buffer queue is an HR image, and the REF image is also an HR image. Therefore, the ninth image obtained by performing picture quality enhancement on the candidate image by using the REF image is also an HR image.

For example, the picture quality enhancement in S2504 may include image super-resolution. For example, the image super-resolution may be REF SR. For detailed description of the REF SR, refer to the description in the foregoing embodiment. Details are not described herein again.

In some other embodiments, the picture quality enhancement in S2504 may include image fusion. For detailed description of image fusion, refer to the description in the foregoing embodiment. Details are not described herein again.

S2505. The mobile phone performs a fourth processing on the ninth image by using the ISP to obtain a tenth image. The fourth processing includes image processing in the YUV domain, and the fourth processing does not include subsampling.

In this embodiment of this application, the mobile phone may process, by using the ISP in a time division multiplexing manner, the first image to obtain the preview image, process the third image to obtain the sixth image, and process the ninth image to obtain the tenth image. That is, that the mobile phone processes the first image by using the ISP to obtain the preview image does not affect that the mobile phone processes the third image by using the ISP to obtain the sixth image, and processes the ninth image to obtain the tenth image. The tenth image is used to generate a highlight image in the video recording process. In other words, processing of the highlight image shown in FIG. 26 by the mobile phone does not affect processing of the preview image and the video recording file shown in FIG. 26 by the mobile phone.

S2506. The mobile phone displays a highlight image obtained by encoding the tenth image.

FIG. 26 is a schematic diagram of an image processing principle in a video recording process according to an embodiment of this application. As shown in FIG. 26, an image sensor (Sensor) of the mobile phone is controlled by exposure, so that Bayer images (that is, the first image) can be continuously output. For content description corresponding to S2501-S2505 in FIG. 26, refer to detailed description of S601-S605 in the foregoing embodiment. Details are not described herein again. For a method for generating and displaying a preview image and generating a video recording file in FIG. 26, refer to related descriptions in the foregoing embodiment. Details are not described herein again.

The mobile phone may perform processing in S2501 on the third image to obtain the sixth image shown in FIG. 26, and buffer the sixth image in the second buffer queue shown in FIG. 26. After video recording ends, the mobile phone can generate the video recording file shown in FIG. 26. In a process in which the mobile phone plays the video recording file shown in FIG. 26, the mobile phone may perform S2503 to receive an operation performed by the user on a frame of image in the video recording file, and determine the candidate image shown in FIG. 26 from the video recording file. Then, the mobile phone may perform S2504 to select the REF image shown in FIG. 26 from the second buffer queue, and perform, by using the REF image, picture quality enhancement on the candidate image shown in FIG. 26 to obtain the ninth image. Then, the mobile phone may perform S2505 to process the ninth image to obtain the tenth image shown in FIG. 26. Finally, the mobile phone may encode the tenth image by using the encoder 2 shown in FIG. 26, and perform S2506 to display a highlight image obtained by means of encoding.

It should be noted that, for a method for displaying, by the mobile phone, a highlight image obtained by encoding the tenth image by performing S2506, reference may be made to the method for displaying, by the mobile phone, a highlight image obtained by encoding the fourth image by performing S607 in the foregoing embodiment, which is not described in this embodiment of this application.

The mobile phone performs the solution described in S601-S607, so that a highlight image can be obtained in the video recording process of the mobile phone, and displayed after video recording ends. In other words, by using the solution described in S601-S607, Magic Take of online video recording of the mobile phone can be implemented. Magic Take means that after video recording ends, the mobile phone can not only obtain the video recording file, but also obtain the highlight image captured in a video record.

The mobile phone performs S601-S605 and S2501-S2506, so that a plurality of frames of guide images that can be used to support the mobile phone to obtain a highlight image can be obtained during the video recording process and buffered. Then, in the process of playing the video recording file after video recording of the mobile phone ends, the buffered guide image may be used to enhance picture quality of the candidate image selected by the user, to obtain a highlight image. In other words, by using the solutions described in S601-S605 and S2501-S2506, the Magic Take function of video recording of the mobile phone may be implemented in an offline manner after video recording ends.

It should be noted that, the mobile phone may support both the foregoing online solution and offline solution. That is, in some embodiments, the method in this embodiment of this application may include S601-S605, S606-S607/S2101-S2104, and S2501-S2506.

For example, this embodiment of this application describes "the operation of selecting a frame of image by the user in the video recording file" described in S2503, and a method for determining, by the mobile phone, a candidate image from the video recording file in response to the selection operation. An implementation in which the user selects a frame of image from the video recording file may include at least the following manners (A) to (E):

Manner (A): A selection operation performed by the user on a frame of image in the video recording file may be a tap operation performed by the user on a second preset control in a detail page of the video recording file (for example, any operation such as a tap operation, a double-tap operation, or a long-press operation). The second preset control is used to trigger the mobile phone to automatically generate one or more frames of highlight images in the video recording file. A quantity of one or more frames of highlight images in the video recording file is the same as a quantity of sixth images buffered in the second buffer queue.

Specifically, S2503 may include: In response to the tap operation performed by the user on the second preset control, the mobile phone may determine, from the video recording file, an image corresponding to each frame of sixth image buffered in the second buffer queue. A frame of image corresponding to each frame of sixth image is a candidate image. Time information of the sixth image is the same as time information of a frame of image corresponding to the sixth image. In Manner (A), the REF image corresponding to the candidate image in S2504 is specifically a sixth image corresponding to the candidate image.

Figure 27A:
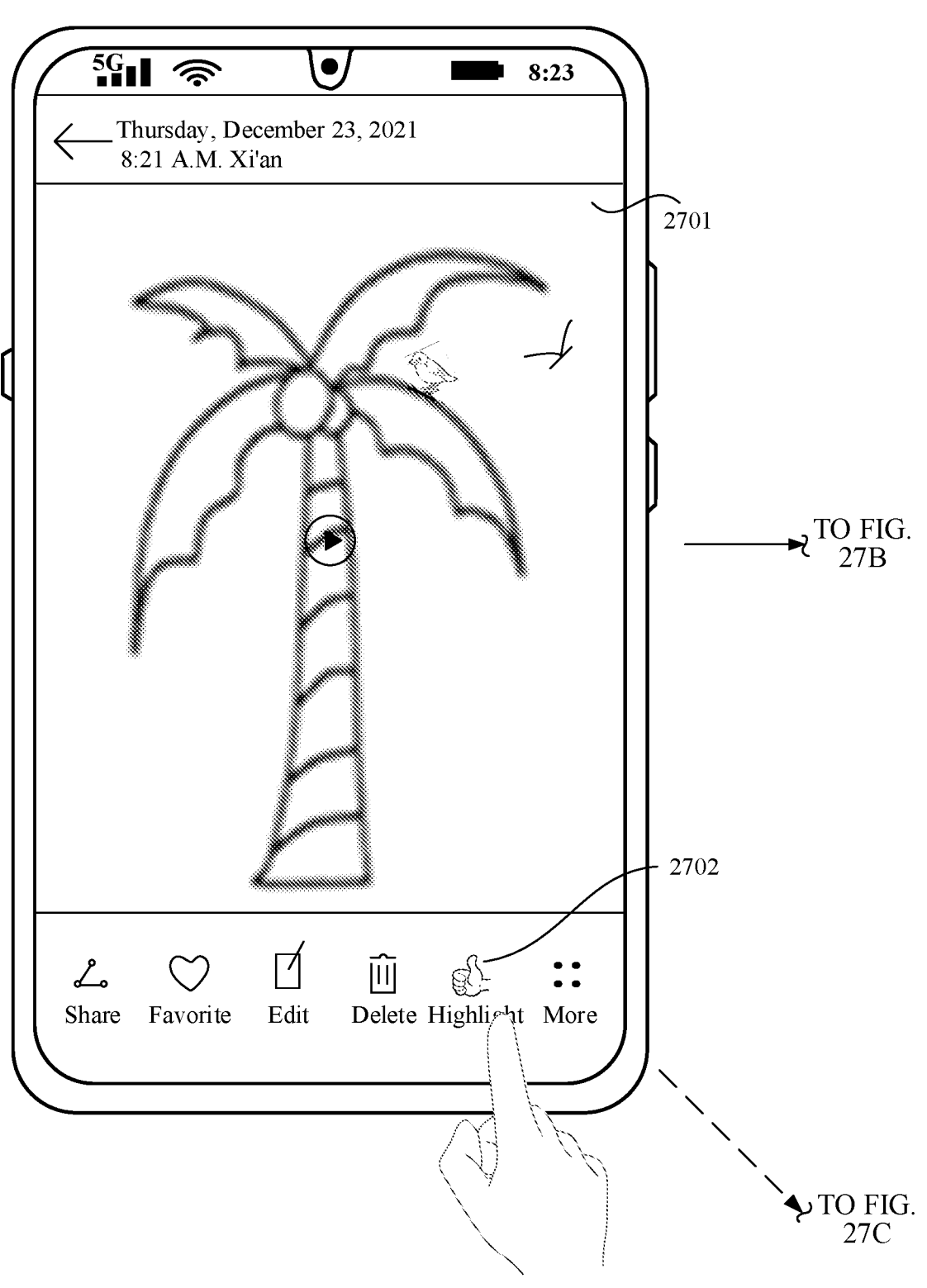
FIG. 27A to FIG. 27C are a schematic diagram of another display interface of a mobile phone during video recording according to an embodiment of this application.
Figure 27B:
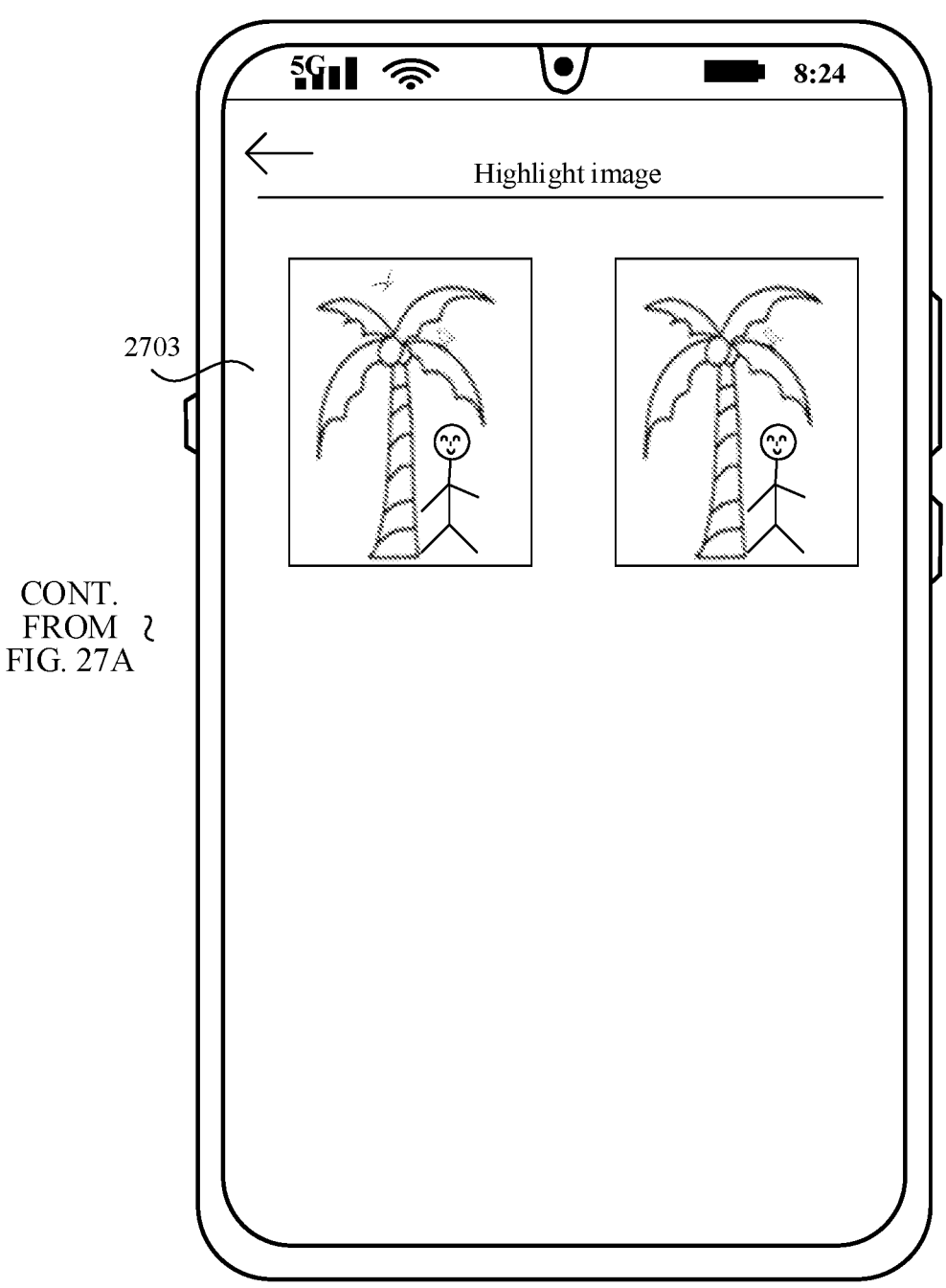

For example, as shown in FIG. 27A, the mobile phone may display a detail page 2701 of the video recording file 1702 in response to a tap operation performed by the user on the video recording file 1702 shown in (a) in FIG. 17. As shown in FIG. 27A, the detail page 2701 includes a second preset control 2702. It is assumed that two frames of sixth images are buffered in the second buffer queue, and in response to the tap operation performed by the user on the second preset control 2702, as shown in FIG. 27B, the mobile phone may display a list page 2703 of a highlight image captured in the process of shooting the video recording file 1702, where the list page 2703 includes two frames of highlight images. It is assumed that one frame of sixth image is buffered in the second buffer queue, and in response to the tap operation performed by the user on the second preset control 2702, as shown in FIG. 27C, the mobile phone may display a detail page 2704 of the highlight image captured in the process of shooting the video recording file 1702, and display the highlight image to the user.

Manner (B): A selection operation performed by the user on a frame of image in the video recording file may be a tap operation (for example, any operation such as a tap operation, a double-tap operation, or a long-press operation) performed by the user on a third preset control in a playback interface of the video recording file in the process of playing the video recording file by the mobile phone. In the process of playing the video recording file by the mobile phone, when the mobile phone plays an image of interest to the user, the user may tap the third preset control. In response to the tap operation performed by the user on the third preset control, the mobile phone uses a frame of image played by the mobile phone when the user taps the third preset control (or an image played before this frame of image, which is p frames apart from this frame of image) as a candidate image.

Figure 28A:
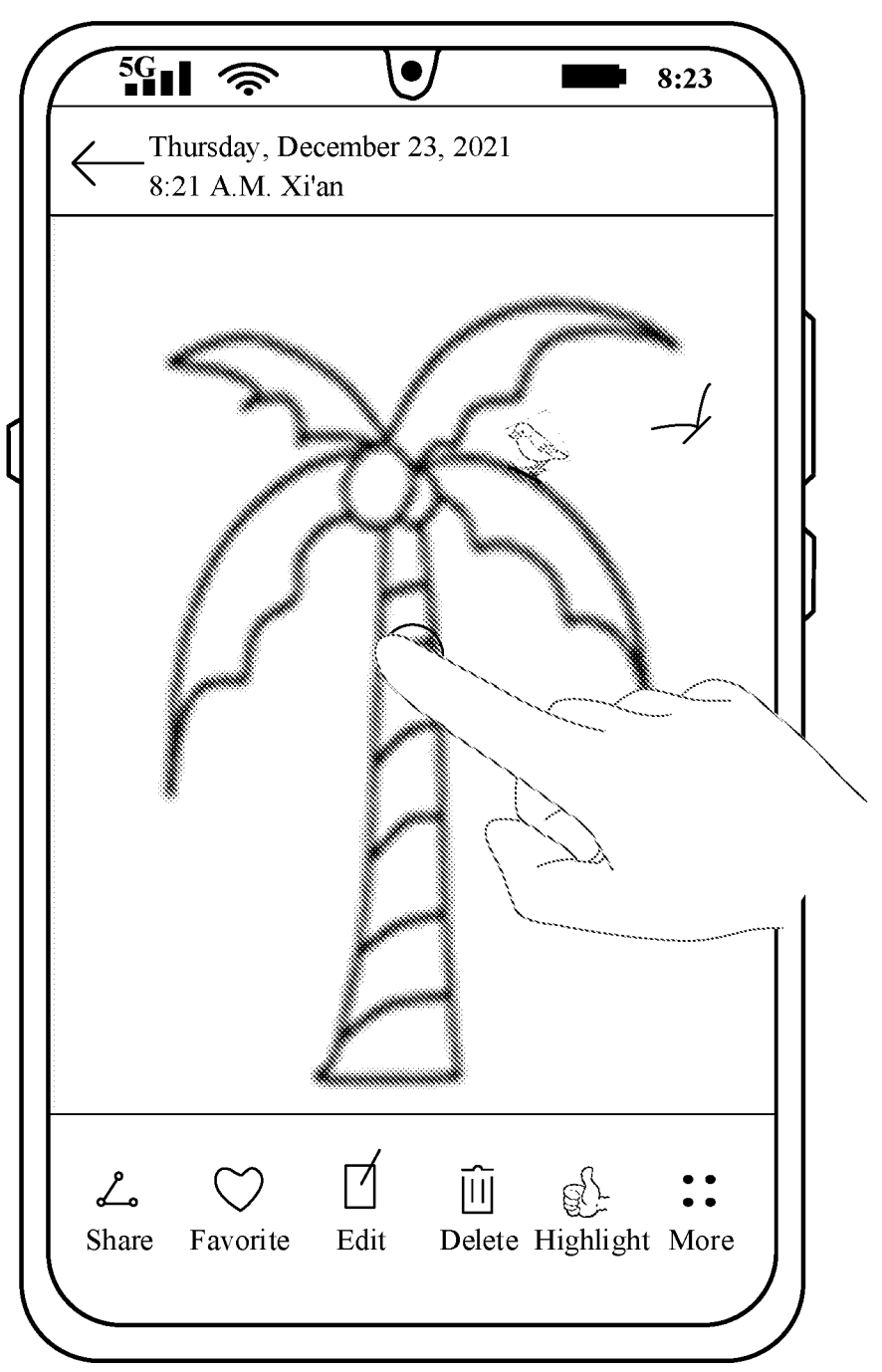
FIG. 28A to FIG. 28C are a schematic diagram of another display interface of a mobile phone during video recording according to an embodiment of this application.

For example, the mobile phone may receive a tap operation on a playback button in a detail page of a video recording file shown in FIG. 28A. In response to the tap operation performed by the user on the playback button in the detail page of the video recording file, the mobile phone can start to play the video recording file. For example, the mobile phone may display a playback interface of a video recording file shown in FIG. 28B or FIG. 28C. The playback interface of the video recording file shown in FIG. 28B or FIG. 28C includes a third preset control 2801. In this embodiment of this application, a position of the third preset control 2801 in the playback interface of the video recording file is not limited.

Figures 27A, 27C:
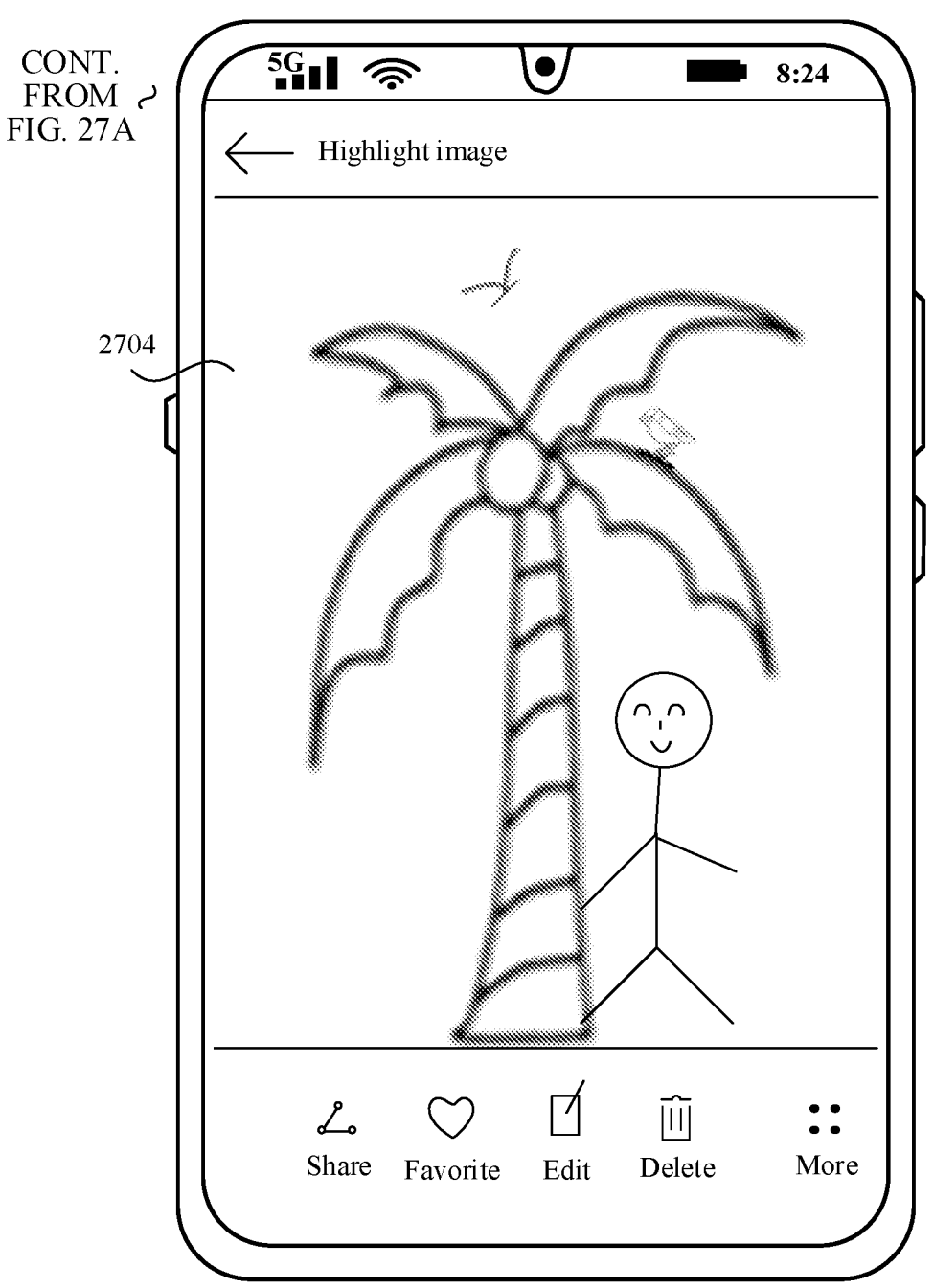
Figure 28B:
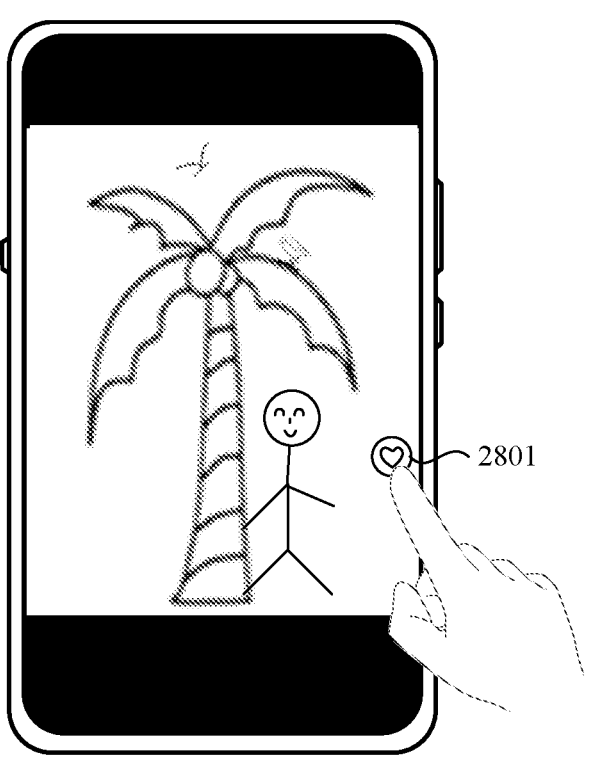
Figure 28C:
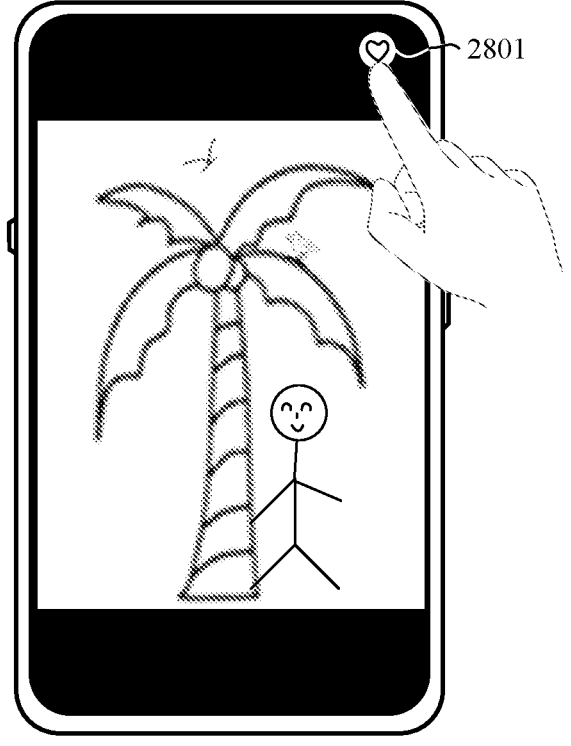
Figure 29:
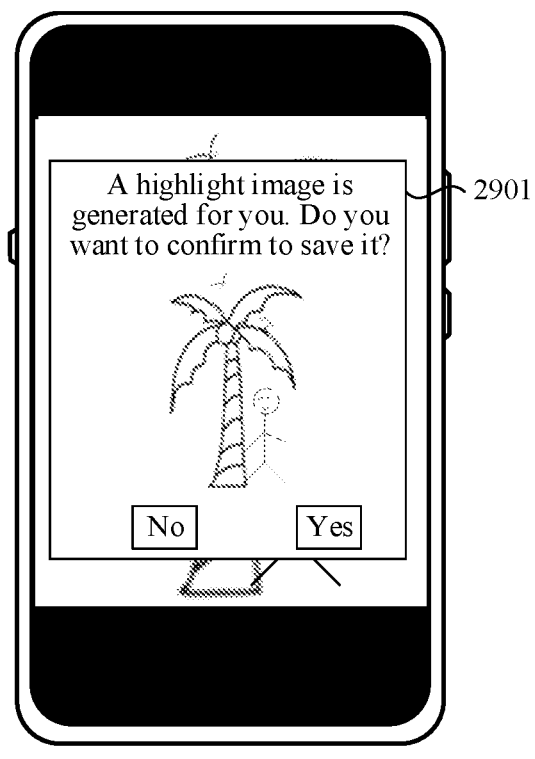
FIG. 29 is a schematic diagram of another display interface of a mobile phone during video recording according to an embodiment of this application.

In response to a tap operation performed by the user on the third preset control 2801 shown in FIG. 28B or FIG. 28C, the mobile phone may display the detail page 2704 of the highlight image shown in FIG. 27C, or the mobile phone may display prompt information 2901 shown in FIG. 29. The prompt information 2901 is used to request the user to confirm whether to save the highlight image. For example, the prompt information 2901 may be "A highlight image is generated for you. Do you want to confirm to save it?". The prompt information 2901 may further be used to preview the highlight image. In response to the tap operation performed by the user on a "Yes" button in the prompt information "2901", the mobile phone can save the highlight image in the album. In response to the tap operation performed by the user on a "No" button in the prompt information "2901", the mobile phone does not save the highlight image. The mobile phone continues to play the video recording file.

Manner (C): A selection operation performed by the user on a frame of image in the video recording file may include a pause playback operation entered by the user and an operation of pausing playback to enlarge a frame of image in the process of playing the video recording file by the mobile phone.

For example, the pause playback operation may be a tap operation performed by the user on a pause playback button in a playback interface of the video recording file. The pause playback operation may alternatively be an adjustment operation performed by the user on a progress bar in the playback interface of the video recording file. In response to the adjustment operation performed by the user on the progress bar, the mobile phone can display a frame of image in the video recording file corresponding to a current status of the progress bar.

For example, the pause playback operation is a tap operation performed by the user on the pause playback button in the playback interface of the video recording file. In the process of playing the video recording file by the mobile phone, when the mobile phone plays an image of interest to the user, the user may tap a pause button to control the mobile phone to pause playing the video recording file, and then the user may control the mobile phone to enlarge the current frame of image. In response to the pause playback operation and the enlarge image operation, the mobile phone may use a frame of image enlarged by the user as a candidate image.

Manner (D): A selection operation performed by the user on a frame of image in the video recording file may be an operation of repeatedly viewing a segment by the user in the process of playing the video recording file by the mobile phone. One segment may include a plurality of frames of images. In the process of playing the video recording file, if the operation of repeatedly viewing a segment in the video recording file by the user is received, the mobile phone may select a frame of image from the segment as a candidate image. For the method in which the mobile phone may select a frame of image from the segment as a candidate image, refer to the foregoing embodiment. The mobile phone may select a second image from the first video stream. Alternatively, the candidate image may be an image with highest resolution and integrity in the segment.

Manner (E): A selection operation performed by the user on a frame of image in the video recording file may include a pause playback operation entered by the user in the process of playing the video recording file by the mobile phone.

For example, the pause playback operation may be a tap operation performed by the user on a pause playback button in a playback interface of the video recording file. The pause playback operation may alternatively be an adjustment operation performed by the user on a progress bar in the playback interface of the video recording file. In response to the adjustment operation performed by the user on the progress bar, the mobile phone can display a frame of image in the video recording file corresponding to a current status of the progress bar.

For example, the pause playback operation is an adjustment operation performed by the user on the progress bar. In the process of playing the video recording file by the mobile phone, the user may adjust the progress bar in the playback interface of the video recording file, so as to control the mobile phone to display a frame of image that is of interest to the user and in the video recording file. The mobile phone can receive an adjustment operation performed by the user on the progress bar, and display an image in the video recording file according to a change of the progress bar. After the mobile phone detects that the finger of the user leaves the progress bar, the mobile phone may use a frame of image in the video recording file corresponding to the progress bar as a candidate image when the finger of the user leaves the progress bar.

It should be noted that, "the selection operation performed by the user on a frame of image in the video recording file" in S2503 and a method for determining the candidate image from the video recording file by the mobile phone in response to the selection operation include but are not limited to the methods shown in Manner (A) to Manner (D). Another method is not described in this embodiment of this application.

Some other embodiments of this application provide an electronic device. The electronic device may include: the foregoing display screen, a camera, a memory, and one or more processors. The display screen, the camera, and the memory are coupled to the processor. The memory is configured to store computer program code, and the computer program code includes computer instructions. When the processor executes the computer instructions, the electronic device can perform various functions or steps performed by the mobile phone in the above method embodiments. For a structure of the electronic device, refer to the structure of the mobile phone shown in FIG. 4.

Figure 30:
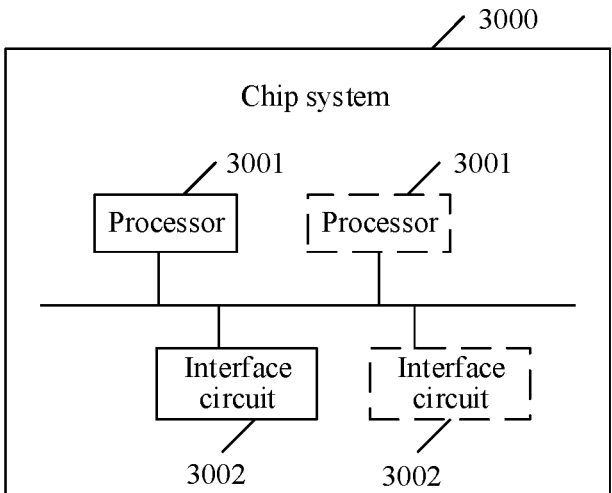
FIG. 30 is a schematic structural diagram of a chip system according to an embodiment of this application.

An embodiment of this application further provides a chip system. As shown in FIG. 30, the chip system 3000 includes at least one processor 3001 and at least one interface circuit 3002. The processor 3001 and the interface circuit 3002 may be interconnected by using a line. For example, the interface circuit 3002 may be configured to receive a signal from another apparatus (for example, a memory of an electronic device). In another example, the interface circuit 3002 may be configured to send a signal to another apparatus (for example, the processor 3001). For example, the interface circuit 3002 may read instructions stored in the memory and send the instructions to the processor 3001. When the instructions are executed by the processor 3001, the electronic device may be enabled to perform the steps in the foregoing embodiments. Certainly, the chip system may further include other discrete devices. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product, the computer program product, when running on a computer, causing the computer to perform the functions or steps performed by the mobile phone in the method embodiments.

It may be clearly learned by a person skilled in the art from the foregoing descriptions of the implementations that for convenience and brevity of description, only division into the foregoing functional modules is used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated. A part displayed as a unit may be one physical unit or a plurality of physical units, located at the one position, or may be distributed to different positions. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, a compact disc, or the like.

The foregoing content is merely specific implementations of this application, but is not intended to limit the protection scope of this application. Any variation or replacement made within the technical scope disclosed in this application shall fall within the protection scope of this application. Therefore, the protection scope of this application shall be used as protection scope of the claims.

What is claimed is:

1. An image obtaining method, applied to an electronic device, wherein the method comprises:
   receiving, by the electronic device, a first operation of a user, wherein the first operation triggers starting video recording;
   displaying, by the electronic device, a first interface in response to the first operation; wherein the first interface is a viewfinder interface on which the electronic device is recording a video, the first interface comprises a preview image, and the preview image is obtained from a first image collected by a camera of the electronic device after the electronic device receives the first operation;
   selecting, by the electronic device, a second image from a first video stream, wherein the second image comprises an image of a target object, and the first video stream is obtained by an image signal processor (ISP) of the electronic device by performing first processing on a plurality of frames of first images, and the first processing comprises subsampling;
   buffering, by the electronic device in a first buffer queue, the first image collected by the camera, wherein n frames of first images collected by the camera are buffered in the first buffer queue, $n \geq 1$, and n is an integer;
   using, by the electronic device as an input, m frames of first images corresponding to the second image in the n frames of first images, and running a preset original RAW domain image processing algorithm to obtain a third image, wherein the preset RAW domain image processing algorithm has a function of improving image quality; and $m \geq 1$, and m is an integer;
   performing, by the electronic device, second processing on the third image by using the ISP, to obtain a fourth image, wherein the second processing does not comprise the subsampling; and
   displaying, by the electronic device after video recording ends, a highlight image obtained by encoding the fourth image.

2. The method according to claim 1, wherein the displaying, by the electronic device after video recording ends, a highlight image obtained by encoding the fourth image comprises:
   displaying, by the electronic device after video recording ends, a detail page of a video recording file in response to an operation of the user, wherein the detail page of the video recording file comprises a first preset control; and
   displaying, by the electronic device in response to a tap operation performed by the user on the first preset control, the highlight image captured in a process of recording the video recording file by the electronic device.

3. The method according to claim 1, wherein the displaying, by the electronic device after video recording ends, a highlight image obtained by encoding the fourth image comprises:
   displaying, by the electronic device after video recording ends, a detail page of a video recording file in response to an operation of the user; and
   displaying, by the electronic device in response to a preset gesture entered by the user on the detail page of the video recording file, the highlight image captured in a process of recording the video recording file by the electronic device.

4. The method according to claim 1, wherein $n \geq 2$.

5. The method according to claim 1, wherein the using, by the electronic device as an input, m frames of first images corresponding to the second image in the n frames of first images, and running a preset original RAW domain image processing algorithm to obtain a third image comprises:
   selecting, by the electronic device, a fifth image corresponding to the second image from the n frames of first images; and
   using, by the electronic device, the m frames of first images in the n frames of first images as an input, and running the preset RAW domain image processing algorithm to obtain the third image, wherein the m frames of first images comprise the fifth image, and another image other than the fifth image in the m frames of first images is used to perform picture quality enhancement on the fifth image; and
   wherein in the n frames of first images, a time at which an image sensor of the camera outputs the fifth image is closest to a time at which the image sensor of the camera outputs the second image; or in the n frames of first images, the fifth image has highest definition.

6. The method according to claim 1, wherein
the target object comprises a face, the second image is an image when an expression of the target object meets a preset condition, and that the expression of the target object meets the preset condition comprises a face is smiling; and/or
the target object comprises a human body, and the second image is an image when an action of the target object is a preset action.

7. The method according to claim 1, wherein the target object is preconfigured in the electronic device when the electronic device is delivered from a factory; and/or
the target object is set by the user on a settings interface of the electronic device and received the electronic device.

8. The method according to claim 1, wherein before the selecting, by the electronic device, a second image from a first video stream, the method further comprises:
displaying, by the electronic device, a second interface, wherein the second interface is a viewfinder interface on which the electronic device has not started to record a video, a preview image comprised in the second interface is obtained from an image collected by the camera of the electronic device before the electronic device receives the first operation, the second interface further comprises a start video recording button and a switch of a preset function, and the first operation is a tap operation on the start video recording button;
displaying, by the electronic device, a settings interface of the target object in response to a second operation performed by the user on the switch of the preset function in the second interface, wherein the settings interface of the target object comprises options of a plurality of to-be-selected photographing objects; and
determining, by the electronic device in response to a selection operation performed by the user on an option of at least one photographing object in the options of the plurality of to-be-selected photographing object, a photographing object selected by the user as the target object.

9. The method according to claim 1, wherein the first interface further comprises: a switch of a preset function, and before the selecting, by the electronic device, a second image from a first video stream, the method further comprises:
displaying, by the electronic device, a settings interface of the target object in response to a second operation performed by the user on the switch of the preset function in the first interface, wherein the settings interface of the target object comprises options of a plurality of to-be-selected photographing objects; and
determining, by the electronic device in response to a selection operation performed by the user on an option of at least one photographing object in the options of the plurality of to-be-selected photographing object, a photographing object selected by the user as the target object.

10. The method according to claim 1, wherein the selecting, by the electronic device, a second image from a first video stream comprises:
periodically selecting, by the electronic device, the second image from the first video stream.

11. The method according to claim 1, wherein m≥2.

12. The method according to claim 1, wherein the first processing comprises image processing in an RAW domain and image processing in a red green blue (RGB) domain, and the second processing comprises image processing in the RAW domain, image processing in the RGB domain, and image processing in a luma blue projection and red projection (YUV) domain.

13. The method according to claim 1, wherein the performing, by the electronic device, second processing on the third image by using the ISP, to obtain a fourth image comprises:
when the first buffer queue comprises a first image whose difference between a time indicated by time information thereof and a time indicated by time information of the second image is within preset duration, performing, by the electronic device, the second processing on the third image by using the ISP to obtain a fourth image.

14. The method according to claim 13, wherein the method further comprises:
when the first buffer queue does not comprise a first image whose difference between a time indicated by time information thereof and a time indicated by time information of the second image is within preset duration, performing, by the electronic device, third processing on the third image by using the ISP to obtain a sixth image, wherein the third processing comprises image processing in the RAW domain and image processing in the RGB domain;
performing, by the electronic device, picture quality enhancement on the second image by using the sixth image, to obtain a seventh image;
performing, by the electronic device, fourth processing on the seventh image by using the ISP to obtain an eighth image, wherein the fourth processing comprises image processing in the YUV domain, and the fourth processing does not comprise subsampling; and
displaying, by the electronic device after video recording ends, a highlight image obtained by encoding the eighth image.

15. The method according to claim 14, wherein the third processing does not comprise subsampling, and the method further comprises:
buffering, by the electronic device, a sixth image in a second buffer queue;
generating, by the electronic device, a video recording file in response to an operation of ending video recording, wherein the video recording file comprises an image generated from a plurality of frames of first images;
in a process of playing the video recording file, determining, by the electronic device, a candidate image from the video recording file in response to a selection operation performed by the user on one frame of image in the video recording file;
selecting, by the electronic device, a reference (REF) image corresponding to the candidate image from a plurality of frames of sixth images buffered in the second buffer queue, and performing picture quality enhancement on the candidate image by using the REF image to obtain a ninth image;
performing, by the electronic device, fourth processing on the ninth image by using the ISP to obtain a tenth image, wherein the fourth processing comprises image processing in the YUV domain, and the fourth processing does not comprise subsampling; and
displaying, by the electronic device, a highlight image obtained by encoding the tenth image.

16. An electronic device, comprising: a touchscreen, a memory, a camera, a display screen, and one or more processors; wherein the touchscreen, the memory, the camera, and the display screen are coupled to the processor; and the memory stores computer program code, the computer program code comprises computer instructions, and when the computer instructions are executed by the processor, the electronic device is enabled to perform operations comprising:

receiving a first operation of a user, wherein the first operation triggers starting video recording;

displaying a first interface in response to the first operation, wherein the first interface is a viewfinder interface on which the electronic device is recording a video, the first interface comprises a preview image, and the preview image is obtained from a first image collected by a camera of the electronic device after the electronic device receives the first operation;

selecting a second image from a first video stream, wherein the second image comprises an image of a target object, and the first video stream is obtained by an image signal processor (ISP) of the electronic device by performing first processing on a plurality of frames of first images, and the first processing comprises subsampling;

buffering, in a first buffer queue, the first image collected by the camera, wherein n frames of first images collected by the camera are buffered in the first buffer queue, n≥1, and n is an integer;

using, as an input, m frames of first images corresponding to the second image in the n frames of first images, and running a preset original RAW domain image processing algorithm to obtain a third image; wherein the preset RAW domain image processing algorithm has a function of improving image quality; and m≥1, and m is an integer;

performing second processing on the third image by using the ISP, to obtain a fourth image; wherein the second processing does not comprise the subsampling; and displaying, after video recording ends, a highlight image obtained by encoding the fourth image.

17. A non-transitory computer-readable storage medium, comprising computer instructions which, when run on an electronic device, cause the electronic device to perform operations comprising:

receiving a first operation of a user, wherein the first operation triggers starting video recording;

displaying a first interface in response to the first operation, wherein the first interface is a viewfinder interface on which the electronic device is recording a video, the first interface comprises a preview image, and the preview image is obtained from a first image collected by a camera of the electronic device after the electronic device receives the first operation;

selecting a second image from a first video stream, wherein the second image comprises an image of a target object, and the first video stream is obtained by an image signal processor (ISP) of the electronic device by performing first processing on a plurality of frames of first images, and the first processing comprises subsampling;

buffering, in a first buffer queue, the first image collected by the camera, wherein n frames of first images collected by the camera are buffered in the first buffer queue, n≥1, and n is an integer;

using, as an input, m frames of first images corresponding to the second image in the n frames of first images, and running a preset original RAW domain image processing algorithm to obtain a third image, wherein the preset RAW domain image processing algorithm has a function of improving image quality; and m≥1, and m is an integer;

performing second processing on the third image by using the ISP, to obtain a fourth image; wherein the second processing does not comprise the subsampling; and displaying, after video recording ends, a highlight image obtained by encoding the fourth image.

18. The electronic device according to claim 16, wherein displaying, after video recording ends, the highlight image obtained by encoding the fourth image comprises:

displaying, after the video recording ends, a detail page of a video recording file in response to an operation of the user, wherein the detail page of the video recording file comprises a first preset control; and displaying, in response to a tap operation performed by the user on the first preset control, the highlight image captured in a process of recording the video recording file by the electronic device.

19. The electronic device according to claim 16, wherein displaying, after the video recording ends, the highlight image obtained by encoding the fourth image comprises:

displaying, after video recording ends, a detail page of a video recording file in response to an operation of the user; and displaying, in response to a preset gesture entered by the user on the detail page of the video recording file, the highlight image captured in a process of recording the video recording file by the electronic device.

* * * * *